US012645725B1

(12) United States Patent
Sumner et al.

(10) Patent No.: US 12,645,725 B1
(45) Date of Patent: Jun. 2, 2026

(54) ARTIFICIAL INTELLIGENCE CUSTOM FIELDS

(71) Applicant: DocuSign, Inc., San Francisco, CA (US)

(72) Inventors: Maria Sumner, Seattle, WA (US); Marina Shah, Seattle, WA (US); Emad Elwany, Bellevue, WA (US); Genevieve Peaslee, Seattle, WA (US)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 18/818,275

(22) Filed: Aug. 28, 2024

(51) Int. Cl.
*G06F 16/34* (2025.01)
*G06F 16/334* (2025.01)
*G06F 16/383* (2019.01)
*G06V 10/764* (2022.01)

(52) U.S. Cl.
CPC ........ *G06F 16/345* (2019.01); *G06F 16/3344* (2019.01); *G06F 16/383* (2019.01); *G06V 10/765* (2022.01)

(58) Field of Classification Search
CPC ...... G06F 16/345; G06F 16/35; G06F 16/353; G06F 16/313

USPC .......................................................... 707/722
See application file for complete search history.

(56) References Cited

U.S. PATENT DOCUMENTS

| | | | |
|---|---|---|---|
| 2019/0163817 A1* | 5/2019 | Milenova | G06F 16/35 |
| 2020/0210484 A1* | 7/2020 | Shlyunkin | G06F 16/909 |
| 2021/0357455 A1* | 11/2021 | Zhao | G06F 16/9038 |
| 2024/0370479 A1* | 11/2024 | Hudetz | G06F 16/316 |

* cited by examiner

*Primary Examiner* — Shahid A Alam
(74) *Attorney, Agent, or Firm* — KDW FIRM PLLC

(57) ABSTRACT

Techniques for artificial intelligence (AI) custom fields are described. A method comprises receiving a custom rule comprising a query request for information in an electronic document stored in a data repository, generating a vectorized rule from the custom rule, selecting a subset of vectorized portions from a set of vectorized portions of the electronic document stored in a vector database corresponding to the vectorized rule, sending the vectorized rule and the subset of vectorized portions to a machine learning (ML) model, receiving a query response to the query request from the ML model, the query response comprising a summary of information contained within one or more vectorized portions of the subset of vectorized portions or a comment on the information contained within the one or more vectorized portions. Other embodiments are described and claimed.

19 Claims, 25 Drawing Sheets

FIG. 1

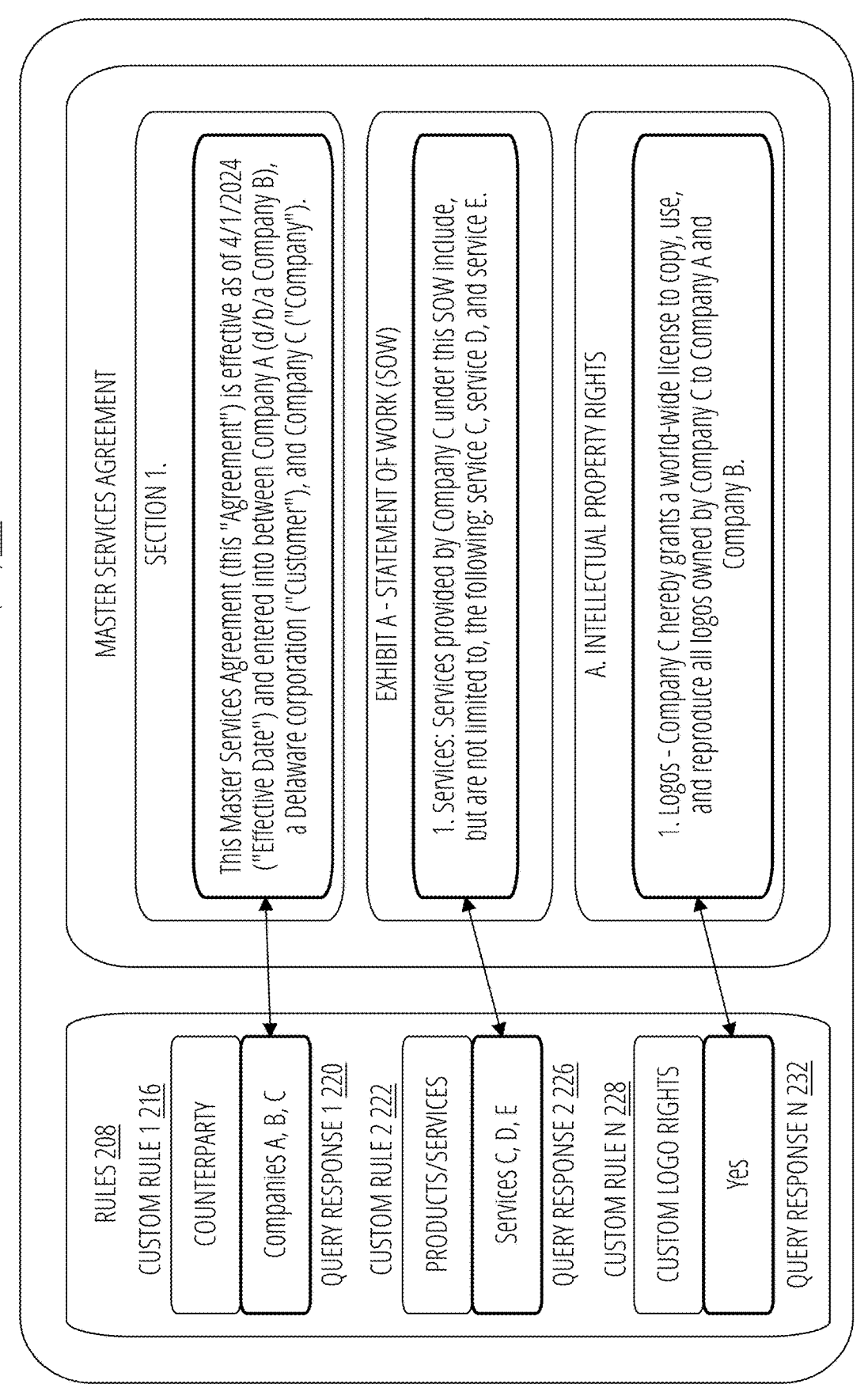

GRAPHICAL USER INTERFACE (GUI) 202

MASTER SERVICES AGREEMENT

SECTION 1.

This Master Services Agreement (this "Agreement") is effective as of 4/1/2024 ("Effective Date") and entered into between Company A (d/b/a Company B), a Delaware corporation ("Customer"), and Company C ("Company").

EXHIBIT A - STATEMENT OF WORK (SOW)

1. Services: Services provided by Company C under this SOW include, but are not limited to, the following: service C, service D, and service E.

A. INTELLECTUAL PROPERTY RIGHTS

1. Logos - Company C hereby grants a world-wide license to copy, use, and reproduce all logos owned by Company C to Company A and Company B.

RULES 208
CUSTOM RULE 1 216
COUNTERPARTY
Companies A, B, C
QUERY RESPONSE 1 220

CUSTOM RULE 2 222
PRODUCTS/SERVICES
Services C, D, E
QUERY RESPONSE 2 226

CUSTOM RULE N 228
CUSTOM LOGO RIGHTS
Yes
QUERY RESPONSE N 232

FIG. 2C

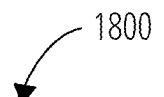

1800

RECEIVE, FROM A GRAPHICAL USER INTERFACE (GUI), A CUSTOM RULE INCLUDES A QUERY REQUEST FOR INFORMATION IN AN ELECTRONIC DOCUMENT STORED IN A DATA REPOSITORY 1802

GENERATE, USING A PROCESSOR, A VECTORIZED RULE FROM THE CUSTOM RULE, SELECTING, USING THE PROCESSOR, A SUBSET OF VECTORIZED PORTIONS FROM A SET OF VECTORIZED PORTIONS OF THE ELECTRONIC DOCUMENT STORED IN A VECTOR DATABASE CORRESPONDING TO THE VECTORIZED RULE 1804

SEND, USING THE PROCESSOR, THE VECTORIZED RULE AND THE SUBSET OF VECTORIZED PORTIONS TO A MACHINE LEARNING (ML) MODEL 1806

RECEIVE, USING THE PROCESSOR, ONE OR MORE VECTORIZED PORTIONS FROM THE SUBSET OF VECTORIZED PORTIONS IDENTIFIED BY THE ML MODEL 1808

GENERATE, USING THE PROCESSOR, A QUERY RESPONSE TO THE QUERY REQUEST BASED ON THE ONE OR MORE VECTORIZED PORTIONS, THE QUERY RESPONSE INCLUDES A SUMMARY OF INFORMATION CONTAINED WITHIN THE ONE OR MORE VECTORIZED PORTIONS IN A NATURAL LANGUAGE OR A COMMENT ON THE INFORMATION CONTAINED WITHIN THE ONE OR MORE VECTORIZED PORTIONS 1810

FIG. 18

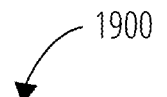
1900

DETERMINE, USING THE PROCESSOR, THAT THE INFORMATION CONTAINED WITHIN THE ONE OR MORE VECTORIZED PORTIONS IS NOT ASSOCIATED WITH THE VECTORIZED RULE BY THE ML MODEL 1902

SEND, USING THE PROCESSOR, THE VECTORIZED RULE AND AN IMAGE OF THE ELECTRONIC DOCUMENT TO A VISUAL ML MODEL 1904

RECEIVE USING THE PROCESSOR, TEXTUAL INFORMATION FROM AN IMAGE DOCUMENT PORTION OF THE IMAGE OF THE ELECTRONIC DOCUMENT CORRESPONDING TO THE VECTORIZED RULE FROM THE VISUAL ML MODEL 1906

GENERATE, USING THE PROCESSOR, A QUERY RESPONSE COMPRISING A SUMMARY OF THE TEXTUAL INFORMATION FROM THE IMAGE DOCUMENT PORTION 1908

GENERATE, USING THE PROCESSOR, A GRAPHICAL USER INTERFACE DISPLAYING THE QUERY RESPONSE AND AT LEAST ONE PORTION OF THE ELECTRONIC DOCUMENT 1910

FIG. 19

2000

DETERMINE, USING THE PROCESSOR, THAT THE INFORMATION CONTAINED WITHIN THE ONE OR MORE VECTORIZED PORTIONS IS NOT ASSOCIATED WITH THE VECTORIZED RULE BY THE ML MODEL 2002

SEND, USING THE PROCESSOR, THE VECTORIZED RULE AND AN IMAGE OF THE ELECTRONIC DOCUMENT TO A VISUAL ML MODEL 2004

RECEIVE, USING THE PROCESSOR, AN INDICATOR THAT THE IMAGE OF THE ELECTRONIC DOCUMENT DOES NOT CONTAIN ANY IMAGE DOCUMENT PORTIONS WITH TEXTUAL INFORMATION THAT CORRESPONDS TO THE VECTORIZED RULE FROM THE VISUAL ML MODEL 2006

GENERATE, USING THE PROCESSOR, THE QUERY RESPONSE COMPRISING A COMMENT INDICATING THAT THE ELECTRONIC DOCUMENT DOES NOT CONTAIN ANY INFORMATION CORRESPONDING TO THE VECTORIZED RULE 2008

GENERATE, USING THE PROCESSOR, A GRAPHICAL USER INTERFACE DISPLAYING THE COMMENT AND AT LEAST ONE PORTION OF THE ELECTRONIC DOCUMENT 2010

COMPUTER-READABLE STORAGE MEDIUM 2102

COMPUTER EXECUTABLE
INSTRUCTIONS 2104

FIG. 21

ARTIFICIAL INTELLIGENCE CUSTOM FIELDS

BACKGROUND

A natural language refers to any human language that has developed naturally through social interaction without conscious planning or preconceived rules. It encompasses all spoken and written forms of communication used by humans, such as English, Spanish, Mandarin Chinese, Swahili, etc. Natural languages are characterized by their complexity, dynamic nature, and ability to convey abstract ideas and emotions. They evolve over time through cultural transmission, influenced by historical events, societal changes, and interactions among speakers of different dialects or varieties within the same language family. Linguistics is the scientific study of natural languages, examining their structure (grammar), use in context (pragmatics), meaning (semantics), and development across generations. Understanding natural languages has been crucial for advancements in fields like artificial intelligence, cognitive psychology, education, and technology.

In the digital age, electronic documents have become increasingly prevalent, facilitating easier access, searchability, and manipulation through computer systems and software applications designed for document creation, storage, editing, and management (e.g., word processors, content management systems). However, interpreting and understanding a document written in a natural language can be challenging depending on the nature of the document and its intended audience. This is due in part to the ever-evolving complexity of human language. Consequently, there is a need for improved techniques for analyzing and understanding electronic documents.

BRIEF DESCRIPTION OF THE DRAWINGS

To easily identify the discussion of any particular element or act, the most significant digit or digits in a reference number refer to the figure number in which that element is first introduced.

FIG. 2C illustrates GUI view in accordance with one embodiment.

FIG. 18 illustrates an example method for determining presence of a particular document portion in an electronic document, according to some embodiments of the current subject matter.

FIG. 19 illustrates another example method for determining presence of a particular document portion in an electronic document, according to some embodiments of the current subject matter.

FIG. 20 illustrates yet another example method for determining presence of a particular document portion in an electronic document, according to some embodiments of the current subject matter.

FIG. 21 illustrates a computer-readable storage medium in accordance with one embodiment.

DETAILED DESCRIPTION

Figure 1:
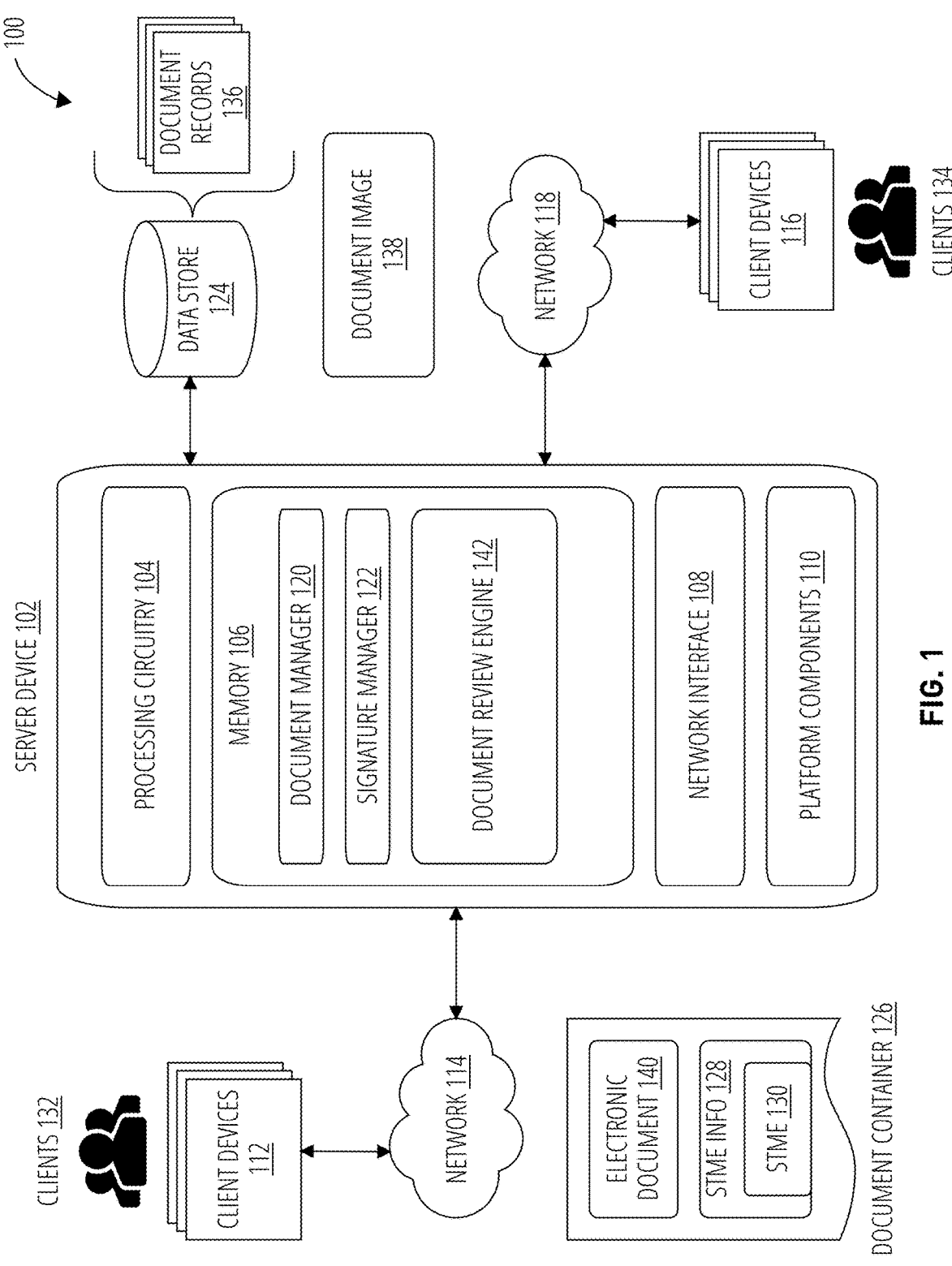
FIG. 1 illustrates a system in accordance with one embodiment.

Embodiments disclosed herein are generally directed to techniques for review, analysis, and retrieval of information or content contained within electronic documents (e.g., legal documents) through the assistance of machine learning (ML) models and artificial intelligence (AI) systems. Some embodiments are particularly directed to a ML platform for training and deploying one or more ML models suitable for an AI system to support services offered by an online system, such as an electronic document management system. Specifically, the ML platform uses one or more ML models trained for reviewing and analyzing electronic documents stored in a data repository to identify information or content corresponding to a set of one or more rules. A rule may comprise text information expressed in a natural language (e.g., English, Spanish, Korean, etc.) suitable for natural language processing (NLP) by an ML model of the ML platform. A rule may be a custom rule defined by a user and received via a graphical user interface (GUI). Alternatively, a rule may also be a predefined rule stored in a database.

In various embodiments, the ML platform presents a GUI that allows a user to define a custom rule for an electronic document. A custom rule is a rule defined by a user that guides an electronic document management system (EDMS) in an analysis of one or more electronic documents to obtain information contained within the one or more electronic documents. In some embodiments, a custom rule is sometimes referred to as an AI custom rule. An AI custom rule is a type of custom rule defined by a user that specifically guides an ML model of an ML platform of an EDMS in an analysis of one or more electronic documents to obtain information contained within the one or more electronic documents. A non-limiting example of an ML model is a generative AI model. As used herein, the term "custom rule" and "AI custom rule" are considered interchangeable and they are collectively referred to as a "custom rule" for simplicity and clarity.

In various embodiments, a custom rule may be implemented as an AI custom field for an ML model. An AI custom field is a field defined by a user for an ML model. A field is a data field that specifies an attribute, property, or feature within a dataset. For example, in a dataset containing information about users, fields might include "Name", "Age", "Occupation", and "Location". In machine learning, fields (often called features) are used as inputs to an ML model. These fields represent the variables that the ML model uses to make predictions or classifications. For instance, in a spam detection model, fields might include "Email Subject", "Sender", and "Email Body Text". In various embodiments, a custom rule may be implemented as an AI custom field for an ML model, such as a generative AI model, for example.

In a particular embodiment, a user defines a custom rule requesting information contained in one or more electronic document stored in a database. The user defines the custom rule using one or more defined GUI elements of a GUI. An ML platform of an EDMS receives the custom rule from the GUI. The custom rule comprises, among other types of information, a data field containing a query request for information contained in a document. An example of a query request is a prompt for a generative AI model. Generally, a prompt in the context of generative AI refers to an input or instruction provided to the generative AI model to guide its output. The prompt could be a sentence, question, or even a few keywords that the generative AI model uses to generate a response. Generative AI models are designed to process text data, visual data, or both text and visual data in response to a prompt. Examples of a generative AI model to handle text data is a generative pre-trained transformer (GPT) like ChatGPT, Bidirectional Encoder Representations from Transformers (BERT), Text-To-Text Transfer Transformer (T5), Bidirectional and Auto-Regressive Transformers (BART), and so forth. Examples of a generative AI model to handle text and visual data include multimodal models such as GPT-4 Turbo with Vision (GPT-4 Turbo), Contrastive Language-Image Pretraining (CLIP), DALL-E, Flamingo, Vision-and-Language BERT (VILBERT), and so forth. Embodiments are not limited to these examples.

In one embodiment, for example, the ML platform receives a custom rule defined by a user from a GUI with a query request for a generative AI model. A query request is a specific type of prompt for a generative AI model to instruct and guide the generative AI model to identify, analyze and summarize information contained within an electronic document. The ML platform utilizes various ML models, including one or more generative AI models, to analyze electronic documents using the custom rule and query request to instruct and guide the generative AI models to output a query response with information responsive to the query request. Further, in some cases, the ML platform performs these tasks in an iterative manner in order to generate a more precise and accurate answer to the query request in a cost-efficient manner utilizing fewer technical resources relative to conventional systems.

In one embodiment, for example, a first ML model of the ML platform vectorizes portions of one or more electronic documents, and it stores a set of vectorized portions in a vector database. An example of a first ML model is an embedding model, such as Word2Vec, GloVe, FastText, BERT, GPT, and so forth. Prior to vectorization, a conditional random field (CRF) model is used to separate an electronic document into multiple discrete portions (e.g., sections, clauses, paragraphs, etc.) of the electronic document. The CRF model receives a list of regular expressions (codified) and labeled text (e.g., manually human-labeled text or soft/hard tags generated by a teacher ML model), and it outputs a list of labels identifying different discrete portions of the electronic document (e.g., "begin section title", "inside section title"). The first ML model receives the discrete portions of the electronic document from the CRF model, and it then vectorizes the discrete portions of the electronic document to generate vectorized portions of the electronic document. Similarly, the first ML model also receives the custom rule, and it vectorizes the custom rule with the query request to generate a vectorized rule. Programming logic (or a layer of a neural network) is then executed to compare the vectorized rule to a set of vectorized portions of an electronic document. The programming logic determines whether there is a match between the vectorized rule and one or more vectorized portions of the set of vectorized portions of the electronic document using a similarity measure (e.g., cosine similarity), thereby forming a subset of vectorized portions from the set of vectorized portions of the electronic document.

When there is a match between the vectorized rule and at least one vectorized portion of the subset of vectorized portions of the electronic document, the ML platform sends the vectorized rule and one or more matching vectorized portions to a second ML model. The second ML model may be deployed on the ML platform of the EDMS, or it may be deployed on a third-party server accessible by the ML platform. An example for the second ML model is a generative AI model capable of handling text data, such as a transformer model like a a large language model (LLM) (e.g., a GPT, ChatGPT, BERT, etc.). A text-based generative AI model can generate text that is contextually relevant and coherent, making it useful for tasks like text identification, analysis, and summarization. The second ML model receives the one or more matching vectorized portions and the vectorized rule with the query request. The second ML model generates a query response to the query request based on the matching vectorized portions and the vectorized rule. In this case, the query response comprises the information contained in the at least one vectorized portion of the electronic document, a summary of the information contained in the at least one vectorized portion of the electronic document, and/or a comment on the information contained in the at least one vectorized portion of the electronic document. The second ML model sends the query response and/or comment to the ML platform of the EDMS.

When there is not a match between the vectorized rule and at least one vectorized portion of the subset of vectorized portions of the electronic document, the ML platform sends an image of the electronic document (e.g., a PDF, a JPEG, etc.) to a third ML model with the vectorized rule. As with the second ML model, the third ML model may be deployed on the ML platform of the EDMS, or it may be deployed on a third-party server accessible by the ML platform. An example for the third ML model is a multimodal generative AI model capable of handling both text data and visual data, such as a visual ML model like GPT-4 Turbo. A multimodal generative AI model is suitable for analyzing the image of the electronic document and recognizing text data within the image for tasks like text identification, analysis, and summarization. This is useful when text data is contained within data structures and containers that are difficult to process by text-based generative AI models, such as tables, graphs, and equations. Where a text-based generative AI model may fail to recognize and process text data within such structures, a multimodal generative AI model is capable of recognizing text data within images, regardless of format or presentation, and therefore can retrieve text data useful for a query response to the query request of the custom rule. When the third ML model finds a match using both text and image analysis, it generates a query response based on the match using the text data as previously described. When the third ML fails to find a match, however, it generates a query response comprising a comment about the absence of the information in the electronic document. The third ML model sends the query response to the ML platform of the EDMS.

In a particular embodiment, for example, circuitry executes instructions to receive at least one custom rule includes a query request for information in an electronic document from a GUI. The circuitry vectorizes a plurality of portions of the electronic document extracted from the electronic document to generate a plurality of vectorized portions and the at least one custom rule to generate at least one vectorized rule. The circuitry compares the plurality of vectorized portions to the at least one vectorized rule. The circuitry receives, based on the comparison, an identification of at least one portion in the plurality of portions from a ML model. The circuitry applies the ML model to determine presence of the at least one portion in the electronic document. The circuitry generates a query response to the query request. In one embodiment, for example, the query response includes the information requested by the query request. In one embodiment, for example, the query response includes a comment on the information requested by the query request based on the presence or absence of the information in at least one portion in the electronic document. Other embodiments are described and claimed.

More particularly, documents are written or printed materials that convey information, ideas, instructions, laws, regulations, and other forms of communication. They can take various formats such as books, articles, reports, letters, memos, manuals, contracts, certificates, and more. A document may comprise a multimedia record of information. The term "electronic" may refer to technology having electrical, digital, magnetic, wireless, optical, electromagnetic, or similar capabilities. The term "electronic document" may refer to any electronic multimedia content or multimedia record of information intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An online electronic document management system provides a host of different benefits to users (e.g., a client or customer) of the system. One advantage is added convenience in generating and signing an electronic document, such as a legally-binding agreement. Parties to an agreement can review, revise and sign the agreement from anywhere around the world on a multitude of electronic devices, such as computers, tablets and smartphones.

In some embodiments, the current subject matter relates to machine-learning based platform for performing accurate review, analysis, and/or search for information in documents, where such processes may be executed in accordance with one or more rules, playbooks, etc. These processes may be executed on stored electronic documents, such as signed agreements. These processes may also be executed in real-time, such as, for example, during agreement negotiations. In some embodiments, an electronic document may be received and/or ingested by the current subject matter platform. The platform may analyze the document and extract one or more portions from the document. The portions may, for example, include, but are not limited to, a text, an image, a graphic, a video, an audio, a clause in the electronic document, a sentence in the electronic document, a paragraph in the electronic document, a predetermined number of characters (e.g., 50 alpha-numeric characters and/or any other characters) in the electronic document, and any combination thereof. The extracted portions may then be vectorized using an embedding model to form one or more vectors or embeddings that represent a sequence of words in the extracted portions. A vector refers to numerical data points that represent features or attributes of objects such as images, text, audio, etc. An embedding is a dense, low-dimensional vector that represents high-level concepts such as words or phrases in a continuous vector space. An embedding captures semantic relationships between elements by mapping them to points within the embedding space based on their similarity or association with other elements. As used herein, any reference to vectors or vectorization can be equally applied to embeddings.

To perform analysis of the document to determine, for example, presence of specific text, such as, standard clauses in an agreement, the platform may also receive one or more playbooks, predefined rules, custom rules, user-defined rules. A rule may comprise text information (e.g., words, sentences, paragraphs, etc.) expressed in a natural language, such as a human language, suitable for natural language processing (NLP) by an NLP system or an AI system. A rule may be expressed as varying types of sentences, such as an imperative sentence (e.g., commands/requests), interrogative sentences (e.g., questions/queries), declarative sentences (e.g., statements about facts, opinions, beliefs, observations, information, etc.), conditional sentences (e.g., if/then statements), or combinations thereof. The rule may be a predefined rule stored in a playbook or a custom rule generated by a user and received from a graphical user interface (GUI) of an electronic device.

The platform may access stored playbooks and/or rules that may be predefined and/or dynamically generated in real-time for the purposes of analyzing the electronic document. In some embodiments, the platform may use the embedding model to vectorize the playbooks, rules, etc. to generate one or more vectorized playbooks, rules, etc. For the case of discussion herein, a reference will be made to a rule and/or a vectorized rule. As can be understood, the platform may be configured to use one or more rules, predefined rules, custom rules, user-defined rules, static rules, dynamic rules, sets of rules, playbooks, and/or any other mechanisms for analysis of electronic document.

These rules may be used to detect and/or determine presence of text in an electronic document that may be matching to the playbook or rule, and a response (e.g., a comment or explanation) may be generated for display by a graphical user interface (GUI) regarding the match. For instance, in a lease agreement for a Company A, a rule may be expressed as a declarative sentence relating to governing law of the lease agreement, such as "The governing law of this lease agreement is the law of the State of California." In this case, a match may generate a response for the match, such as "The governing law of this lease agreement is the law of the State of California." In some cases, the rule is a custom rule defined by a user expressed as an interrogative sentence requesting a summary of information or content contained within an electronic document. For instance, in a master services agreement (MSA) between a Company A and a Company B, a custom rule relating to products or services offered by Company B, may state "What are the products and/or services offered by Company B to Company A?". In this case, a response is a summary of the products and/or services defined in the MSA agreement. In some cases, a custom rule is an interrogative sentence defined by a user requesting a presence or absence of information or content contained within an electronic document. For example, in a sales agreement for Company C, a custom rule relating to sales tax of an automobile, may state "Is there sales tax included in the final price of the car?". In this case, a response is a comment such as a "yes" or a "no" in response to a match or not match between a rule and a portion of the document. In some cases, a custom rule is an interrogative sentence defined by a user requesting an analysis of information or content contained within an electronic document. For example, in a licensing agreement between Company D and Company E, a custom rule relating to intellectual property (IP) rights of a logo, may state "Does Company D have logo rights from Company E?". In this case, a response is a comment such as a "yes" or a "no" in response to analysis of a match between the rule and a portion of the document.

An ML model may compare the vectorized document portions and the vectorized rules to each other to determine one or more matches. A cosine similarity may be used to perform comparison of the vectorized document portions and the vectorized rules. As can be understood, any other comparison mechanism may be used to compare the vectorized portions and rules. The comparison may yield one or more matches. A match indicates a vectorized portion is similar to a vectorized rule. The match may comprise an exact match or a partial match based on a similarity score. A partial match may be defined using a defined threshold value (e.g., +/−5%). For example, the above lease agreement rule may match to, for example, "The law of this agreement is the law of the State of California", "This agreement is governed by the law of the State of California", etc. In another example, the above custom rule relating to products or services may match to, for example, "Company B offers tier one data storage for electronic documents", "The services offered to Company A by Company B is tier one data storage for electronic documents", etc. In some example, non-limiting embodiments, each match may be configured to be scored and/or ranked based on level of similarity between the vectorized rules and portions.

In some embodiments, the platform may then identify, select, retrieve, and/or generate one or more examples of a text portion. The examples may be existing, standard, and/or previously used text portions in electronic documents. Such examples may be stored in and retrieved from a storage location, and/or dynamically generated. The platform may then provide examples to a machine learning (ML) model for training and/or fine-tuning purposes. The machine learning model may be a generative artificial intelligence (AI) model, a large language model (LLM), a transformer model, and any other type of machine learning model, and/or any combination of models. The generative AI model may be part of the current subject matter platform and/or be one or more third party models (e.g., GPT, ChatGPT, Bard, DALL-E, Midjourney, DeepMind, etc.). Any number of examples may be provided to the ML model for training. In the above lease agreement example, the examples may include "The governing law of this agreement is the law of the State of California", "The law of the State of California shall govern this agreement", and so forth. In the above MSA example, the examples may include "Company B offers tier one data storage for electronic documents", "The services offered to Company A by Company B is tier one data storage for electronic documents", and so forth. The examples assist the ML model to find matches between portions of an electronic document and a rule associated with the electronic document.

Once the ML model is trained, the platform may provide the generated matches (e.g., based on similarity scores) to the ML model. A predetermined number of matches between the vectorized portion(s) and rule(s) may be provided, e.g., top 10 matches (which may be determined based on the ranking, scoring, etc.). The platform may also provide NLP instructions that instruct the ML model to identify one or more and/or a single most relevant match, between the vectorized portion(s) and the vectorized rule(s). Such match may be any match that the ML model determines to be most relevant and it might not be the highest ranking or scoring match.

Upon receiving the matches and the instructions, the trained ML model may be configured to identify one or more matches between the vectorized portion(s) and rule(s). In some embodiments, a single most relevant match may be identified by the trained ML model. The platform may then apply the ML model (same and/or different) to the identified match(es) to make a final determination as to whether the electronic document actually includes the identified match(es), e.g., whether the identified match(es) is/are present in the electronic document. In some example embodiments, the platform may also provide appropriate instructions to the ML model for determining presence of the identified match and may, optionally, provide additional examples to the ML model for further fine tuning.

If the ML model determines that the identified match is present in the electronic document, the platform may be configured to generate a graphical user interface displaying the identified match and/or indicating that the match is present in the document. For example, the rule may state "The law of this agreement is the law of the State of California" and the document includes language that states "The law of this agreement is the law of the State of California".

Otherwise, if the ML model determines that the identified match is not present in the electronic document, the platform may take various actions. In a first action, the platform may be configured to request (e.g., provide instructions to) a different ML model to confirm or verify whether there is a match between a rule and a portion of the electronic document. In a second action, the platform may be configured to generate a comment based on the rule and/or a portion of the electronic document.

For the first action, for example, the platform may send a different version of the electronic document as an image (e.g., a PDF or JPEG) along with the rule to a visual ML model trained to perform image detection. This may occur, for example, when the electronic document uses certain containers for text information, such as a table, chart, or equation. Some AI models are trained to operate on textual information, and it may have difficult identifying and retrieving text information formatted in a container. In such cases, an image of the electronic document is sent to a visual generative AI model trained to identify and retrieve text found in images.

For the second action, for example, the platform may generate a response, comment, and/or explanation based on the rule and/or a portion of the electronic document. For example, in a licensing agreement example above, a custom rule relating to intellectual property (IP) rights of a logo, may state "Does Company D have logo rights from Company E?". If there is not a match, then the platform generates a comment such as a "no" in response to the absence of a match between the rule and a portion of the document. The comment may be displayed in the GUI.

The ML model(s) used for the analysis of top matches, determination of a presence of a particular document portion in the document, generation of comments, etc. may be trained using one or more existing datasets that may include labeled objects (e.g., labeled document portions, examples of document portions (labeled or unlabeled), etc.). The datasets may include structured and/or unstructured datasets. Such datasets may include contracts, agreements, commercial documentation, publicly available data, and/or any other type of data or information and/or any combination thereof. The ML model(s) may be trained using set(s) of data representing various types of documents (e.g., forms, agreements, etc.). As can be understood, a single ML model may be trained on different types of data representing document portions. In some embodiments, the ML models may, for example, include at least one of the following: a large language model, a generative artificial intelligence (AI) model, and any combination thereof, where the generative AI models may be part of the current subject matter system and/or be one or more third party models (e.g., ChatGPT, Bard, DALL-E, Midjourney, DeepMind, etc.).

In some embodiments, the current subject matter may be configured to receive feedback from at least one user computing device. The feedback may be provided to the top matches for the document portions, comparison of document portions to rules, detected document portions, most relevant document portions, revisions, comments, etc. and/or any documents, portions of documents, etc. that have been processed. Once feedback is received, the current subject matter may be configured to update the top matches for the document portions, comparison of document portions to rules, detected document portions, most relevant document portions, revisions, comments, etc. Moreover, the feedback may be used to train, retrain, refresh train, etc. one or more machine learning (ML) models that may be used for the purposes of generating the top matches for the document portions, comparing of document portions to rules, detecting document portions, determining most relevant document portions, generating revisions and/or comments, etc. As can be understood, the feedback may be used to perform any desired action and/or any combination of actions.

In some embodiments, the user may provide feedback (e.g., "thumbs up", "thumbs down", vote, written feedback, etc.). The feedback may be used to adjust and/or finetune, for example, how documents/portions are identified, how the top matches for the document portions are generated, how document portions are compared to rules, how document portions are detected, how most relevant document portions are determined, how revisions and/or comments are generated, etc. For example, too many thumbs down on a particular operation above was incorrectly performed and may need to be updated (e.g., update a revision to the identified document portion).

The current subject matter may have one or more of the following technical benefits. In particular, the current subject matter may be configured to process documents to automatically detect and determine whether certain portions of documents correspond and/or correlate with rules, custom rules, and/or playbooks of rules. If one or more portions match a rule, a response is generated that describes the match for display by a GUI. If no portions match a rule, a response is generated that describes the absence of a match for display by a GUI. Further, the current subject matter may be configured to generate one or more modifications to the rules or portions in accordance with one or more defined rules, playbooks, etc., where modifications may be displayed in a graphical user interface along with commentary explaining the reasons for modifications. This greatly reduces computing resource consumption required to fully process documents, extract text, analyze portions of documents for information, describe portions of documents, as well as reduces a manual data entry effort that is typically akin to existing systems. Further, the current subject matter may be configured to display document portions and/or commentary that may be specific to an electronic document and/or a particular user. For example, commentary explaining certain types of information contained within an electronic document may be displayed in one form to one user while in another form to another user.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an embodiment of a system 100. The system 100 may be suitable for implementing one or more embodiments as described herein. In one embodiment, for example, the system 100 may comprise an electronic document management platform (EDMP) suitable for managing a collection of electronic documents. An example of an EDMP includes a product or technology offered by DocuSign®, Inc., located in San Francisco, California ("DocuSign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 100 may be implemented using other EDMP, technologies and products as well. For example, the system 100 may be implemented as an online signature system, online document creation and management system, an online workflow management system, a multi-party communication and interaction platform, a social networking system, a marketplace and financial transaction management system, a customer record management system, and other digital transaction management platforms. Embodiments are not limited in this context.

The system 100 may implement an EDMP as a cloud computing system. Cloud computing is a model for providing on-demand access to a shared pool of computing resources, such as servers, storage, applications, and services, over the Internet. Instead of maintaining their own physical servers and infrastructure, companies can rent or lease computing resources from a cloud service provider. In a cloud computing system, the computing resources are hosted in data centers, which are typically distributed across multiple geographic locations. These data centers are designed to provide high availability, scalability, and reliability, and are connected by a network infrastructure that allows users to access the resources they need. Some examples of cloud computing services include Infrastructure-as-a-Service (IaaS), Platform-as-a-Service (PaaS), and Software-as-a-Service (SaaS).

The system 100 may implement various search tools and algorithms designed to search for electronic document(s) and/or collections of electronic documents (which may also be referred to as "transaction documents", "transaction packages", "document packages" or "packages") and/or information within an electronic document or across a collection of electronic documents. Within the context of a cloud computing system, the system 100 may implement a cloud search service accessible to users via a web interface or web portal front-end server system. A cloud search service is a managed service that allows developers and businesses to add search capabilities to their applications or websites without the need to build and maintain their own search infrastructure. Cloud search services typically provide powerful search capabilities, such as faceted search, full-text search, and auto-complete suggestions, while also offering features like scalability, availability, and reliability. A cloud search service typically operates in a distributed manner, with indexing and search nodes located across multiple data centers for high availability and faster query responses. These services typically offer application program interfaces (APIs) that allow developers to easily integrate search functionality into their applications or websites. One major advantage of cloud search services is that they are designed to handle large-scale data sets and provide powerful search capabilities that can be difficult to achieve with traditional search engines. Cloud search services can also provide advanced features, such as machine learning-powered search, natural language processing, and personalized recommendations, which can help improve the user experience and make search more efficient. Some examples of popular cloud search services include Amazon CloudSearch, Elasticsearch, and Azure Search. These services are typically offered on a pay-as-you-go basis, allowing businesses to pay only for the resources they use, making them an affordable option for businesses of all sizes.

In general, the system 100 may allow users to generate, revise and electronically sign electronic documents. When implemented as a large-scale cloud computing service, the system 100 may allow entities and organizations to amass a significant number of electronic documents, including both signed electronic documents and unsigned electronic documents. As such, the system 100 may need to manage a large collection of electronic documents for different entities, a task that is sometimes referred to as contract lifecycle management (CLM).

As shown in FIG. 1, the system 100 may include a server device 102 communicatively coupled to a set of client devices 112 via a network 114. The server device 102 may also be communicatively coupled to a set of client devices 116 via a network 118. The client devices 112 may be associated with a set of clients 132. The client devices 116 may be associated with a set of clients 134. In one network topology, the server device 102 may represent any server device, such as a server blade in a server rack as part of a cloud computing architecture, while the client devices 112 and the client devices 116 may represent any client device, such as a smart wearable (e.g., a smart watch), a smart phone, a tablet computer, a laptop computer, a desktop computer, a mobile device, and so forth. The server device 102 may be coupled to a local or remote data store 124 to store document records 136. It may be appreciated that the system 100 may have more or less devices than shown in FIG. 1 with a different network topology as needed for a given implementation. Embodiments are not limited in this context.

Figure 22:
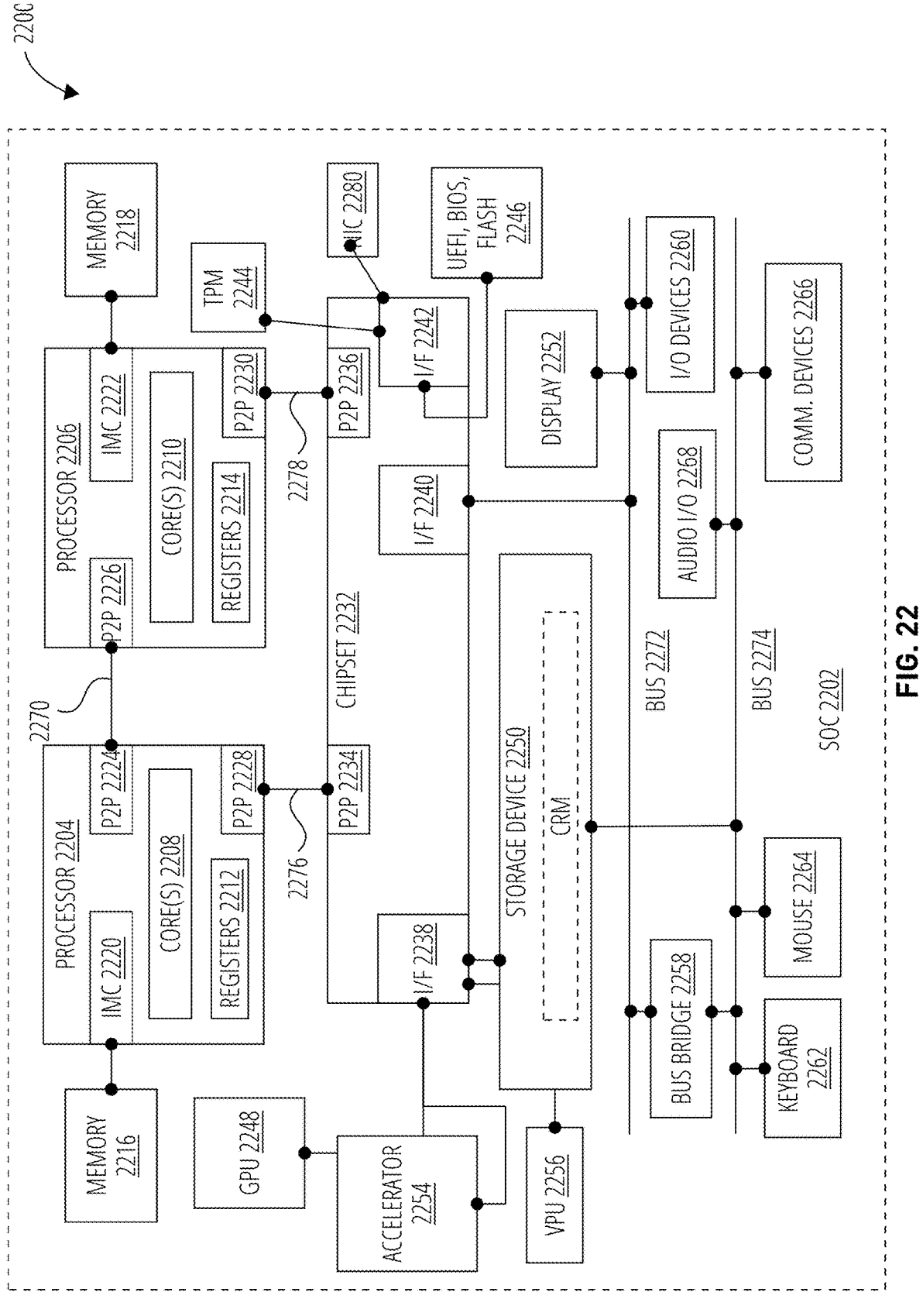
FIG. 22 illustrates a computing architecture in accordance with one embodiment.

In various embodiments, the server device 102 may include various hardware elements, such as a processing circuitry 104, a memory 106, a network interface 108, and a set of platform components 110. The client devices 112 and/or the client devices 116 may include similar hardware elements as those depicted for the server device 102. The server device 102, client devices 112, and client devices 116, and associated hardware elements, are described in more detail with reference to a computing architecture 2200 as depicted in FIG. 22.

Figure 23:
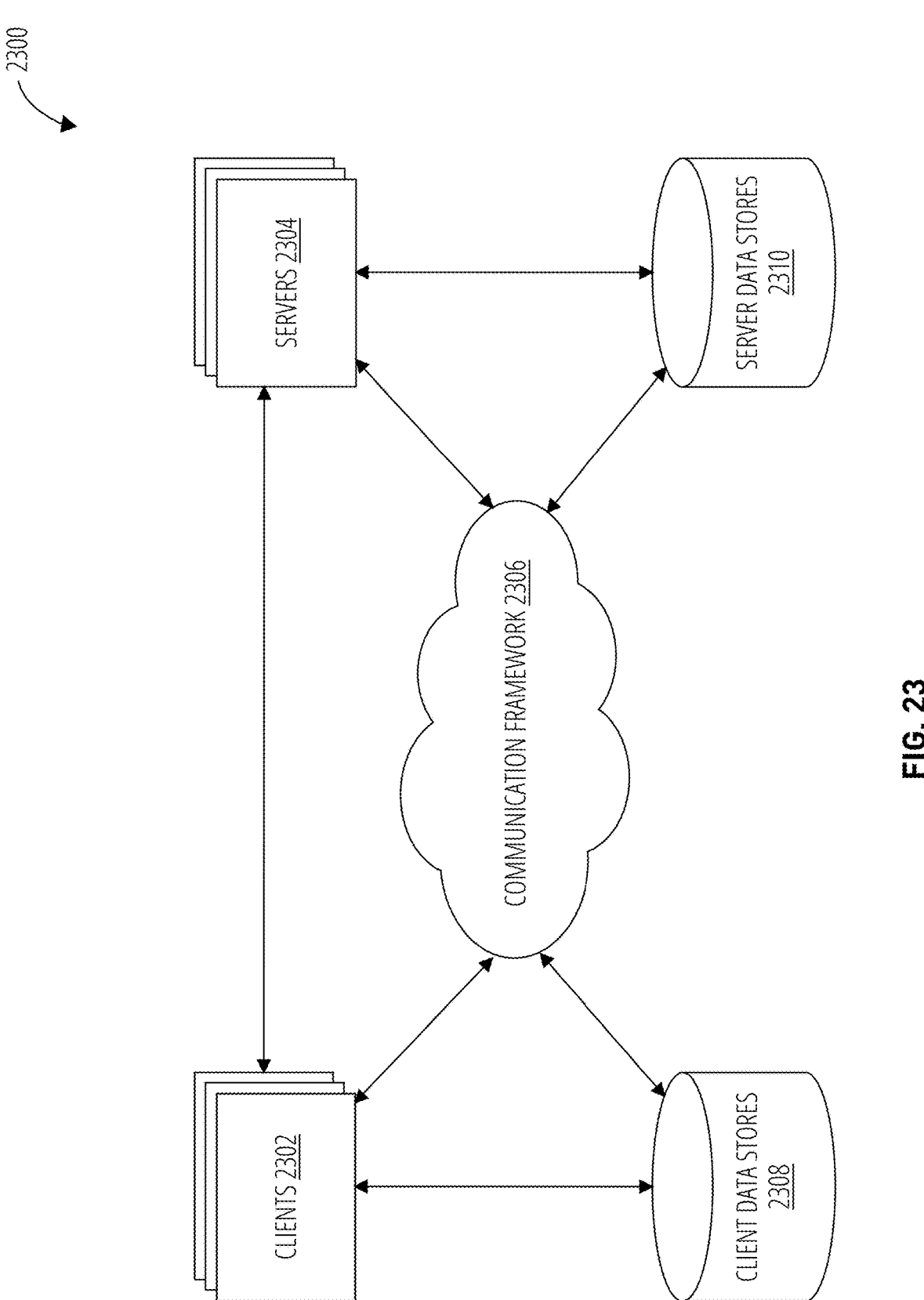
FIG. 23 illustrates a communications architecture in accordance with one embodiment.

In various embodiments, the server devices 102, 112 and/or 116 may communicate various types of electronic information, including control, data and/or content information, via one or both network 114, network 118. The network 114 and the network 118, and associated hardware elements, are described in more detail with reference to a communications architecture 2300 as depicted in FIG. 23.

The memory 106 may store a set of software components, such as computer executable instructions, that when executed by the processing circuitry 104, causes the processing circuitry 104 to implement various operations for an electronic document management platform. As depicted in FIG. 1, for example, the memory 106 may include a document manager 120, a signature manager 122, and a document review engine 142, among other software elements.

The document manager 120 may generally manage a collection of electronic documents stored as document records 136 in the data store 124. The document manager 120 may receive as input a document container 126 for an electronic document. A document container 126 is a file format that allows multiple data types to be embedded into a single file, sometimes referred to as a "wrapper" or "metafile." The document container 126 can include, among other types of information, an electronic document 140 and metadata for the electronic document 140.

A document container 126 may include an electronic document 140. The electronic document 140 may comprise any electronic multimedia content intended to be used in an electronic form. The electronic document 140 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 140 may comprise a PDF created from a Microsoft Word file with one or more work flows developed by Adobe Systems Incorporated, an American multi-national computer software company headquartered in San Jose, California. Embodiments are not limited to this example.

In addition to the electronic document 140, the document container 126 may also include metadata for the electronic document 140. In one embodiment, the metadata may comprise signature tag marker element (STME) information 132 for the electronic document 140. The STME information 128 may include one or more STME 130, which are graphical user interface (GUI) elements superimposed on the electronic document 140. The GUI elements may include textual elements, visual elements, auditory elements, tactile elements, and so forth. In some embodiments, for example, the STME information 128 and STME 130 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields; and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 130 may be utilized for receiving signing information, such as GUI placeholders for approval, checkbox, date signed, signature, social security number, organizational title, and other custom tags in association with the GUI elements contained in the electronic document 140. A client 132 may have used the client device 112 and/or the server device 102 to position one or more signature tag markers over the electronic document 140 with tools applications, and work flows developed by DocuSign or Adobe. For instance, assume the electronic document 140 is a commercial lease associated with STME 130 designed for receiving signing information to memorialize an agreement between a landlord and tenant to lease a parcel of commercial property. In this example, the signing information may include a signature, title, date signed, and other GUI elements.

The document manager 120 may process a document container 126 to generate a document image 138. The document image 138 is a unified or standard file format for an electronic document used by a given EDMP implemented by the system 100. For instance, the system 100 may standardize use of a document image 138 having an Adobe portable document format (PDF), which is typically denoted by a ".pdf" file extension. If the electronic document 140 in the document container 126 is in a non-PDF format, such as a Microsoft Word ".doc" or ".docx" file format, the document manager 120 may convert or transform the file format for the electronic document into the PDF file format. Further, if the document container 126 includes an electronic document 140 stored in an electronic file having a PDF format suitable for rendering on a screen size typically associated with a larger form factor device, such as a monitor for a desktop computer, the document manager 120 may transform the electronic document 140 into a PDF format suitable for rendering on a screen size associated with a smaller form factor device, such as a touch screen for a smart phone. The document manager 120 may transform the electronic document 140 to ensure that it adheres to regulatory requirements for electronic signatures, such as a "what you see is what you sign" (WYSIWYS) property, for example.

The signature manager 122 may generally manage signing operations for an electronic document, such as the document image 138. The signature manager 122 may manage an electronic signature process to send the document image 138 to signers, obtaining electronic signatures, verifying electronic signatures, and recording and storing the electronically signed document image 138. For instance, the signature manager 122 may communicate a document image 138 over the network 118 to one or more client devices 116 for rendering the document image 138. A client 134 may electronically sign the document image 138, and send the signed document image 138 to the server device 102 for verification, recordation, and storage.

Figure 8:
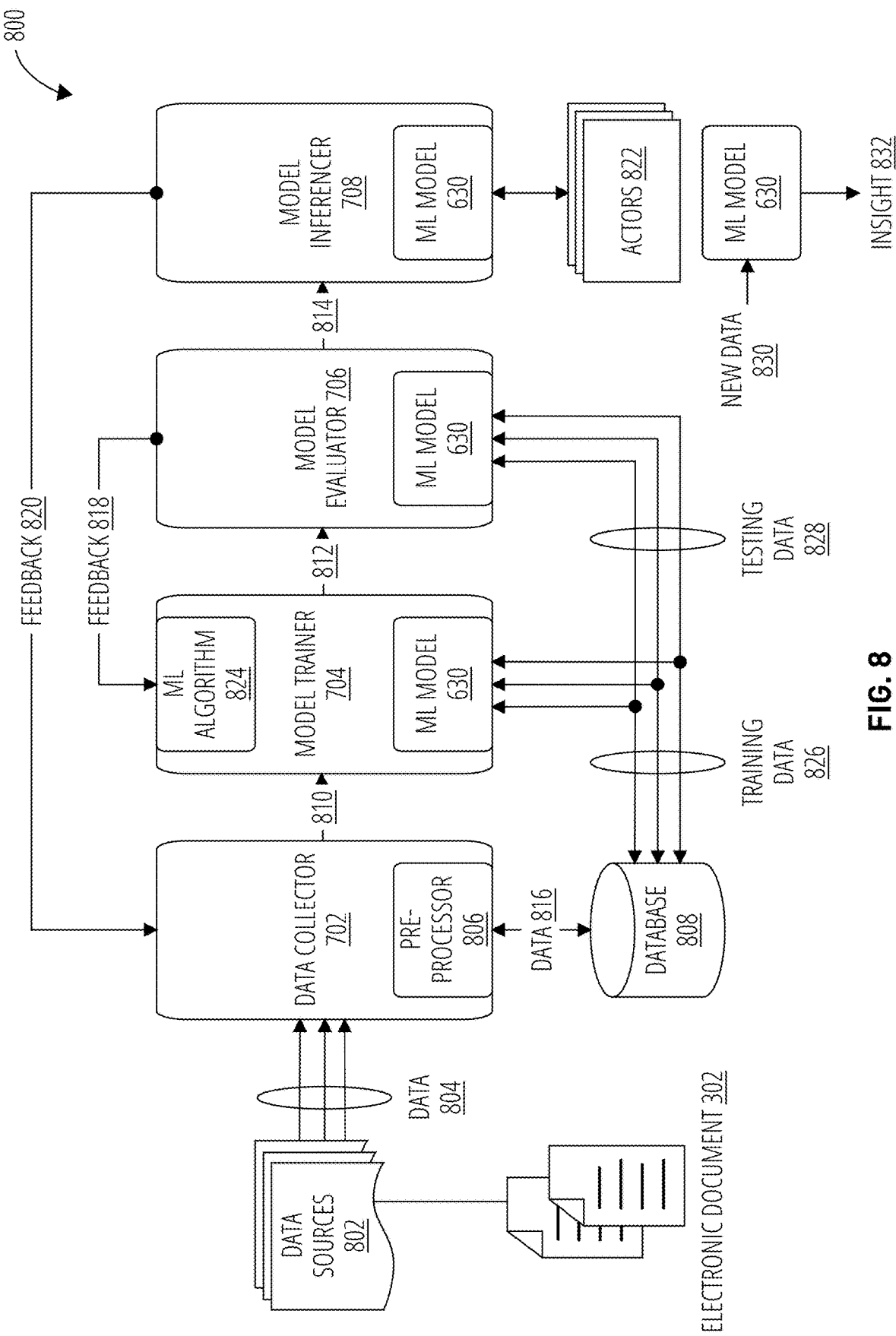
FIG. 8 illustrates an artificial intelligence architecture that may be used by the training device to generate the ML model (e.g., as shown in FIG. 3) for deployment by the inferencing device.

The document review engine 142 may implement and/or manage various artificial intelligence (AI) and machine learning (ML) agents to assist in various operational tasks for the EDMP of the system 100. The AI/ML agents and their operation associated with the document review engine 142, and associated software elements, are described in more detail with reference to an artificial intelligence architecture 800 as depicted in FIG. 8. The document review engine 142, and associated hardware elements, are described in more detail with reference to a computing architecture 2200 as depicted in FIG. 22.

In general operation, assume the server device 102 receives a document container 126 from a client device 112 over the network 114. The server device 102 processes the document container 126 and makes any necessary modifications or transforms as previously described to generate the document image 138. The document image 138 may have a file format of an Adobe PDF denoted by a ".pdf" file extension. The server device 102 sends the document image 138 to a client device 116 over the network 118. The client device 116 renders the document image 138 with the STME 130 in preparation for electronic signing operations to sign the document image 138.

Figure 10:
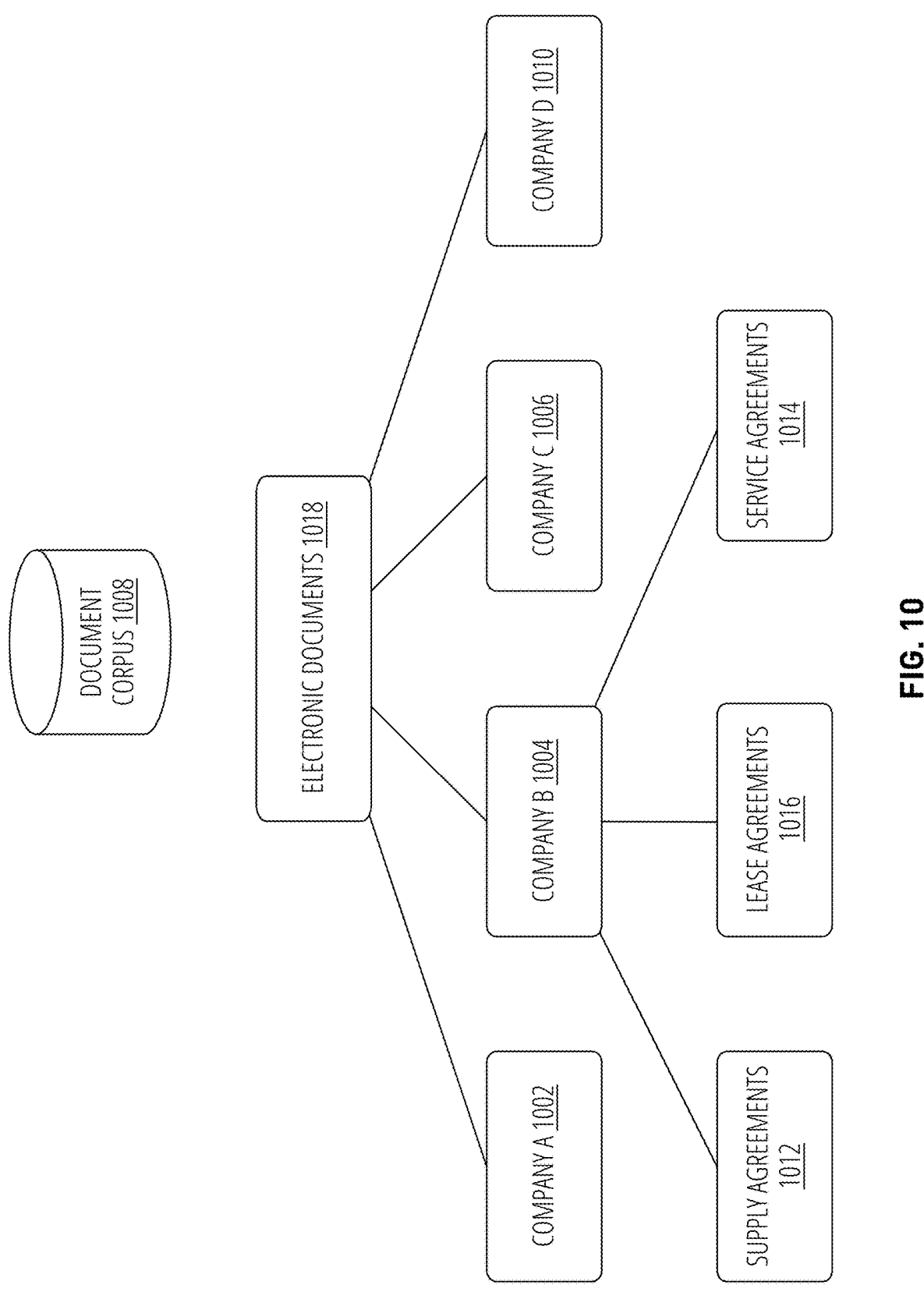
FIG. 10 illustrates a document corpus in accordance with one embodiment.

The document image 138 may further be associated with STME information 128 including one or more STME 130 that were positioned over the document image 138 by the client device 112 and/or the server device 102. The STME 130 may be utilized for receiving signing information (e.g., approval, checkbox, date signed, signature, social security number, organizational title, etc.) in association with the GUI elements contained in the document image 138. For instance, a client 132 may use the client device 112 and/or the server device 102 to position the STME 130 over the electronic documents 1018, as shown in FIG. 10, with tools, applications, and work flows developed by DocuSign. For example, the electronic documents 1018 may be a commercial lease that is associated with one or more or more STME

130 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 132 may use a client device 112 to upload the document container 126, over the network 114, to the server device 102. The document manager 120, at the server device 102, receives and processes the document container 126. The document manager 120 may confirm or transform the electronic document 140 as a document image 138 that is rendered at a client device 116 to display the original PDF image including multiple and varied visual elements. The document manager 120 may generate the visual elements based on separate and distinct input including the STME information 128 and the STME 130 contained in the document container 126. In one embodiment, the PDF input in the form of the electronic document 140 may be received from and generated by one or more work flows developed by Adobe Systems Incorporated. The STME 130 input may be received from and generated by work flows developed by DocuSign. Accordingly, the PDF and the STME 130 are separate and distinct input as they are generated by different workflows provided by different providers.

The document manager 120 may generate the document image 138 for rendering visual elements in the form of text images, table images, STME images and other types of visual elements. The original PDF image information may be generated from the document container 126 including original documents elements included in the electronic document 140 of the document container 126 and the STME information 128 including the STME 130. Other visual elements for rendering images may include an illustration image, a graphic image, a header image, a footer image, a photograph image, and so forth.

The signature manager 122 may communicate the document image 138 over the network 118 to one or more client devices 116 for rendering the document image 138. The client devices 116 may be associated with clients 134, some of which may be signatories or signers targeted for electronically signing the document image 138 from the client 132 of the client device 112. The client device 112 may have utilized various work flows to identify the signers and associated network addresses (e.g., email address, short message service, multimedia message service, chat message, social message, etc.). For example, the client 132 may utilize workflows to identify multiple parties to the lease including bankers, landlord, and tenant. Further, the client 132 may utilize workflows to identify network addresses (e.g., email address) for each of the signers. The signature manager 122 may further be configured by the client 132 whether to communicate the document image 138 in series or parallel. For example, the signature manager 122 may utilize a workflow to configure communication of the document image 138 in series to obtain the signature of the first party before communicating the document image 138, including the signature of the first party, to a second party to obtain the signature of the second party before communicating the document image 138, including the signature of the first and second party to a third party, and so forth. Further for example, the client 132 may utilize workflows to configure communication of the document image 138 in parallel to multiple parties including the first party, second party, third party, and so forth, to obtain the signatures of each of the parties irrespective of any temporal order of their signatures.

The signature manager 122 may communicate the document image 138 to the one or more parties associated with the client devices 116 in a page format. Communicating in page format, by the signature manager 122, ensures that entire pages of the document image 138 are rendered on the client devices 116 throughout the signing process. The page format is utilized by the signature manager 122 to address potential legal requirements for binding a signer. The signature manager 122 utilizes the page format because a signer is only bound to a legal document that the signer is intended to be bound. To satisfy the legal requirement of intent, the signature manager 122 generates PDF image information for rendering the document image 138 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 122 anticipates a possible requirement to show intent in a legal proceeding by generating original PDF image information for rendering the document image 138 in page format. The signature manager 122 presents the document image 138 on a screen of a display device in the same way the signature manager 122 prints the document image 138 on the paper of a printing device.

As previously described, the document manager 120 may process a document container 126 to generate a document image 138 in a standard file format used by the system 100, such as an Adobe PDF, for example. Additionally or alternatively, the document manager 120 may also implement processes and workflows to prepare an electronic document 140 stored in the document container 126. For instance, assume a client 132 uses the client device 112 to prepare an electronic document 140 suitable for receiving an electronic signature, such as the lease agreement in the previous example. The client 132 may use the client device 112 to locally or remotely access document management tools, features, processes and workflows provided by the document manager 120 of the server device 102. The client 132 may prepare the electronic document 140 as a brand new originally-written document, a modification of a previous electronic document, or from a document template with predefined information content. Once prepared, the signature manager 122 may implement electronic signature (c-sign) tools, features, processes and workflows provided by the signature manager 122 of the server device 102 to facilitate electronic signing of the electronic document 140.

In addition, as discussed above, the system 100 may include a document review engine 142. The document review engine 142 may implement a set of tools and/or algorithms to process documents for the purposes of determining presence or absence of certain information contained within certain document portions. The document review engine 142 may be configured to receive one or more documents. The documents may include multimedia information such as text, graphics, images, tables, audio, video, computing code (e.g., source code, etc.) and/or any other type of multimedia information. Further, the documents may be any type of electronic documents, e.g., agreement types, legal document types, non-legal document types, and any combinations thereof. Further, portions of documents and/or documents (e.g., sales agreement) may be associated with other portions of and/or documents (e.g., master services agreement). Document portions may be any size ngram, such as words, sentences, paragraphs, sections, clauses, pages of documents, and/or any predetermined number of characters (e.g., 50 characters, etc.).

The document review engine 142 may pre-process the document, which may include splitting the document into one or more portions (e.g., 50-character portions), sections, segments, blocks, clauses, or other defined structures. Alternatively, or in addition, the document and/or document portions may be converted into a format (e.g., .docx, .xls, .pdf, etc.) that may be more suitable for further processing. Alternatively, or in addition, the engine 142 may process the documents without splitting them into portions and/or conversion into a different format.

The document review engine 142 identifies clauses in a document and analyze the clauses to determine whether a particular clause meets a user-defined rule. A user defines rules through a GUI or in a playbook of rules (e.g., entities, rights, dates, logos, etc.). A private ML model processes the document to identify clauses and it stores the clauses as vectors in a vector database. Logic compares a vectorized rule to the clause vectors to find a top K set of similar vectors (e.g., using cosine similarity). The logic sends a first request with the top K set of similar vectors to a generative AI model, such as ChatGPT, along with a set of examples for the vectorized rule. The generative AI model selects a single clause vector from the top K set, in an iterative process. The logic sends a second request with the single clause vector, the vectorized rule, and a query to the generative AI model. The generative AI model outputs a result based on the query. In one case, the query could be whether there is a match between the clause vector and vectorized rule. In another case, the query could be a request to analyze the single clause vector in view of the vectorized rule and generate an answer based on the analysis.

To determine presence of a particular clause, the document review engine 142 provides or implements a ML platform to identify/create clauses for storage in a repository. A purpose of the ML platform is to determine whether a clause in an agreement is standard (e.g., out of 30 stored standard clauses) or not. To do so, the platform performs initial processing (e.g., OCR) of an ingested or stored document and splits the document (using private tokenizer model) into clauses to generate a list of clauses. Each clause is then vectorized/embedded (e.g., using an embedding model) so that a list of vectorized/embedded clauses is generated. Vectorized/embedded clauses are compared to a list of standard clauses stored a database (stored in vectorized/embedded form). A cosine similarity is performed to determine whether clauses from the document are standard or not. A threshold may be used to determine whether a clause in the document is sufficiently similar to the one stored in the database. This may be useful in determining whether a particular agreement used specific clauses that may be standard for a particular user. User has an option to create a standard clause by highlighting specific language in the document and requesting the platform to create a standard clause and store it in the repository along with the other standard clauses. The tokenizer model is used to identify clauses in a document. The model is a conditional random field (CRF) model that, for its training, receives a list of regular expressions (codified) and manually human-labeled text, and outputs a list of labels identifying clauses (e.g., "begin section title", "inside section title").

To determine presence of a particular element (e.g., an entity, right, date, etc.), the user defines a query that specifies information that the user is looking for (e.g., "does the agreement specify a right to use a logo?"). Various UIs with fields are used to define the query. The platform then retrieves a stored agreement document and extracts agreement clauses. An embedding model is used to vectorize each clause. Vectorized clauses are compared against the query parameters (also vectorized) using a similarity algorithm (e.g., cosine similarity) to determine possible matches. Top number of matches (e.g., 10) are then selected along with query and provided to a GPT model (or any other model). The GPT model outputs a response to the query indicating whether or not a particular element is present. The user can view where in the agreement the element was found. The GPT model outputs a single response (e.g., "yes, the agreement defines right to use a logo.") from the top number of matches. If the GPT model cannot find the requested element, a call to a vision ML model (e.g., GPT-4 Turbo) is used to perform visual analysis of the document (e.g., visual analysis). If after this analysis, the information is found, a GUI is generated indicating presence/absence of an element in response to user-defined query.

More particularly, the document review engine 142 may use a machine learning model to also receive one or more playbooks, rules, and/or custom rules that may be associated with processing of electronic documents. For example, the document review engine 142 may receive a custom rule relating to products or services offered by Company B, may state "What are the products and/or services offered by Company B to Company A?". In this case, a response is a summary of the products and/or services defined in the lease agreement. The document review engine 142 may receive any number of playbooks, rules, etc.

Once the document portions and rules are received, the document review engine 142 may be configured to generate, using an embedding model, one or more vectorized versions of each of the document portions and the rules. The vectorized document portions and the rules may then be compared by the document review engine 142. The document review engine 142 may, for example, use cosine similarity to perform comparison. The comparison may yield one or more possible matches between document portions and the rules. The matches may be ranked and/or scored based on the extent of similarity between the document portions and the rule. For example, "Company A offers Company B services A, B, and C", "This agreement defines services A-C and products D-F in the State of California", "This agreement is to define certain services as listed in Exhibit A", etc. may be considered to be matching the rule of "What are the products and/or services offered by Company B to Company A?" As can be understood, the matching might not be precise (e.g., word-for-word matching), and instead, may be approximate (e.g., some words in portions matching some words in the rule).

The document review engine 142 may then provide the top matches to a ML model (e.g., a generative AI model, a large language model, and/or any other type of machine learning model). The ML model may have been trained or fine-tuned using one or more examples that the document review engine 142 may have provided to the ML model. For instance, the examples may include variations of previous clauses from other electronic documents defining services for different industries, sectors, regions, languages, and so forth. Once the ML model is trained, the document review engine 142 may request the ML model to identify one or more and/or a single most relevant match (e.g., highest scoring match, highest ranked match, etc.), between the vectorized document portion(s) and the vectorized rule(s).

As can be understood, the match may be any match that the ML model determines to be most relevant and it might not be the highest ranking and/or scoring match. The ML model may then output the most relevant match.

The document review engine 142 may receive the most relevant match and request the ML model (which may be the same and/or different ML model that identified the most relevant match) to determine presence of the most relevant match in the electronic document. In some embodiments, the ML model may be further trained and/or fine-tuned with additional examples to ensure that a more precise answer is generated. If the most relevant match is present in the document, the document review engine 142 may be configured to generate a graphical user interface displaying an indication that the most relevant match is included in the electronic document. The document review engine 142 may also display the most relevant match in the graphical user interface. If the ML model determines that the most relevant match is not included in the document, or there is no match in the document, the document review engine 142 may be configured to request a visual ML model to analyze an image of the electronic document to find a match. If the visual ML model finds a match in the image of the electronic document, the document review engine 142 may display an indication that the most relevant match is included in the electronic document. If the visual ML model does not find a match in the image of the electronic document, it generates one or more explanations and/or comments describing the absence of a match. The explanations may be tailored to different users.

Figure 2A:
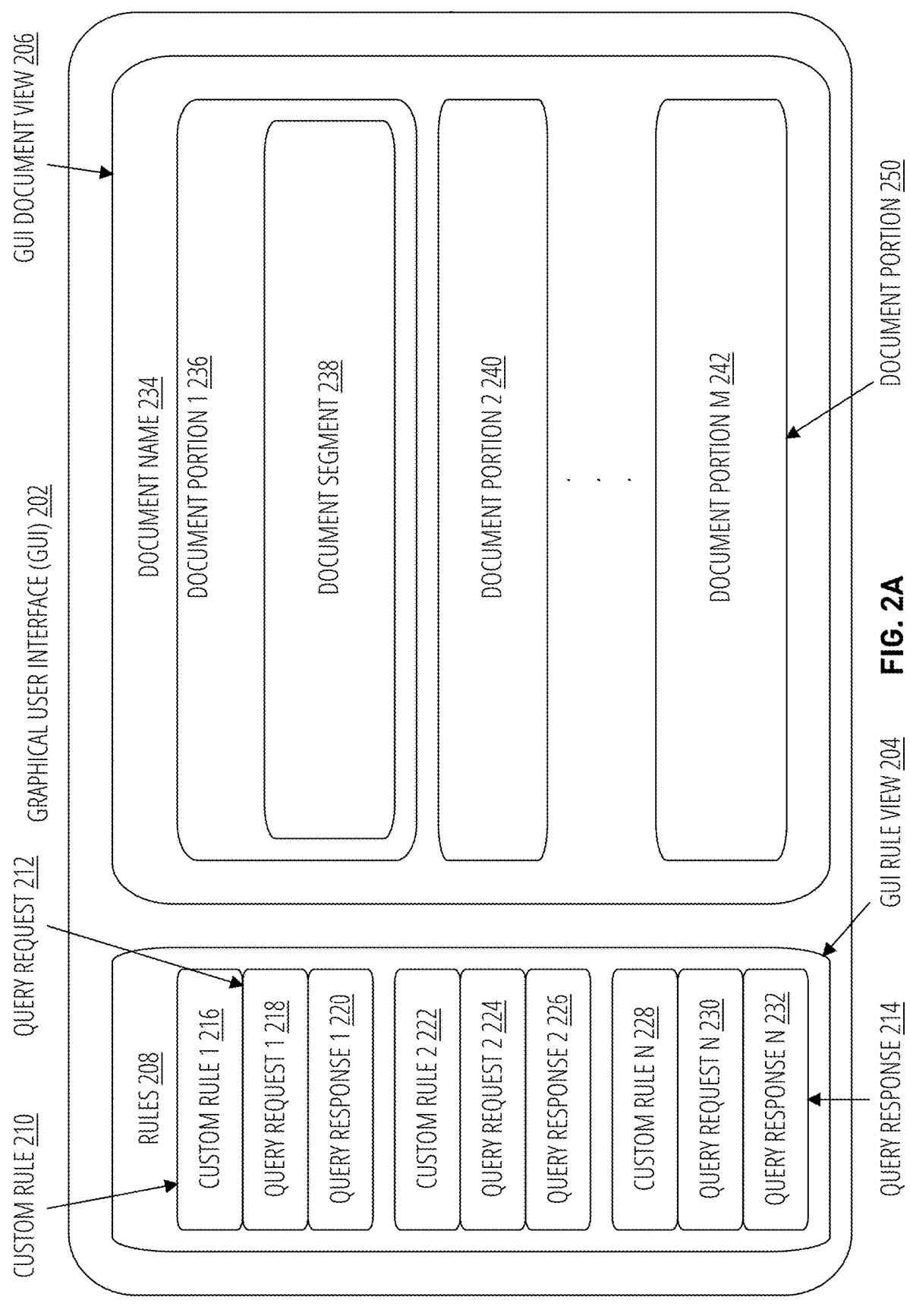
FIG. 2A illustrates a graphical user interface (GUI) view in accordance with one embodiment.

FIG. 2A illustrates a GUI 202 suitable for use with the system 100 in general and the document review engine 142 in particular. As illustrated in FIG. 2A, the GUI 202 displays various GUI elements for presenting information on an electronic display of an electronic device for consumption by a user, such as clients 132 and/or clients 134. The GUI elements may also receive input from a user via various input/output (I/O) devices, such as a keyboard, mouse, touchpad, touchscreen, voice commands, and so forth.

The GUI 202 may present a GUI rule view 204. The GUI rule view 204 presents GUI elements for a defining a custom rule 210 for the document review engine 142. Each custom rule 210 may comprise attributes or properties such as a query request 212 and a query response 214. A query request 212 is a request written in an NLP format suitable for input and analysis by a ML model, such as a generative AI model such as ChatGPT, to make a prediction, inference, suggestion, or otherwise generate a query response 214 to the query request 212. An example of a query request 212 is "What are the products and/or services offered by Company B to Company A?" A query response 214 is output from the ML model answering the query request 212. An example of a query response 214 to the query request 212 is "Company A offers Company B services A, B, and C."

The GUI rule view 204 may present one or more custom rules 210, such as custom rule 1 216, custom rule 2 222, and custom rule N 228, where N represents any positive integer. Each custom rule 210 may define or be associated with a query request 212. For example, the custom rule 1 216 comprises query request 1 218, the custom rule 2 222 comprises query request 2 224, and the custom rule N 228 comprises query request N 230. Each custom rule 210 is further associated with a query response 214. For example, the custom rule 1 216 is associated with query response 1 220, custom rule 2 222 is associated with query response 2 226, and custom rule N 228 is associated with query response N 232.

The GUI 202 further comprises a GUI document view 206. The GUI document view 206 presents various portions of an electronic document 140. For example, the GUI document view 206 presents a document name 234 and a set of document portions 250, such as document portion 1 236, document portion 2 240, and document portion M 242, where M represents any positive integer. In some cases, a document portion 250 may include one or more document segments 238. For example, a document portion 250 may comprise a set of information (e.g., text information) from the electronic document 140, such as a paragraph, a clause, a section, multiple sentences, a page, and other tokenized part of the electronic document 140. A document segment 238 may comprise, for example, a subset of information from a document portion 250, such as one or more sentences, sentence fragments, words, and so forth.

The document review engine 142 may apply the custom rules 210 to the electronic document 140 in order to generate a query response 214 to a query request 212 for a given custom rule 210. In addition to generating the query response 214, the document review engine 142 may present various document portions 250 that are sources of information used to generate the query response 214. A user may select a query response and the GUI document view 206 will present a document portion 250 and/or a document segment 238 for a document portion 250 with the information used to derive the query response 214 in a dynamic manner.

Figure 2B:
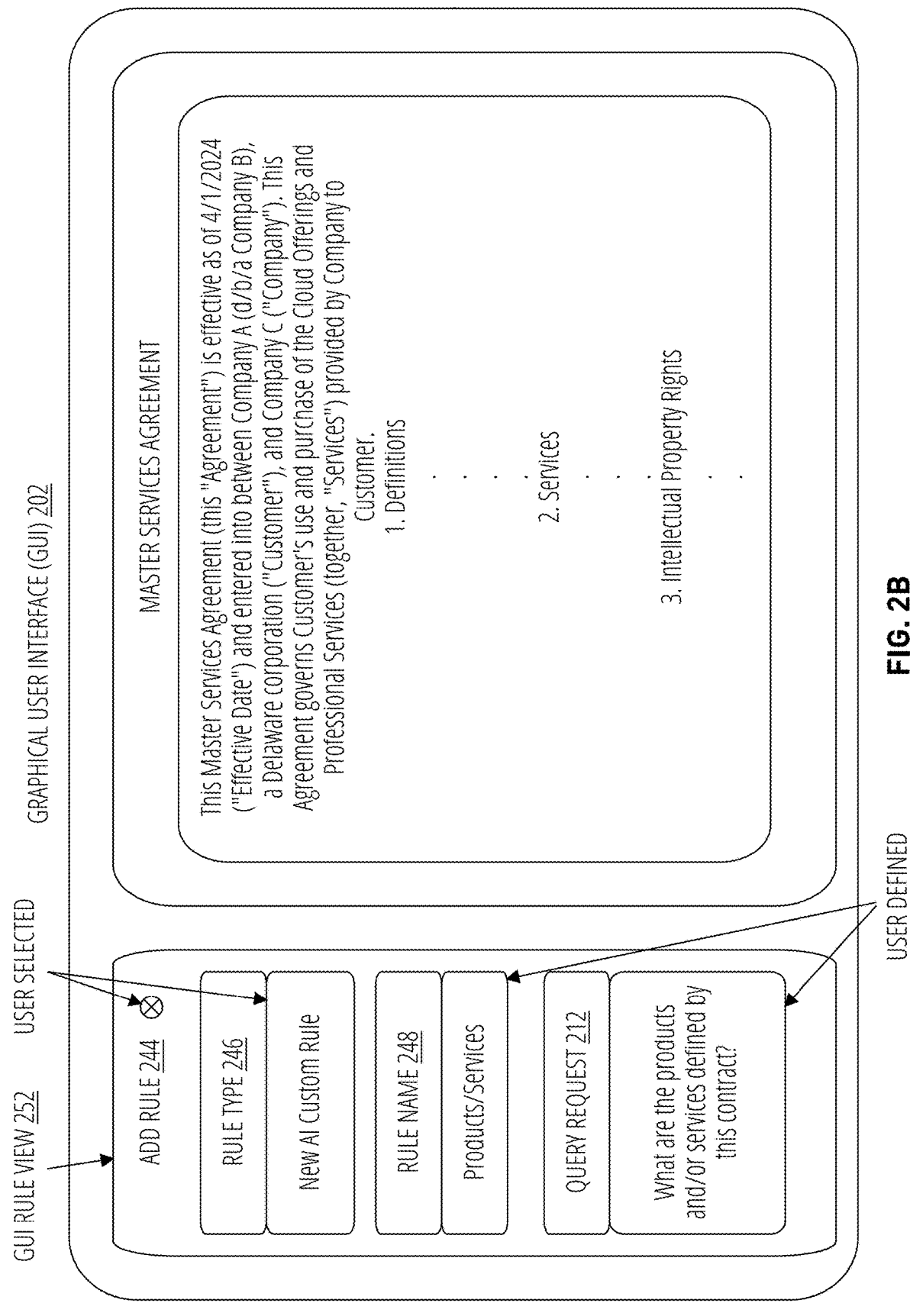
FIG. 2B illustrates a GUI view in accordance with one embodiment.

FIG. 2B illustrates the GUI 202 with a GUI rule view 252 to add a custom rule 210 to a rule set for use by the document review engine 142. FIG. B also illustrates an example of the GUI document view 206 presenting document portions 250 of an electronic document 140.

The GUI 202 may present configurable GUI elements that a user may interact with to define a new custom rule 210. For example, a GUI rule view 252 may present an add rule 244 with an icon to start a workflow that allows a user to define a new custom rule 210. When a user clicks on the icon, the add rule 244 workflow presents GUI elements such as rule type 246, a rule name 248, and a query request 212. The rule type 246 presents a drop down menu of possible rule types for a custom rule 210, such as an AI-Extracted Field, System Field, Existing Custom Field, New Custom Field, New AI Custom Field, and so forth. The rule type 246 may be a sub-grouping of a Field Group, such as General, Lifecycle, Financial, and so forth. In this example, the user selects a rule type 246 from the drop down menu of New AI Custom Rule. The user defines a name for the document portion 250 in a GUI element. The user also defines a query request 212 for the document portion 250 in a GUI element.

For example, assume the user wants the document review engine 142 to review and analyze an electronic document 140 such as a master services agreement (MSA) between Company A and Company B to find all the products and services offered by Company A to Company B. In this case, the user defines a new custom rule 210 with a rule type 246 of "New AI Custom Rule", a rule name 248 of "Products/ Services", and a query request 212 "What are the products and/or services offered by Company B to Company A?". The document review engine 142 applies to the custom rule 210 to the electronic document 140 to review and analyze the electronic document 140 using the query request 212 in order to generate a query response 214 to the query request 212. In this example, the document review engine 142 reviews and analyzes the MSA between Company A and Company B for any products and/or services defined in the MSA, and it provides a summary of the products and/or services defined in the MSA agreement.

FIG. 2C illustrates an example of the GUI 202 presenting various custom rules 210 used as input to the document review engine 142 to generate output for presentation on the GUI 202.

As depicted in FIG. 2C, the GUI rule view 204 illustrates 3 different custom rules 210 and the GUI document view 206 presents document portions 250 associated with the custom rules 210. A first custom rule 1 216 has a rule name 248 of "Counterparty" and displays a query response 214 of "Companies A, B, and C." The GUI document view 206 displays a document portion 1 236 and document segment 238 which is a part of the electronic document 140 from which the document review engine 142 sources or derives the query response 214, which in this case is in Section 1 of the MSA. A second custom rule 2 222 has a rule name 248 of "Products/Services" and displays a query response 214 of "Services C, D, E." The GUI document view 206 displays a document portion 2 240 and document segment 238 which is a part of the electronic document 140 from which the document review engine 142 sources or derives the query response 214, which in this case is a portion of Exhibit A of the MSA. A third custom rule N 228 has a rule name 248 of "Custom Logo Rights" and a query response N 232 of "Yes". The GUI document view 206 displays a document portion 2 240 and document segment 238 which is a part of the electronic document 140 from which the document review engine 142 sources or derives the query response 214, which in this case is an IP clause of the MSA. Embodiments are not limited to these examples.

Figure 3:
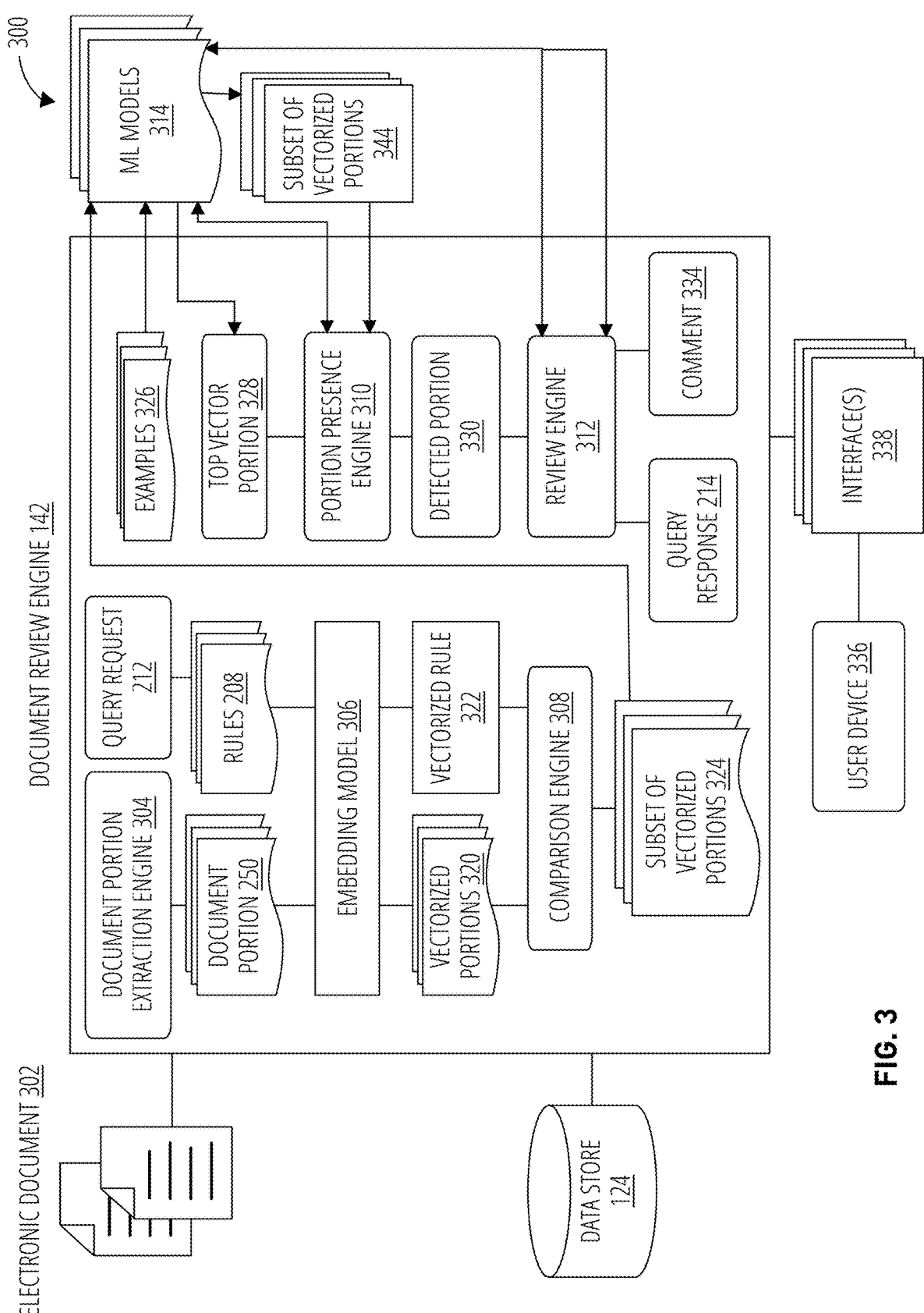
FIG. 3 illustrates a system in accordance with one embodiment.

FIG. 3 illustrates a system 300. The system 300 is an example of an AI system and ML platform suitable for implementing portions of the document review engine 142 according to some embodiments of the current subject matter.

Generally, one or more components of the system 300 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, one or more components of the system 300 may include any combination of hardware and/or software. In some embodiments, one or more components of the system may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example embodiments, one or more components of the system may be disposed on a single computing device and/or may be part of a single communications network. Alternatively, or in addition to, such devices may be separately located from one another. A device may be a computing processor, a memory, a software functionality, a routine, a procedure, a call, and/or any combination thereof that may be configured to execute a particular function associated with interface and/or document certification processes disclosed herein.

In some embodiments, one or more components of the system 300 may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system also may be mobile computing devices, for example, an iPhone, iPod, iPad from Apple® and/or any other suitable device running Apple's iOS® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 300 may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the interface and/or document certification functions described herein. One or more components of the system may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some example embodiments, one or more components of the system 300 may execute one or more applications, such as software applications or network applications, that enable, for example, network communications with one or more components of system and transmit and/or receive data.

One or more components of the system 300 may include and/or be in communication with one or more servers via one or more networks and may operate as a respective front-end to back-end pair with one or more servers. One or more components of the system may transmit, for example from a mobile device application (e.g., executing on one or more user devices, components, etc.), one or more requests to one or more servers. The requests may be associated with retrieving data from servers (e.g., retrieving one or more electronic documents from one or more document storage sources that may store electronic document 302). The servers may receive the requests from the components of the system. Based on the requests, servers may be configured to retrieve the requested data from one or more storage locations. Based on receipt of the requested data from the databases, the servers may be configured to transmit the received data to one or more components of the system, where the received data may be responsive to one or more requests.

The system 300 may include one or more networks, such as, for example, networks that may be communicatively coupling the document review engine 142, the data storage location 340 (e.g., storing electronic document 302), and/or any other computing components. In some embodiments, networks may be one or more of a wireless network, a wired network or any combination of wireless network and wired network and may be configured to connect the components of the system and/or the components of the system to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 802.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system 300 may include one or more servers, which may include one or more processors that may be coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system.

Further, one or more components of the system 300 may be configured to execute one or more actions using one or more containers. In some embodiments, each action may be executed using its own container. A container may refer to a standard unit of software that may be configured to include the code that may be needed to execute the action along with all its dependencies. This may allow execution of actions to run quickly and reliably.

In some embodiments, the electronic document 302 that may be processed by the system 300 for the purposes of determining presence of particular document portions (e.g., a sentence, a paragraph, a clause, a section, etc.) may be received electronically (e.g., via email, SMS, etc.) and/or stored in various data storages. For example, some data storage locations 340 may be configured to be one or more private databases, access to which might not be publicly available (e.g., internal company databases, specific user access databases, etc.). The electronic document 302 stored in these databases may be organized in a predetermined fashion, which may allow case of access to the electronic documents and/or any portions thereof. For example, electronic document 302 stored in these databases may be labeled, searchable, and/or otherwise, easily identifiable. The documents may be stored in a particular electronic format (e.g., PDF, .docx, etc.). The electronic document 302 may be structured and/or unstructured.

Other data storage sources may be configured to be public non-government databases, government databases (e.g., SEC-EDGAR, etc.), etc. and may store various electronic documents, such as, for example, legal documents (e.g., commercial contracts, lease agreements, public disclosures (e.g., 10k statements, 5k statements, quarterly reports, etc.)), non-legal documents (e.g., articles, books, etc.). The electronic document 302 stored in these databases may be identified using various identifiers, which may allow location of these documents in the databases, however, contents of electronic documents stored therein might not be parsed and/or specifically identified. For example, a review of the entire electronic document (e.g., 10k statement of a company stored in SEC-EDGAR database) may need to be performed to identify a particular section (e.g., a section related to compensation of executives for the company).

Specifically, as depicted in FIG. 3, the document review engine 142 may include a document portion extraction engine 304, an embedding model 306, a comparison engine 308, a portion presence engine 310, and a review engine 312. The document review engine 142 may also be communicatively coupled to one or more user devices 336 that may display one or more interface(s) 338, such as GUI 202. The document review engine 142 may also implement one or more ML models 314.

The system 300 is an example of an AI system suitable for implementing a ML platform hosting a number of ML models 314 trained for performing accurate review, analysis, and/or search for information in electronic documents 302, where such processes may be executed in accordance with one or more rules 208, such as one or more custom rules 210. A custom rule 210 includes a query request 212. These processes may be executed on a stored electronic document 302, such as an electronic document 302 from a corpus of electronic documents 302 (e.g., electronic document 140, signed electronic document 140) stored in the data store 124, to analyze information in the electronic document 302 to generate a query response 214 to the query request 212 for the custom rule 210. Additionally, or alternatively, these processes may also be executed in real-time, such as, for example, during agreement negotiations as described with reference to FIG. 1.

In operation, one or more electronic documents 302 may be supplied to the document review engine 142. As stated above, the documents may be any type of documents, such as, for example, agreements, applications, websites, video files, audio files, text files, images, graphics, tables, spreadsheets, computer programs, etc. The documents may be in any desired format, e.g., .pdf, .docx, .xls, and/or any other type of format. The documents may also have any desired size. Moreover, the documents may be organized in any desired fashion. In some examples, documents may be nested within other documents (e.g., one document embedded in another document), one document may be linked to another document, one document may refer to another document, and other document configurations.

In some embodiments, electronic documents 302 may include one or more portions. Examples of such portions may include pages, headings, sub-headings, sections, paragraphs, sentences, tables, images, parties, conditions, terms, specific descriptions, and/or any other type of portions. One or more portions may also be associated and/or assigned one or more functions (e.g., a document title, a text heading, a text paragraph, etc.). The electronic document 302 may be structured in a particular way (e.g., an application for an automobile insurance that may include sections seeking various information from applicants; a lease agreement that may include a section identifying parties, a section identifying leased premises, a section describing rent being paid, etc.). The electronic document 302 may also be unstructured.

Optionally, upon receiving electronic document 302, the document review engine 142 may be configured to perform some initial processing of the documents, e.g., execute optical character recognition, export to a different format (e.g., .pdf to .docx), determine any metadata associated with the document, and/or execute any other functions, etc. Alternatively, or in addition, the document review engine 142 may be configured to convert the documents into a predetermined format, e.g., from .pdf to .docx, .xls, etc.

Upon receiving and/or processing the electronic document 302, the document portion extraction engine 304 may be configured to extract one or more document portions 316 from the document 302. The document portions may be extracted using a predetermined number of characters (e.g., 50 characters), and/or based on identification of specific parts of the document, e.g., sentences, paragraphs, sections, pages, etc.

The document portion extraction engine 304 may also be configured to identify and/or select one or more specific rules 208 that may be related to the specific document portions that have been selected by the document portion extraction engine 304. In one embodiment, for example, the rules 208 comprise one or more custom rules 210. For instance, in a master services agreement (MSA) between a Company A and a Company B, a custom rule 210 relating to products or services offered by Company B, may state "What are the products and/or services offered by Company B to Company A?". In this case, a response is a summary of the products and/or services defined in the MSA agreement. As can be understood, any other rules may be used. The rules may be used by the document portion extraction engine 304 to extract only the document portions that may be related to a subject matter of the rule (e.g., services portions, etc.), specific location within the document (e.g., page 10 of the agreement, etc.), particular type of document portion (e.g., sentence, paragraph, etc.), etc. Alternatively, or in addition, the document portion extraction engine 304 may extract all document portions from the electronic document 302 for comparison to one or more rule(s) 318, regardless of specific size, location, type, etc. In some embodiments, the rules 208 may be retrieved from data storage location 340 and/or generated by the document review engine 142 in real time, for example, upon receiving an appropriate query request 212 from a custom rule 210 as defined by the user (e.g., "What are the products and/or services offered by Company B to Company A?"). The generated rules may likewise be stored in data storage location 340.

As previous described, a rule may comprise text information (e.g., words, sentences, paragraphs, etc.) expressed in a natural language, such as a human language, suitable for natural language processing (NLP) by an NLP layer of an AI system, such as system 300. A rule may be expressed as varying types of sentences, such as an imperative sentence (e.g., commands/requests), interrogative sentences (e.g., questions/queries), declarative sentences (e.g., statements about facts, opinions, beliefs, observations, information, etc.), conditional sentences (e.g., if/then statements), or combinations thereof. The rules 208 may comprise a predefined rule stored in a playbook or a custom rule 210 generated by a user and received from a GUI 202 of an electronic device in real-time, such as client devices 112 and/or client devices 116.

The document review engine 142 may access the rules 208 that may be predefined and/or dynamically generated in real-time for the purposes of analyzing the electronic document 140. In some embodiments, the document review engine 142 may use the embedding model 306 to vectorize one or more of the rules 208 to generate one or more vectorized rules 322. For the case of discussion herein, a reference will be made to a single rule and/or a single vectorized rule. However, the document review engine 142 may process multiple rules 208 for multiple electronic documents 302 using various parallel processing techniques, such as executing multiple parallel processing threads for multiple cores of a processor or processing circuitry.

An example of a rule stored as part of rules 208 includes a custom rule 210 as previously described with reference to FIGS. 2A-2C. The document review engine 142 may select and use a custom rule 210 to detect and/or determine presence of text in an electronic document 140 that may be matching to a query request 212 for the custom rule 210. The document review engine 142 may generate a query response 214 (e.g., a comment or explanation) in response to the query request 212 of the custom rule 210 for display by a GUI 202. For instance, assume a custom rule 210 is defined by a user expressed as an interrogative natural language sentence requesting a summary of information or a search for information contained within an electronic document 302. For instance, in a master services agreement (MSA) between a Company A and a Company B, a custom rule 1 216 relating to products or services offered by Company B, may have a query request 1 218 that states "What are the products and/or services offered by Company B to Company A?". In this case, the document review engine 142 generates a query response 1 220 comprising a natural language summary of the products and/or services defined in the MSA agreement. In some cases, a custom rule 210 is an interrogative sentence defined by a user requesting a presence or absence of information or content contained within an electronic document 302. For example, in a sales agreement for Company C, a custom rule 2 222 relating to sales tax of an automobile, may have a query request 2 224 that states "Is there sales tax included in the final price of the car?". In this case, a query response 2 226 comprises a comment such as a binary "yes" or a "no" in response to a match or not match between the custom rule 2 222 and a document portion 2 240 of an electronic document 302. In some cases, a custom rule 210 is an interrogative sentence defined by a user requesting an analysis of information or content contained within an electronic document 140. For example, in a licensing agreement between Company D and Company E, a custom rule N 228 relating to intellectual property (IP) rights of a logo, may have a query request N 230 that states "Does Company D have logo rights from Company E?". In this case, a query response N 232 is a comment such as a binary "yes" or a "no" in response to analysis of a match between the custom rule N 228 and a document portion 250 of the electronic document 302. Embodiments are not limited to these examples.

In some embodiments, an electronic document 302 may be received and/or ingested by the document review engine 142 implementing an ML platform comprising one or more ML models 314. The ML models 314 may be part of the document review engine 142 or accessible by the document review engine 142 via a set of application program interfaces (APIs). The document review engine 142 may use an ML model to analyze the electronic document 302 and extract one or more document portions 250 from the electronic document 302. The document portions document portions 250 may, for example, include, but are not limited to, a text, an image, a graphic, a video, an audio, a clause in the electronic document 302, a sentence in the electronic document 302, a paragraph in the electronic document 302, a predetermined number of characters (e.g., 50 alpha-numeric characters and/or any other characters) in the electronic document 302, and any combination thereof.

An embedding model 306 may vectorize the document portions 250 to form one or more vectors or embeddings that represent a sequence of words in the extracted portions. A vector refers to numerical data points that represent features or attributes of objects such as images, text, audio, etc. An embedding is a dense, low-dimensional vector that represents high-level concepts such as words or phrases in a continuous vector space. An embedding captures semantic relationships between elements by mapping them to points within the embedding space based on their similarity or association with other elements. As used herein, any reference to vectors or vectorization can be equally applied to embeddings. In one embodiment, for example, the embedding model 306 receives the document portions 250 and converts the document portions 250 into vectorized portions 320. Similarly, the embedding model 306 also receives a custom rule 210 from the rules 208, and it converts the custom rule 210 into a vectorized rule 322.

Once the document portions 250 are extracted from electronic document 302 and a custom rule 210 is selected, identified, and/or generated, the document portion extraction engine 304 may be configured to apply an embedding model 306 to the document portions 250 and custom rule 210. Application of the embedding model 306 to the document portions 316 may result in generation of one or more vectorized portions 320. Similarly, application of the embedding model 306 to the custom rule 210 may result in generation of a vectorized rule 322. The document portion extraction engine 304 may perform vectorizations of the document portions 250 and/or custom rule 210 using any known techniques.

The vectorized portions 320 and vectorized rule 322 may then be provided to the comparison engine 308. The comparison engine 308 may compare the vectorized portions 320 and vectorized rule 322 to one or another to determine one or more possible matches. The comparison engine 308 may use cosine similarity to perform comparison of the vectorized portions 320 and the vectorized rule 322. As can be understood, any other comparison mechanism may be used to compare the vectorized document portions and rules. The comparison may yield one or more subset of vectorized portions 324 between the vectorized portions 320 and the vectorized rule 322. For example, the above custom rule 210 relating to products or services may match to, for example, "Company B offers tier one data storage for electronic documents", "The services offered to Company A by Company B is tier one data storage for electronic documents", etc. Once the subset of vectorized portions 324 are determined, the engine 308 may, optionally, be configured to generate one or more scores that may be indicative of a similarity between the vectorized portions 320 and vectorized rule 322 and/or rank each of the determined subset of vectorized portions 324 based on level of similarity between the vectorized portions 320 and vectorized rule 322. The subset of vectorized portions 324 may then be provided to one or more ML models 314 for identification of one or more or a single top match(es).

More particularly, a comparison engine 308 receives as input the vectorized portions 320 from the electronic document 302 and the vectorized rule 322 of the 210. It uses an ML model from the ML models 314 to compare each of the vectorized portions 320 to the vectorized rule 322 determine one or more matches. For example, the ML model may generate a similarity score (e.g., using cosine similarity) for each pair of a vectorized portion and the vectorized rule 322 to form a candidate matching pair. The comparison engine 308 may score the candidate matching pairs using cosine similarity (or some other similarity technique) to generate a similarity score for each of the candidate matching pairs. As can be understood, any other comparison mechanism may be used to compare the vectorized portions 320 and vectorized rule 322. The comparison may yield one or more candidate matching pairs. A candidate matching pair indicates a vectorized portion from the vectorized portions 320 is similar to the vectorized rule 322 using a similarity measure.

The candidate matching pair may comprise an exact match or a partial match based on a similarity score. For example, an exact match may have a similarity score of 100%, while a partial match may have a similarity score lower than 100%, as defined using a defined threshold value (e.g., 95%, 90%, 85%, etc.). For example, the above custom rule 210 relating to products or services may match to, for example, a vectorized portion containing information such as "Company B offers tier one data storage for electronic documents", "The services offered to Company A by Company B is tier one data storage for electronic documents", and so forth. In some example, non-limiting embodiments, each match may be configured to be scored and/or ranked based on level of similarity between the vectorized rules and portions. For example, the comparison engine 308 may utilize a ranking algorithm to rank the candidate matching pairs based on ranking criteria, such as similarity scores, and output a set of ranked candidate matching pairs. The comparison engine 308 outputs a subset of vectorized portions 324 from the set of vectorized portions 320 based on a threshold value, such as a top number of matches (e.g., top 10 matches), a top percentage of matches (e.g., top 5% of ranked candidate matching pairs), a similarity score compared to a defined threshold value (e.g., all candidate matching pairs with a similarity score of ≥90%), or some other selection criteria.

In some embodiments, the document review engine 142 may also identify, select, retrieve, and/or generate one or more examples 326 of document portion 250 that previously matched a given custom rule 210. The examples 326 comprise labeled training data for supervised learning, such as one-shot or few-shot learning by the ML model. The examples 326 may be existing, standard, and/or previously used text portions in electronic documents (e.g., electronic document 140, signed electronic documents 140, etc.) stored in the data store 124. Such examples 326 may be stored in and retrieved from a storage location, such as data store 124, and/or dynamically generated. The document review engine 142 may then provide the examples 326 to a ML model of the ML models 314 for training and/or fine-tuning purposes. The ML model may be a generative AI model, a LLM, a transformer model, and any other type of machine learning model, and/or any combination of models. The generative AI model may be a private ML model trained on private training data stored in the data store 124, or a public ML model (e.g., GPT, ChatGPT, Bard, DALL-E, Midjourney, DeepMind, etc.) trained on public training data stored in public databases. Any number of examples may be provided to the ML model for training. In the above MSA example, the examples may include "Company B offers tier one data storage for electronic documents", "The services offered to Company A by Company B is tier one data storage for electronic documents", and so forth. The examples 326 assist the ML model to find matches between portions of an electronic document 302 and a custom rule 210 applied to the electronic document 302. The ML model receives the examples 326, and it performs training and/or fine-tuning based on the examples 326.

In some embodiments, the document review engine 142 may generate a set of instructions for the ML model. For example, the instructions may comprise NLP instructions written in a human language. The NLP instructions guide the ML model to process the examples 326, the subset of vectorized portions 324, and the vectorized rule 322, to obtain a second subset of vectorized portions 344.

Once trained/fine-tuned, the document review engine 142 may be configured to provide the subset of vectorized portions 324 and instruct the ML models 314 to identify one or more and/or a single most relevant top vector portion 328 from subset of vectorized portions 324. The top vector portion 328 may be any match that the one or more ML models 314 determine to be most relevant and it might not be the highest ranking and/or scoring match. For example, the most relevant match may be a portion represented by a predetermined number of characters or a particular clause in the electronic lease agreement document.

For the purposes of identifying a top match, the ML models 314 may be trained and/or fine-tuned using one or more examples 326 that may correspond to a particular text portion (e.g., a clause defining products and/or services). The document review engine 142 may identify, select, retrieve, and/or generate one or more such examples 326. The examples 326 may be existing, standard, and/or previously used text portions, e.g., clauses, sentences, paragraphs, etc. in electronic documents. Such examples may be stored in and retrieved from data storage location 340, and/or dynamically generated. Upon retrieval, the examples 326 may be provided to one or more of the ML models 314. The ML models 314 may be a generative AI model, a large language model, any other type of machine learning model, and/or any combination of models. The generative AI model may be part of the document review engine 142 and/or be one or more third party models (e.g., GPT, ChatGPT, Bard, DALL-E, Midjourney, DeepMind, etc.). Any number of examples may be provided to the ML models 314 for training/fine-tuning. In the MSA agreement example, the examples 326 may include "Tier 1 data storage services are offered to a Company D", "This agreement defines information technology (IT) services available in the State of California", etc.

In some embodiments, the document review engine 142 initiates an iterative process to analyze the subset of vectorized portions 324 in an I number of iterations, where I represents any positive integer, to find a top vector portion 328. The document review engine 142 may perform any number of iterations to process the subset of vectorized portions 324 based on the vectorized rule 322 to find ever-decreasing numbers of vectorized portions relevant to the 322 until a top vector portion 328 is found.

By way of example, assume I=2. In a first iteration, for example, the document review engine 142 sends the first subset of vectorized portions 324 to a ML model of the ML models 314. In one embodiment, for example, the ML model is a generative AI model or an LLM such as a GPT model like ChatGPT. Once the ML model is trained on the examples 326, the ML model analyzes the first subset of vectorized portions 324 using the vectorized rule 322 to identify a second subset of vectorized portions 344. The second subset of vectorized portions 344 is smaller than the first subset of vectorized portions 324 (e.g., it contains less elements). Where the first subset of vectorized portions 324 comprise a top number of candidate matching pairs from the set of vectorized portions 320 defined by a first threshold value, the second subset of vectorized portions 344 comprise a top number of the subset of vectorized portions 324 defined by a second threshold value, where the first and second threshold values may be the same or different values. For example, the first subset of vectorized portions 324 may comprise 10 vectorized portions and the second subset of vectorized portions 344 may comprise 5 vectorized portions. In a second iteration, for example, the document review engine 142 sends the second subset of vectorized portions 344 to the ML model. The ML model analyzes the second subset of vectorized portions using the vectorized rule 322 to identify a third subset of subset of vectorized portions 344. The third subset of vectorized portions 344 is smaller than the second subset of vectorized portions 344 (e.g., it contains even less elements). For example, the second subset of vectorized portions 344 may comprise 5 vectorized portions, and the third subset of vectorized portions 344 may comprise 1 vectorized portion. The single vectorized portion is identified as a top vector portion 328. The top vector portion 328 comprises a single vectorized portion of the electronic document 302 that is most relevant to the vectorized rule 322.

Upon receiving the subset of vectorized portions 324 and the instructions, the trained ML model may be configured to identify one or more matches between the vectorized portions 320 and vectorized rule 322. In some embodiments, a single most relevant match may be identified by the trained ML model, denoted as a top vector portion 328. The document review engine 142 may then apply the same ML model or a different ML model from the ML models 314 to the identified matches, in an iterative manner, until the document review engine 142 makes a final determination as to whether a top vector portion 328 is found. In some example embodiments, the document review engine 142 may also provide appropriate instructions to the ML model for determining presence of the identified match and may, optionally, provide additional examples to the ML model for further fine tuning, in an iterative manner as well.

The portion presence engine 310 receives the top vector portion 328 as input and it evaluates the top vector portion 328 to determine whether there is sufficient information to generate a query response 214. The portion presence engine 310 analyzes the top vector portion 328 for one or more document segments 238 containing the information needed to generate the query response 214. The portion presence engine 310 outputs the document segments 238 as a detected portion 330. The detected portion 330 is passed to a review engine 312.

The review engine 312 receives the detected portion 330 as input, and it analyzes the detected portion 330 for information needed to generate the query response 214. When the review engine 312 determines that the detected portion 330 contains sufficient information to generate the query response 214, the review engine 312 generates the query response 214, and it outputs it to one or more interface(s) 338, such as GUI 202.

The document review engine 142 may be arranged to perform a verification process when the review engine 312 determines that the detected portion 330 does not contain sufficient information to generate the query response 214. For example, when the review engine 312 determines that the set of vectorized portions 320 do not contain any information relevant to the vectorized rule 322, the review engine 312 may initiate various actions. In a first action, the review engine 312 may be configured to request (e.g., provide instructions to) a different ML model to confirm or verify whether there is a match between the vectorized rule 322 and textual information contained within an image portion of the electronic document 302. In a second action, the platform may be configured to generate a comment 334 based on the vectorized rule 322 and/or a portion of the electronic document 302.

For the first action, for example, the review engine 312 may send a different version of the electronic document as an image (e.g., a PDF or JPEG) along with the vectorized rule 322 to a visual ML model trained to perform image detection. This may occur, for example, when the electronic document 302 uses certain containers or data structures for text information, such as a table, chart, or equation. A generative AI model is trained to operate on textual information, and it may have difficult identifying and retrieving text information formatted in a container. In such cases, an image of the electronic document (e.g., a PDF) is sent to a visual ML model trained to identify and retrieve text found in images.

For the second action, for example, the review engine 312 may generate a comment 334 for display on the GUI 202. The comment 334 may comprise a response and/or explanation generated based on the vectorized rule 322 and/or a portion of the electronic document. For example, when the review engine 312 determines that the detected portion 330 does not contain sufficient information to generate the query response 214, the review engine 312 generates a comment 334. The comment 334 may provide an explanation for a user, such as the electronic document 302 does not contain any information relevant to the vectorized rule 322. An example of a comment 334 is a statement such as "The information you requested is not found in the document" or a simple "Yes" or "No" statement. For example, in a licensing agreement example above, a custom rule 210 relating to intellectual property (IP) rights of a logo, may have a query request 212 that states "Does Company D have logo rights from Company E?". If the licensing agreement is silent on IP rights of logos, then the platform generates a comment such as a "The information you requested is not found in the document" in response to the absence of a match between the vectorized rule 322 and a portion of the electronic document 302. The comment 334 may be displayed in the GUI 202.

The detected portion 332, the query response 214, and/or the comment 334 (with and/or without explanations) may be provided to one or more interface(s) 338 that may be displayed by the user device 336. Moreover, the portions 332, 334 (with and/or without explanations) may be stored in the data storage location 340.

In some embodiments, in addition to storing the portions 332, 334, the data storage location 340 may also store the document portions 316, rules 208, vectorized portions 320, vectorized rule 322, subset of vectorized portions 324, subset of vectorized portions 344, examples 326, top vector portion 328, detected portion 330, query response 214, comment 334, and/or any other data/information. These may be stored in the data storage location 340 along with the received electronic document 302 in the original and/or pre-processed forms. The data storage location 340 may also store any relevant metadata associated with one or more of the above (e.g., original electronic document 302, the document portions 250, the vectorized portions 320, the subset of vectorized portions 324, rules 208, subset of vectorized portions 344, examples 326, top vector portion 328, detected portion 330, etc.). The stored portions/data/etc. and/or documents electronic document 302 may be used for training, re-training, refresh training, etc. one or more embedding model 306 and/or ML models 314. The objects and/or the documents may be anonymized to remove any sensitive information (e.g., personal identifying information (PII), commercially sensitive data, etc.), if necessary.

The ML models 314 and/or embedding model 306 may be trained and/or tuned using one or more datasets may include labeled objects (e.g., document portions 250, 320, 324, 328, 330, 344, examples 326, etc.). The datasets may have resulted from prior executions by the document review engine 142 and/or obtained in any other way, and may include any data that has been previously identified, e.g., as fields, etc. The data may be appropriately anonymized, if necessary. The ML models 314 and/or the embedding model 306 may be part of the document review engine 142 and/or be one or more third party models, including, but not limited to, any artificial intelligence generative models, e.g., ChatGPT, Bard, DALL-E, Midjourney, DeepMind, etc.

In the generated interface(s) 338, the document review engine 142 may graphically identify data/information, e.g., portions 332, 334, etc., e.g., by highlighting, underlining, etc. and/or differentiating it in any other way from the remaining data/information in the document. Alternatively, or in addition, the document review engine 142 may assign certain metadata to the portions 332, 334 (and/or comments) in the interface(s) 338 and/or the entire interface(s) 338 so that in any subsequent processing portions 332, 334 (and/or comments) may be appropriately identified by the assigned metadata. The document review engine 142 may include one or more application programming interfaces (APIs) that may be configured to assist in executing one or more of its operations in processing the documents and generation of one or more interface(s) 338 with portions 332, 334 (and/or comments).

The user may also use the user device 336 to provide feedback to the document review engine 142. The feedback may also be in response to one or more portions 316, 320, 328, 330, 344, rules 208, etc. in the processed electronic document 302, one or more interface(s) 338, etc. The feedback may be any type of feedback, such as, for example, a yes/no vote (e.g., thumbs up, thumbs down, etc.) that may be indicative of the user's acceptance of and/or satisfaction with portions, rules, one or more interface(s) 338, etc. The feedback may be textual feedback that may include specific comments that may be written and sent to the document review engine 142 by the user using the user device 336. As can be understood, any other type of feedback may be provided.

The engine 142 may receive the user's feedback (whether positive or negative or neutral) and use it for various purposes. For example, the document review engine 142 may update the portions 332, 334 (and/or comments) and/or any other portions, and generate updated portions, rule(s) 318, etc., and/or interface(s) 338. The document review engine 142 may also identify embedding model 306 and/or ML models 314 for the purposes of vectorization, generation of top matches, identification of top portions, generation of detected portions, generation of modifications, comments, etc., updating existing embedding model 306 and/or ML models 314 etc. Further, the document review engine 142 may use the user's feedback to update the embedding model 306 and/or ML models 314 that are used for any of the above purposes. As can be understood, any other actions may be performed by the document review engine 142 based on the user feedback. For example, the document review engine 142 may train, re-train, refresh-train and/or create new embedding model 306 and/or ML models 314. Feedback may be used to update any of the above operations and/or how any of them are performed. This process may continue until the user has no further feedback.

Figure 4:
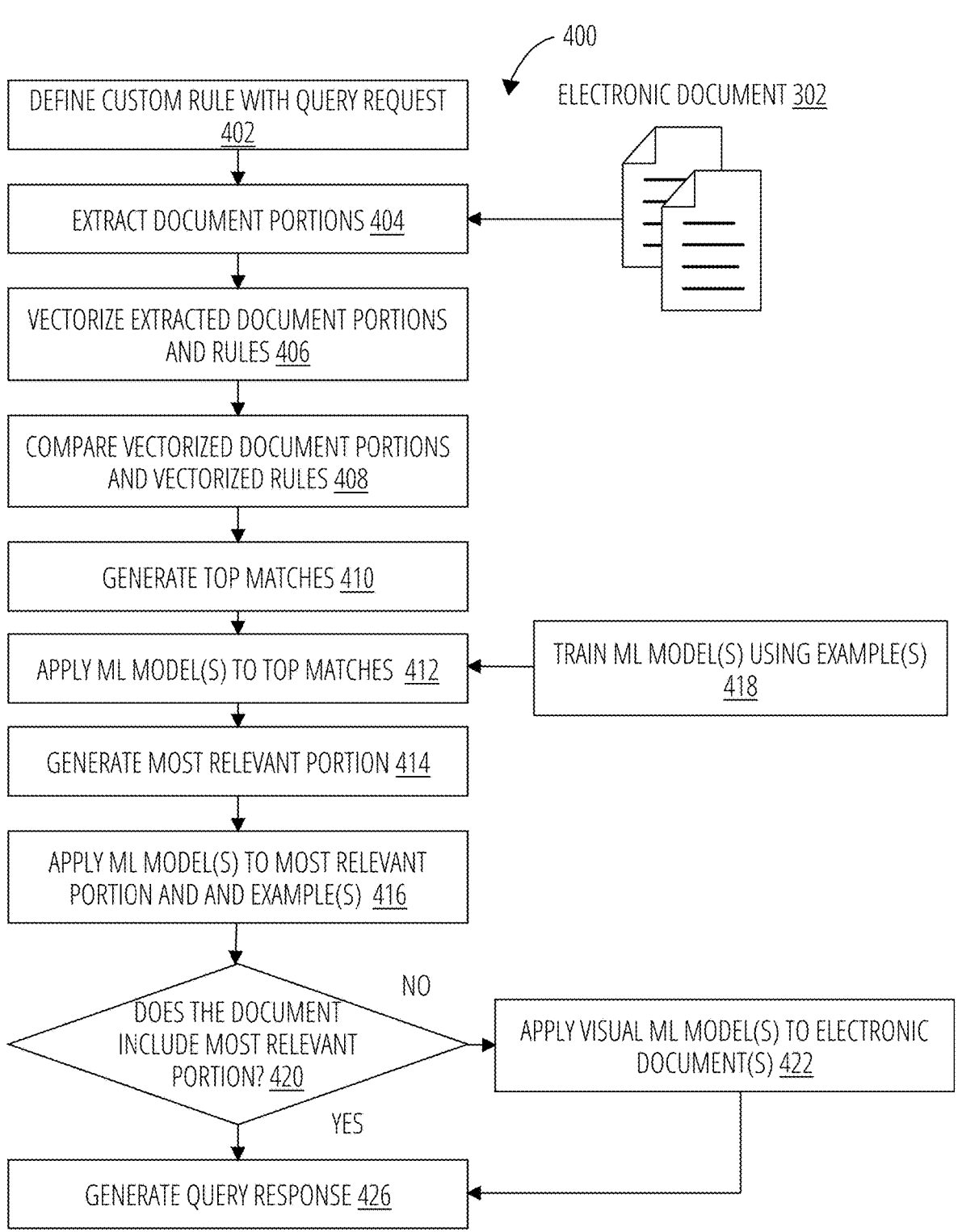
FIG. 4 illustrates an example process for determining presence of a particular document portion in an electronic document, according to some embodiments of the current subject matter.

FIG. 4 illustrates an example process logic flow 400 for determining presence of a particular document portion in an electronic document, according to some embodiments of the current subject matter. The process logic flow 400 may be executed using system 100 shown in FIG. 1, and in particular, the document review engine 142 and/or any of its components as, for example, is shown in FIG. 3.

At block 402, a custom rule 210 may be received and processed. The document review engine 142 may select one or more custom rules 210 to search for information contained within an electronic document 302.

At block 404, an electronic document 302 may be received and processed. One or more portions of the document 302 may be extracted. As stated above, document portion extraction engine 304 may be configured to extract one or more portions (e.g., document portions 250) of the electronic document 302 based on, for example, a predetermined number of characters, e.g., 50-character length portions. Alternatively, or in addition, the document portion extraction engine 304 may extract one or more sentences, paragraphs, sections, pages, clauses, etc. from the document 302.

At block 406, the extracted portions may be vectorized, such as, for example, using embedding model 306 to generate one or more vectorized portions (e.g., vectorized portions 320 as shown in FIG. 3). Further, the document portion extraction engine 304 may receive one or more rules associated with analysis of the electronic document 302 (e.g., custom rules 210). The custom rules 210 may be used to determine whether the electronic document 302 includes a particular document portion 250 that contains information corresponding to a custom rule 210. The embedding model 306 may be used to vectorize the custom rule 210 to generate one or more vectorized rules (e.g., vectorized rule 322).

At block 408, the vectorized portions 320 and the vectorized rule 322 may be compared to one or another. The comparison may be executed by the comparison engine 308 using, for example, cosine similarity. As can be understood any other methods for comparing vectorized portions and rules may be used. The comparison may generate one or more matching results (e.g., subset of vectorized portions 324) between the vectorized portions 320 and the vectorized rule 322. In some embodiments, the matches may be scored and/or rank based on similarity between the portions and the rules. For instance, a higher score and/or rank may be indicative of a higher similarity (e.g., more words in common) between portions and the rules.

At block 410, the document review engine 142 may generate a set of top matches. For example, the comparison engine 308 may generate similarity scores for candidate matching pairs of the vectorized portions 320 and the vectorized rule 322, rank the candidate matching pairs using a ranking algorithm and the similarity scores, and select a subset of vectorized portions 324 from the set of vectorized portions 320 from the ranked candidate matching pairs (e.g., a top 5%, a top 10, all pairs with a score of 95 or greater, etc.).

At block 412, the matching results may be provided to machine learning model (e.g., ML models 314) along with a request to identify a top match. The top match might not necessarily represent the match with the highest score and/or rank. The machine learning model may be trained, at block 418, using one or more examples (e.g., examples 326), which may represent document portions that may have been previously identified as compliance with a particular rule. The training may ensure that the machine learning model is fine tuned to correctly identify the top match. Along with the matching results, the machine learning model may also be provided with the electronic document 302 for analysis. As stated above, the machine learning model may include a generative AI model, a large language model, and/or any other type of machine learning model.

At block 414, subsequent to the processing of the electronic document 302 and the matching results, the ML model may output a most relevant portion, such as a top vector portion 328.

At block 416, the portion presence engine 310 receives the top vector portion 328 as input and it evaluates the top vector portion 328 to determine whether there is sufficient information to generate a query response 214. The portion presence engine 310 analyzes the top vector portion 328 for one or more document segments 238 containing the information needed to generate the query response 214. In some cases, the portion presence engine 310 may request a machine learning model (whether the same or different than the machine learning model used for previous tasks) to analyze the most relevant portion and the electronic document 302 for that determination. The portion presence engine 310 outputs the document segments 238 as a detected portion 330. The detected portion 330 is passed to a review engine 312. The model may also be provided with further examples for fine-tuning purposes. The model may then output the detected portion 330.

At decision block 420, the review engine 312 receives the top vector portion 328, and it analyzes the top vector portion 328 to determine whether the top vector portion 328 contains sufficient information needed to generate the query response 214.

At block 426, when the review engine 312 determines that the detected portion 330 contains sufficient information to generate the query response 214, the review engine 312 generates the query response 214, and it outputs it to one or more interface(s) 338, such as GUI 202.

At block 422, when the review engine 312 determines that the detected portion 330 does not contain sufficient information to generate the query response 214, the document review engine 142 may be arranged to perform a verification process. For example, when the review engine 312 determines that the set of vectorized portions 320 do not contain any information relevant to the vectorized rule 322, the review engine 312 may request (e.g., provide instructions to) a visual ML model to confirm or verify whether there is a match between the vectorized rule 322 and textual information contained within an image portion of the electronic document 302. If found, the review engine 312 uses the textual information to generate the query response 214 at block 426. If not found, the review engine 312 may generate a comment 334 indicating that the electronic document 302 does not contain any information relevant to the query request 212 of the custom rule 210.

Figure 5:
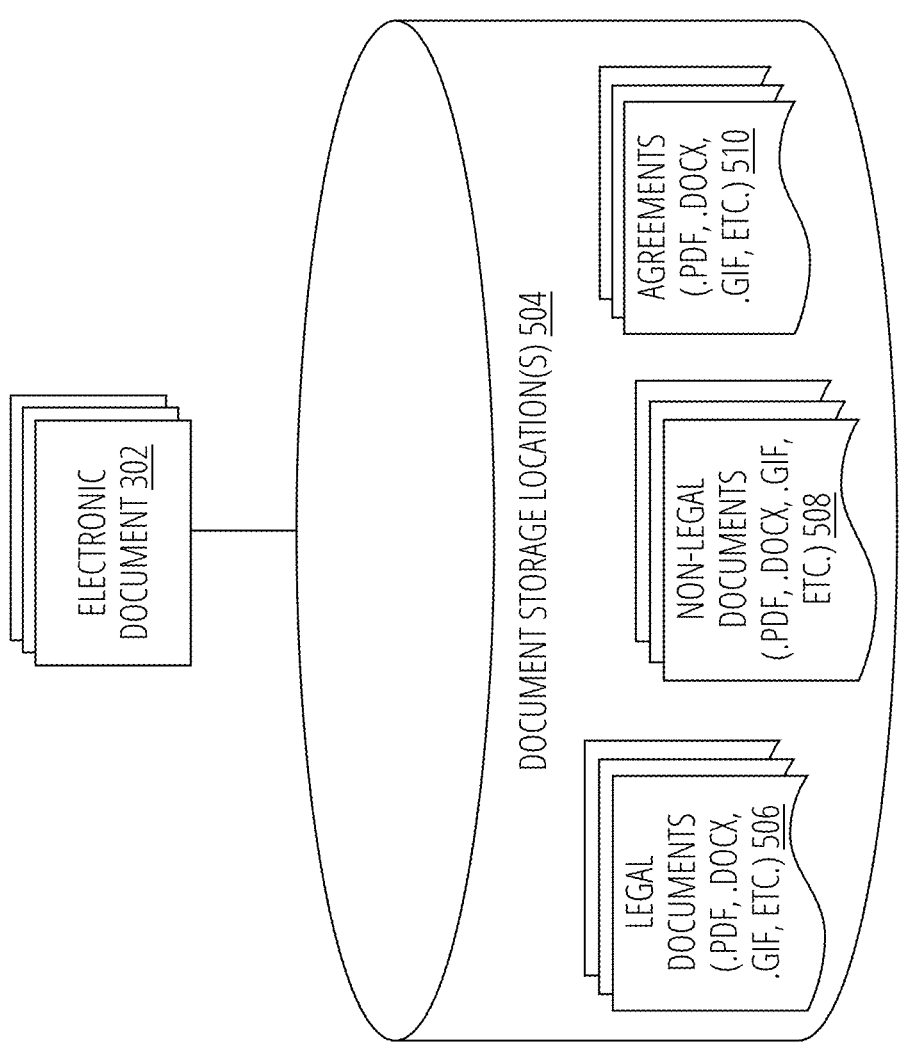
FIG. 5 illustrates an example of document storage location(s) that may be used as a source for the electronic documents, according to some embodiments of the current subject matter.

FIG. 5 illustrates an example of document storage location(s) 504 that may be used as a source for the electronic document 302, according to some embodiments of the current subject matter. The document storage location(s) 504 may be a single database, repository, etc. and/or multiple databases, repositories, etc. The document storage location(s) 504 may be configured to store any type of documents, data, information, files, etc. The document storage location(s) 504 may also be similar to data storage location 340 shown in FIG. 3.

The documents may be any type of documents, such as, for example, agreements, applications, websites, video files, audio files, text files, images, graphics, tables, spreadsheets, computer programs, etc. For example, as shown in FIG. 5, the document storage location(s) 504 may store one or more legal documents 506, non-legal documents 508, and/or agreements 510. Any of the documents 506, 508, and/or 510 may be in any desired format, e.g., .pdf, .docx, .xls, and/or any other type of format. The documents may also have any desired size. Moreover, the documents may be organized in any desired fashion. In some examples, documents may be nested within other documents (e.g., one document embedded in another document); one document may be linked to another document, etc. As such, the document storage location(s) 504 may be a unified data storage location that may store any type, any size, any format, etc. documents, data, information, etc.

In some embodiments, the documents stored in the document storage location(s) 504 may be structured, unstructured, and/or semi-structured. Moreover, the documents may be labeled and/or unlabeled. For example, one or more documents stored in the document storage location(s) 504 may have been processed by one or more embedding model 306 and/or ML models 314 for the purposes of object detection, object labeling, generation of one or more interface(s) 338, etc., and/or perform any other operations.

The documents stored in document storage location(s) 504 may be queried, searched, and/or retrieved by and/or provided to the document review engine 142 as electronic document 302. For example, the document review engine 142 may retrieve all or particular sales agreements from the document storage location(s) 504 for the purposes of object detection, object labeling, generation of one or more interface(s) 338, etc.

Figure 6:
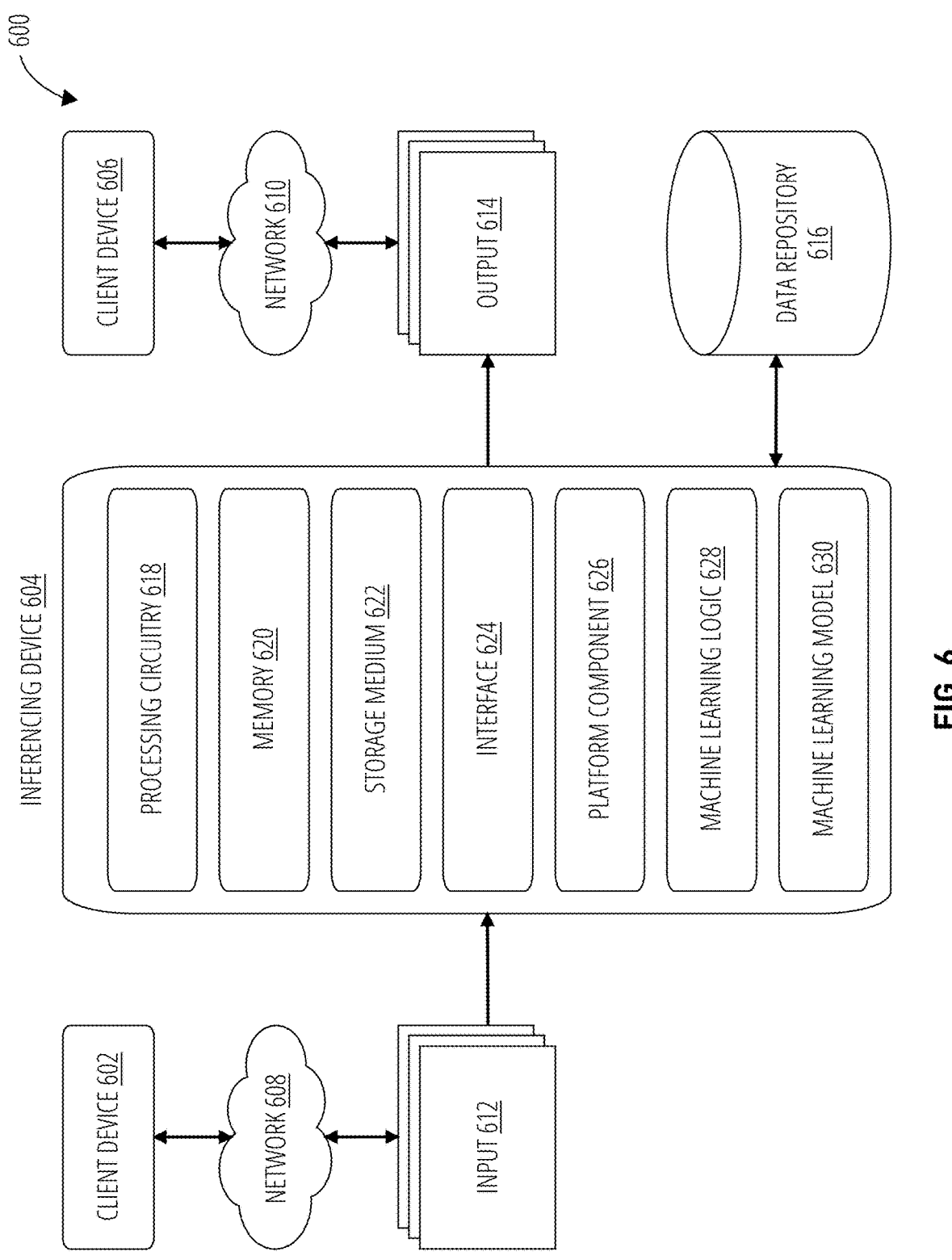
FIG. 6 illustrates an example of an AI/ML system that may be used for generating one or more transaction packages and/or guiding the user through one or more tasks, documents, etc., according to some embodiments of the current subject matter.

FIG. 6 illustrates an example of an AI/ML system 600 that may be used for generating one or more portions of an electronic document 302 based on a structure of the document, etc., according to some embodiments of the current subject matter. The system 600 may include a set of M devices, where M is any positive integer. As shown in FIG. 6, the system 600 may include three devices (M=3), such as a client device 602, an inferencing device 604, and a client device 606. The inferencing device 604 may communicate information with the client device 602 and the client device 606 over a network 608 and a network 610, respectively. The information may include input 612 from the client device 602 and output 614 to the client device 606, or vice-versa. In some embodiments, the input 612 and the output 614 may be communicated between the same client device 602 or client device 606. In another alternative, the input 612 and the output 614 may be stored in a data repository 616. Alternatively, or in addition, the input 612 and the output 614 are communicated via a platform component 626 of the inferencing device 604, such as an input/output (I/O) device (e.g., a touchscreen, a microphone, a speaker, etc.).

As shown in FIG. 6, the inferencing device 604 may include a processing circuitry 618, a memory 620, a storage medium 622, an interface 624, a platform component 626, ML logic 628, and an ML model 630. In some embodiments, the inferencing device 604 may include other components and/or devices as well. Examples for software elements and hardware elements of the inferencing device 604 are described in more detail with reference to a computing architecture 2200 as depicted in FIG. 22. Embodiments are not limited to these examples.

The inferencing device 604 may generally be arranged to receive an input 612, process the input 612 via one or more AI/ML techniques, and send an output 614. The inferencing device 604 may receive the input 612 from the client device 602 via the network 608, the client device 606 via the network 610, the platform component 626 (e.g., a touch-screen as a text command or microphone as a voice command), the memory 620, the storage medium 622 or the data repository 616. The inferencing device 604 may send the output 614 to the client device 602 via the network 608, the client device 606 via the network 610, the platform component 626 (e.g., a touchscreen to present text, graphic or video information or speaker to reproduce audio information), the memory 620, the storage medium 622 or the data repository 616. Examples for the software elements and hardware elements of the network 608 and the network 610 are described in more detail with reference to a communications architecture 2300 as depicted in FIG. 23. Embodiments are not limited to these examples.

The inferencing device 604 may include ML logic 628 and an ML model 630 to implement various AI/ML techniques for various AI/ML tasks. The ML logic 628 may receive the input 612, and process the input 612 using the ML model 630. The ML model 630 may perform inferencing operations to generate an inference for a specific task from the input 612. In some embodiments, the inference is part of the output 614. The output 614 may be used by the client device 602, the inferencing device 604, or the client device 606 to perform subsequent actions in response to the output 614.

In some embodiments, the ML model 630 may be a trained ML model 630 using a set of training operations. An example of training operations to train the ML model 630 is described with reference to FIG. 7.

Figure 7:
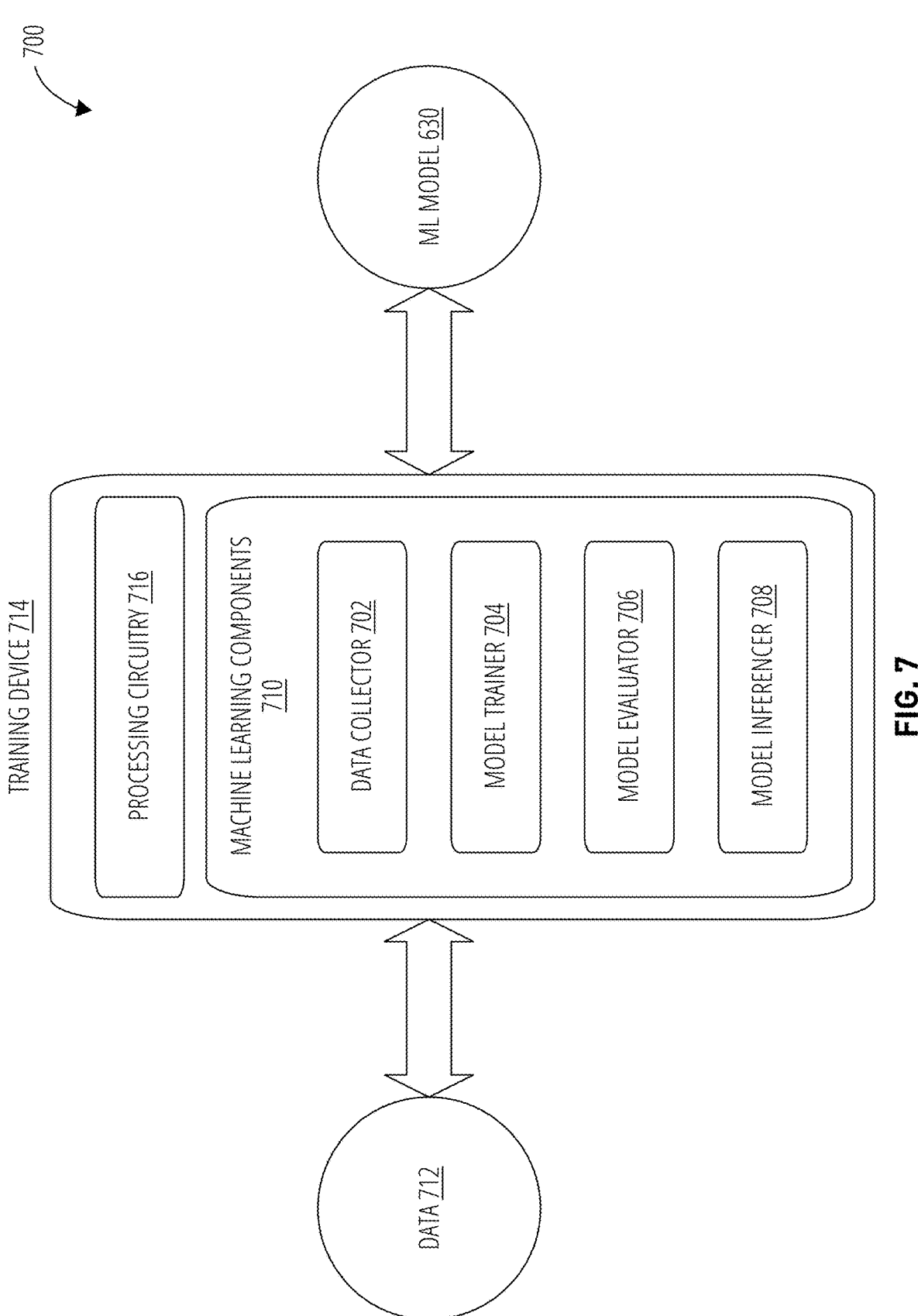
FIG. 7 illustrates an example apparatus that may include a training device suitable to generate a trained ML model for the inferencing device of the system shown in FIG. 6.

FIG. 7 illustrates an example apparatus 700 that may include a training device 714 suitable to generate a trained ML model 630 for the inferencing device 604 of the system 600. As shown in FIG. 7, the training device 714 may include a processing circuitry 716 and a set of ML components 710 to support various AI/ML techniques, such as a data collector 702, a model trainer 704, a model evaluator 706 and a model inferencer 708.

In general, the data collector 702 may collect data 712 from one or more data sources to use as training data for the ML model 630. The data collector 702 may collect different types of data 712, such as, text information, audio information, image information, video information, graphic information, and so forth. The model trainer 704 may receive as input the collected data and uses a portion of the collected data as test data for an AI/ML algorithm to train the ML model 630. The model evaluator 706 may evaluate and improve the trained ML model 330 using a portion of the collected data as test data to test the ML model 630. The model evaluator 706 may also use feedback information from the deployed ML model 630. The model inferencer 708 may implement the trained ML model 630 to receive as input new unseen data, generate one or more inferences on the new data, and output a result such as an alert, a recommendation or other post-solution activity.

An exemplary AI/ML architecture for the ML components 710 is described in more detail with reference to FIG. 8.

FIG. 8 illustrates an artificial intelligence architecture 800 that may be used by the training device 714 to generate the ML model 630 (e.g., embedding model 306, as shown in FIG. 3) for deployment by the inferencing device 304. The artificial intelligence architecture 800 is an example of a system suitable for implementing various AI techniques and/or ML techniques to perform various inferencing tasks on behalf of the various devices of the system 100.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 800 may include various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 630, evaluate performance of the trained ML model 630, and deploy the tested ML model 630 as the trained ML model 630 in a production environment, and continuously monitor and maintain it.

The ML model 630 may be a mathematical construct used to predict outcomes based on a set of input data. The ML model 630 may be trained using large volumes of training data 826, and it can recognize patterns and trends in the training data 826 to make accurate predictions. The ML model 630 may be derived from an ML algorithm 824 (e.g., a neural network, decision tree, support vector machine, etc.). A data set is fed into the ML algorithm 824 which trains an ML model 630 to "learn" a function that produces mappings between a set of inputs and a set of outputs with a reasonably high accuracy. Given a sufficiently large enough set of inputs and outputs, the ML algorithm 824 may find the function for a given task. This function may even be able to produce the correct output for input that it has not seen during training. A data scientist prepares the mappings, selects and tunes the ML algorithm 824, and evaluates the resulting model performance. Once the ML logic 628 is sufficiently accurate on test data, it can be deployed for production use.

The ML algorithm 824 may include any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 824 of the artificial intelligence architecture 800 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN)

algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 8, the artificial intelligence architecture 800 includes a set of data sources 802 to source data 804 for the artificial intelligence architecture 800. Data sources 802 may comprise any device capable generating, processing, storing or managing data 804 suitable for a ML system. The data sources 802 may receive data 850 associated with documents (e.g., type of documents, portion(s) of document content(s) and/or entire contents of document(s), transactions data (e.g., type of transaction, transaction identifier, requests associated with the transaction, etc.), and/or any other data. It should be noted that the data 850 may also be supplied during training phase of the model. Some additional, non-limiting, examples of data sources 802 include without limitation databases, web scraping, sensors and Internet of Things (IoT) devices, image and video cameras, audio devices, text generators, publicly available databases, private databases, and many other data sources 802. The data sources 802 may be remote from the artificial intelligence architecture 800 and accessed via a network, local to the artificial intelligence architecture 800 an accessed via a network interface, or may be a combination of local and remote data sources 802.

The data sources 802 source difference types of data 804 (which may include data 850 related to documents, transactions, etc.). By way of example and not limitation, the data 804 includes structured data from relational databases, such as customer profiles, transaction histories, or product inventories. The data 804 includes unstructured data from websites such as customer reviews, news articles, social media posts, or product specifications. The data 804 includes data from temperature sensors, motion detectors, and smart home appliances. The data 804 includes image data from medical images, security footage, or satellite images. The data 804 includes audio data from speech recognition, music recognition, or call centers. The data 804 includes text data from emails, chat logs, customer feedback, news articles or social media posts. The data 804 includes publicly available datasets such as those from government agencies, academic institutions, or research organizations. These are just a few examples of the many sources of data that can be used for ML systems. It is important to note that the quality and quantity of the data is critical for the success of a machine learning project.

The data 804 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database.

Semi-structured data is characterized by the presence of tags or metadata that provide some structure and context for the data.

The data sources 802 may be communicatively coupled to a data collector 702. The data collector 702 may gather relevant data 804 from the data sources 802. Once collected, the data collector 702 may use a pre-processor 806 to make the data 804 suitable for analysis. This may involve data cleaning, transformation, and feature engineering. Data pre-processing is a critical step in ML as it directly impacts the accuracy and effectiveness of the ML model 630. The pre-processor 806 receives the data 804 as input, processes the data 804, and outputs pre-processed data 816 for storage in a database 808. Examples for the database 808 includes a hard drive, solid state storage, and/or random access memory (RAM).

The data collector 702 is communicatively coupled to a model trainer 704. The model trainer 704 may perform AI/ML model training, validation, and testing which may generate model performance metrics as part of the model testing procedure. The model trainer 704 may receive the pre-processed data 816 as input 810 or via the database 808. The model trainer 704 may implement a suitable ML algorithm 824 to train an ML model 630 on a set of training data 826 from the pre-processed data 816. The training process may involve feeding the pre-processed data 816 into the ML algorithm 824 to produce or optimize an ML model 630. The training process may adjust its parameters until it achieves an initial level of satisfactory performance.

The model trainer 704 may be communicatively coupled to a model evaluator 706. After an ML model 630 is trained, the ML model 630 may need to be evaluated to assess its performance. This is done using various metrics such as accuracy, precision, recall, and FI score. The model trainer 704 may output the ML model 630, which is received as input 810 or from the database 808. The model evaluator 706 may receive the ML model 630 as input 812, and it initiates an evaluation process to measure performance of the ML model 630. The evaluation process may include providing feedback 818 to the model trainer 404. The model trainer 704 may re-train the ML model 630 to improve performance in an iterative manner.

The model evaluator 706 may be communicatively coupled to the model inferencer 708. The model inferencer 708 may provide AI/ML model inference output (e.g., inferences, predictions or decisions). Once the ML model 630 is trained and evaluated, it may be deployed in a production environment where it is used to make predictions on new data. The model inferencer 708 may receive the evaluated ML model 630 as input 814. The model inferencer 708 may use the evaluated ML model 630 to produce insights or predictions on real data, which may be deployed as a final production ML model 630. The inference output of the ML model 630 may be use case specific. The model inferencer 708 may also perform model monitoring and maintenance, which involves continuously monitoring performance of the ML model 630 in the production environment and making any necessary updates or modifications to maintain its accuracy and effectiveness. The model inferencer 708 may provide feedback 818 to the data collector 702 to train or re-train the ML model 630. The feedback 818 may include model performance feedback information, which may be used for monitoring and improving performance of the ML model 330.

Some or all of the model inferencer 408 may be implemented by various actors 822 in the artificial intelligence architecture 800, including the ML model 630 of the inferencing device 604, for example. The actors 822 may use the deployed ML model 630 on new data to make inferences or predictions for a given task, and output an insight 832. The actors 822 may implement the model inferencer 708 locally, or remotely receives outputs from the model inferencer 708 in a distributed computing manner. The actors 822 may trigger actions directed to other entities or to itself. The actors 822 provide feedback 820 to the data collector 702 via the model inferencer 408. The feedback 820 may include data needed to derive training data, inference data or to monitor the performance of the ML model 630 and its impact to the network through updating of key performance indicators (KPIs) and performance counters.

As discussed above, the systems 100, 600 implement some or all of the artificial intelligence architecture 800 to support various use cases and solutions for various AI/ML tasks. In some embodiments, the training device 714 of the apparatus 700 may use the artificial intelligence architecture 800 to generate and train the ML model 630 for use by the inferencing device 604 for the system 100. In one embodiment, for example, the training device 714 may train the ML model 630 as a neural network, as described in more detail with reference to FIG. 9. Other use cases and solutions for AI/ML are possible as well, and embodiments are not limited in this context.

Figure 9:
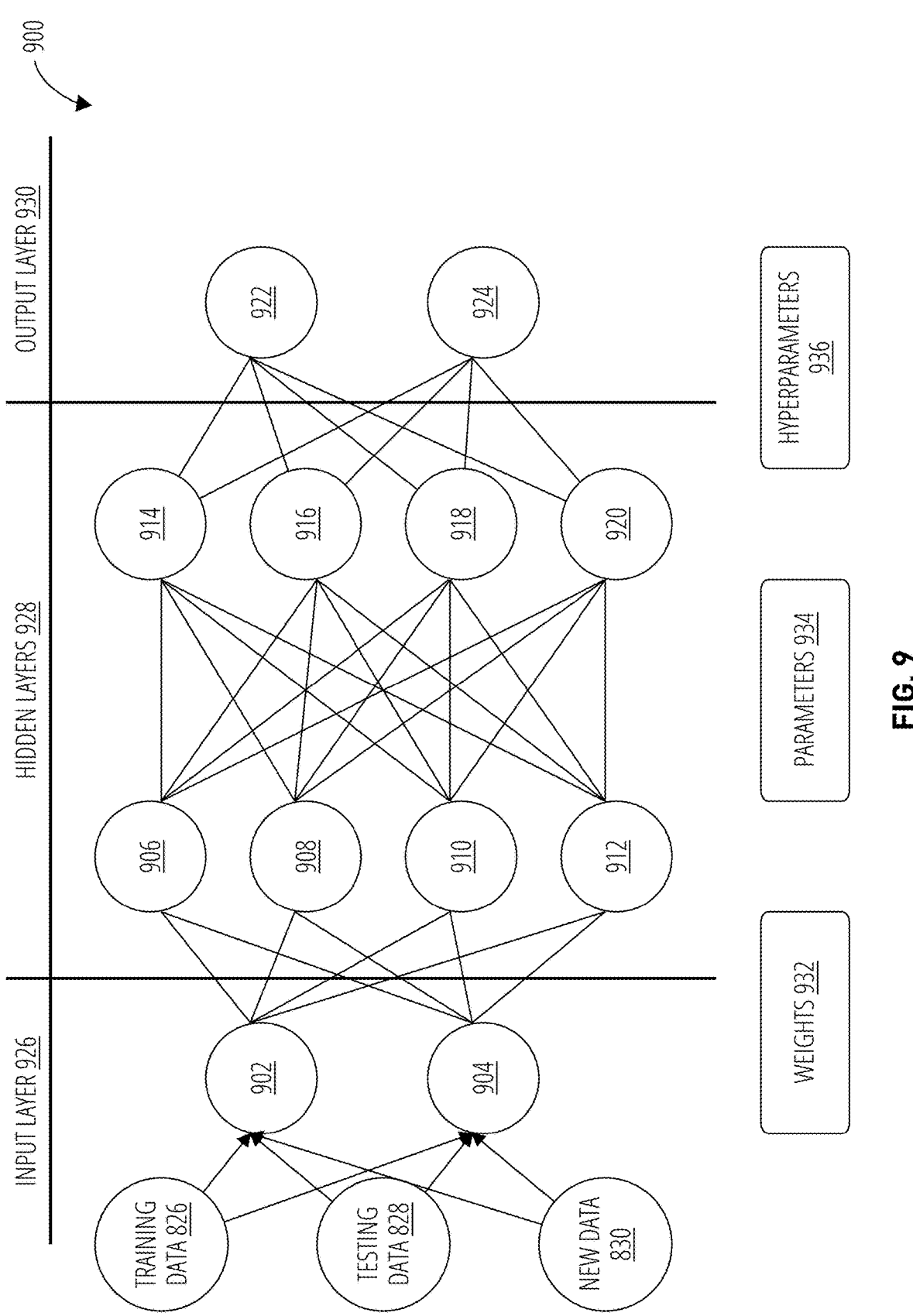
FIG. 9 illustrates an artificial neural network in accordance with one embodiment.

FIG. 9 illustrates an embodiment of an artificial neural network 900. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 900 may include multiple node layers, containing an input layer 926, one or more hidden layers 928, and an output layer 930. Each layer comprises one or more nodes, such as nodes 902 to 924. As shown in FIG. 9, for example, the input layer 926 may include nodes 902, 904. The artificial neural network 900 may include two hidden layers 928, with a first hidden layer having nodes 906, 908, 910 and 912, and a second hidden layer having nodes 914, 916, 918 and 920. The artificial neural network 900 may include an output layer 930 with nodes 922, 924. Each node 902 to 924 may include a processing element (PE), or artificial neuron, that connects to another and has an associated weight and threshold. If the output of any individual node is above the specified threshold value, that node may be activated, sending data to the next layer of the network. Otherwise, no data is passed along to the next layer of the network.

In general, artificial neural network 900 may rely on training data 826 to learn and improve accuracy over time. However, once the artificial neural network 900 may be fine-tuned for accuracy, and tested on testing data 828, the artificial neural network 900 may be ready to classify and cluster new data 830 at a high velocity. Tasks in speech recognition or image recognition can take minutes versus hours when compared to the manual identification by human experts.

Each individual node 902 to 924 may be a linear regression model, composed of input data, weights, a bias (or threshold), and an output. The linear regression model may have a formula similar to Equation (1), as follows:

$$\Sigma w_i x_i + bias = w_1 x_1 + w_2 x_2 + w_3 x_3 + bias$$

$$output = f(x) = 1 \text{ if } \Sigma w_1 x_1 + b >= 0; \ 0 \text{ if } \Sigma w_1 x_1 + b < 0 \qquad \text{EQUATION (1)}$$

43

44

Once an input layer 926 is determined, a set of weights 932 may be assigned. The weights 932 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 900 as a feedforward network.

In some embodiments, the artificial neural network 900 may leverage sigmoid neurons, which are distinguished by having values between 0 and 1. Since the artificial neural network 900 behaves similarly to a decision tree, cascading data from one node to another, having x values between 0 and 1 will reduce the impact of any given change of a single variable on the output of any given node, and subsequently, the output of the artificial neural network 900.

The artificial neural network 900 may have many practical use cases, like image recognition, speech recognition, text recognition or classification. The artificial neural network 900 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \rightarrow \text{MIN} \qquad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 934 of the model adjust to gradually converge at the minimum.

In one embodiment, the artificial neural network 900 is feedforward, meaning it flows in one direction only, from input to output. In one embodiment, the artificial neural network 900 uses backpropagation. Backpropagation is when the artificial neural network 900 moves in the opposite direction from output to input. Backpropagation allows calculation and attribution of errors associated with each neuron 902 to 924, thereby allowing adjustment to fit the parameters 934 of the ML model 630 appropriately.

The artificial neural network 900 is implemented as different neural networks depending on a given task. Neural networks are classified into different types, which are used for different purposes. In one embodiment, the artificial neural network 900 is implemented as a feedforward neural network, or multi-layer perceptrons (MLPs), comprised of an input layer 926, hidden layers 928, and an output layer 930. While these neural networks are also commonly referred to as MLPs, they are actually comprised of sigmoid neurons, not perceptrons, as most real-world problems are nonlinear. Trained data 804 usually is fed into these models to train them, and they are the foundation for computer vision, natural language processing, and other neural networks. In one embodiment, the artificial neural network 900 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 900 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 900 is implemented as any type of neural network suitable for a given operational task of system 100, and the MLP, CNN, and RNN are merely a few examples. Embodiments are not limited in this context.

The artificial neural network 900 may include a set of associated parameters 934. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some embodiments, the artificial neural network 900 may be implemented as a deep learning neural network. The term deep learning neural network refers to a depth of layers in a given neural network. A neural network that has more than three layers—which would be inclusive of the inputs and the output—can be considered a deep learning algorithm. A neural network that only has two or three layers, however, may be referred to as a basic neural network. A deep learning neural network may tune and optimize one or more hyperparameters 936. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

FIG. 10 illustrates an example of a document corpus 1008 suitable for use by the document review engine 142 of the server device 102. The document corpus 1008 may be stored in one or more database and/or storage locations and may be accessible (e.g., via a query) by the document review engine 142. In general, a document corpus is a large and structured collection of electronic documents, such as text documents, that are typically used for natural language processing (NLP) tasks such as text classification, sentiment analysis, topic modeling, and information retrieval. A corpus can include a variety of document types such as web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As shown in FIG. 10, the document corpus 1008 may include information from electronic documents 1018 derived from the document records 136 stored in the data store 124. The electronic documents 1018 may include any electronic document having metadata such as STME 130 suitable for receiving an electronic signature, including both signed electronic documents or unsigned electronic documents. Different sets of the electronic documents 1018 of the document corpus 1008 may be associated with different entities. For example, a first set of electronic documents 1018 is associated with a company A 1002. A second set of electronic documents 1018 is associated with a company B 1004. A third set of electronic documents 1018 is associated with a company C 1006. A fourth set of electronic documents 1018 is associated with a company D 1010. Although some embodiments discuss the document corpus 1008 having electronic documents 1018, it may be appreciated that the document corpus 1008 may have unsigned electronic document as well, which may be mined using the AI/ML techniques described herein. Embodiments are not limited in this context.

Each set of electronic documents 1018 associated with a defined entity may include one or more subsets of the electronic documents 1018 categorized by document type. For instance, the second set of electronic documents 1018 associated with company B 1004 may have a first subset of electronic documents 1018 with a document type for supply agreements 1012, a second subset of electronic documents 1018 with a document type for lease agreements 1016, and a third subset of electronic documents 1018 with a document type for service agreements 1014. In one embodiment, the sets and subsets of electronic documents 1018 may be identified using labels manually assigned by a human operator, such as metadata added to a document record for a signed electronic document created in a document management system, or feedback from a user of the system 100 during a document generation process. In one embodiment, the sets and subsets of electronic documents 1018 may be unlabeled.

Figure 11:
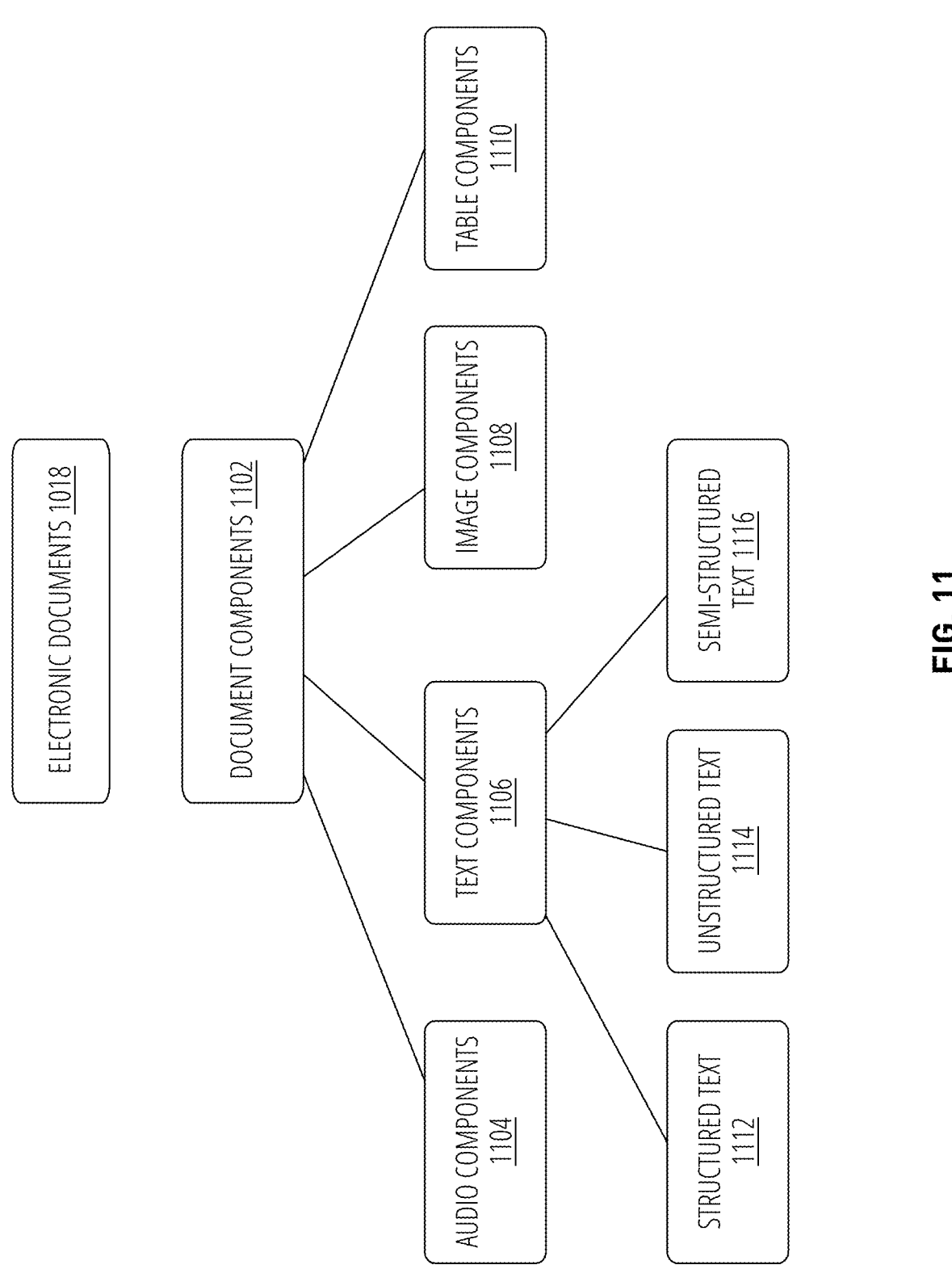
FIG. 11 illustrates electronic documents in accordance with one embodiment.

FIG. 11 illustrates an example of an electronic document 1018. An electronic document 1018 may include different information types that collectively form a set of document components 1102 for the electronic document 1018. The document components 1102 may comprise, for example, one or more audio components 1104, text components 1106, image components 1108, or table components 1110. Each document component 1102 may comprise different content types. For example, the text components 1106 may comprise structured text 1112, unstructured text 1114, or semi-structured text 1116.

Structured text 1112 refers to text information that is organized in a specific format or schema, such as words, sentences, paragraphs, sections, clauses, and so forth. Structured text 1112 has a well-defined set of rules that dictate how the data should be organized and represented, including the data types and relationships between data elements.

Unstructured text 1114 refers to text information that does not have a predefined or organized format or schema. Unlike structured text 1112, which is organized in a specific way, unstructured text 1114 can take various forms, such as text information stored in a table, spreadsheet, figures, equations, header, footer, filename, metadata, and so forth.

Semi-structured text 1116 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

Figure 12:
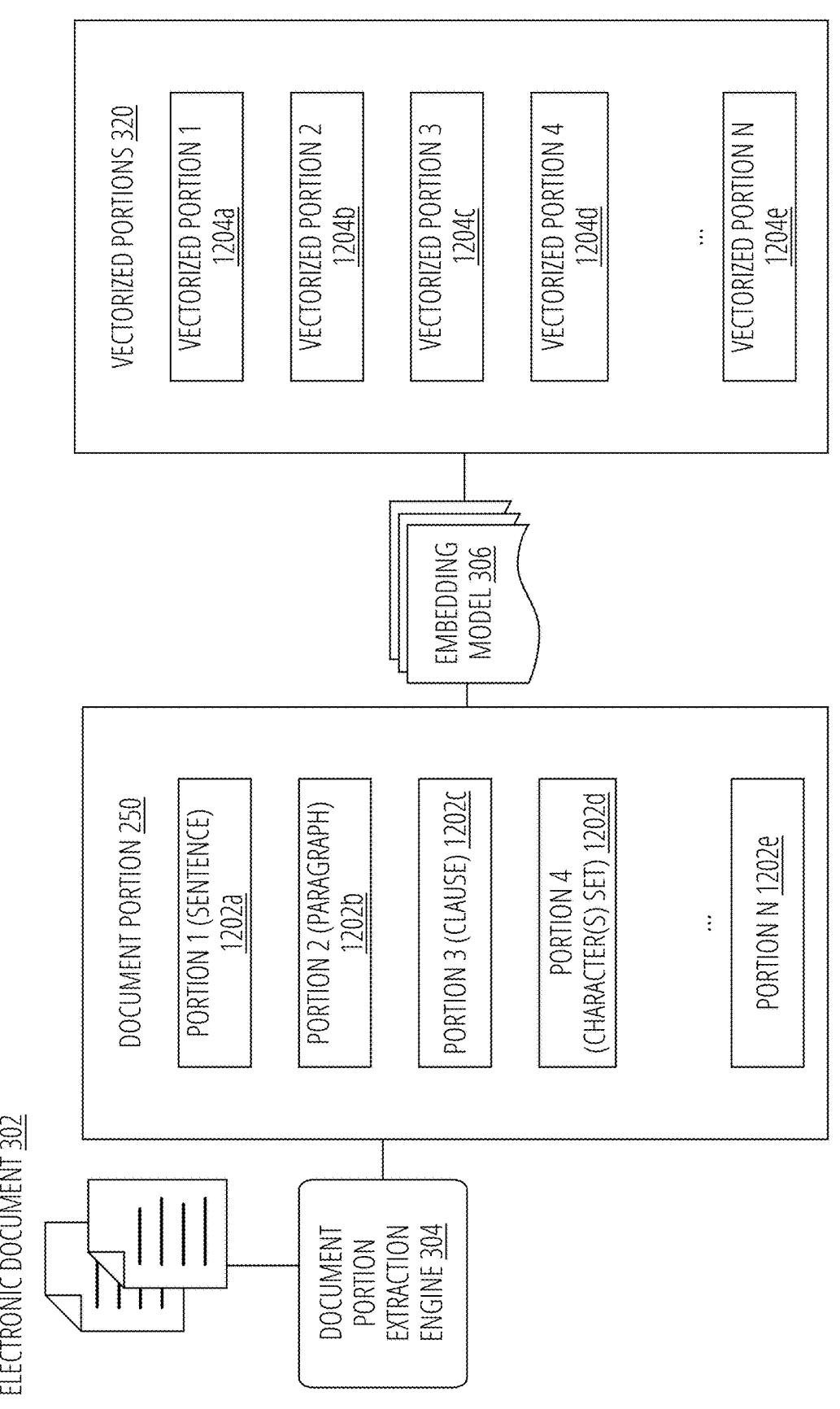
FIG. 12 illustrates an example operation of the document portion extraction engine, according to some embodiments of the current subject matter.

FIG. 12 illustrates an example operation of the document portion extraction engine 304, according to some embodiments of the current subject matter. The document portion extraction engine 304 may be configured to receive an electronic document 302 (e.g., from data storage location 340, document storage location(s) 504 and/or any other storage location).

The document portion extraction engine 304 may then parse and/or split the electronic document 302 into one or more document portions 250. Optionally, each such document portion 250 may be converted to a format that may be processed by the document portion extraction engine 304. For example, the document portions 250 may include portion 1 (sentence) 1202a, portion 2 (paragraph) 1202b, portion 3 (clause) 1202c, portion 4 (character(s) set) 1202d that may include a predetermined number of characters (e.g., 50), and/or any other type of portion N 1202c.

The document portion extraction engine 304 may use one or more embedding model 306 to vectorize the document portions 250, so that one or more vectorized portions 320 may be generated. The vectorized portions 320 may include, for example, vectorized portion 1 1204a that may correspond to the portion 1 (sentence) 1202a, vectorized portion 2 1204b that may correspond to the portion 2 (paragraph) 1202b, vectorized portion 3 1204c that may correspond to portion 3 (clause) 1202c, vectorized portion 4 1204d that may correspond to portion 4 (character(s) set) 1202d, etc.

Figure 13:
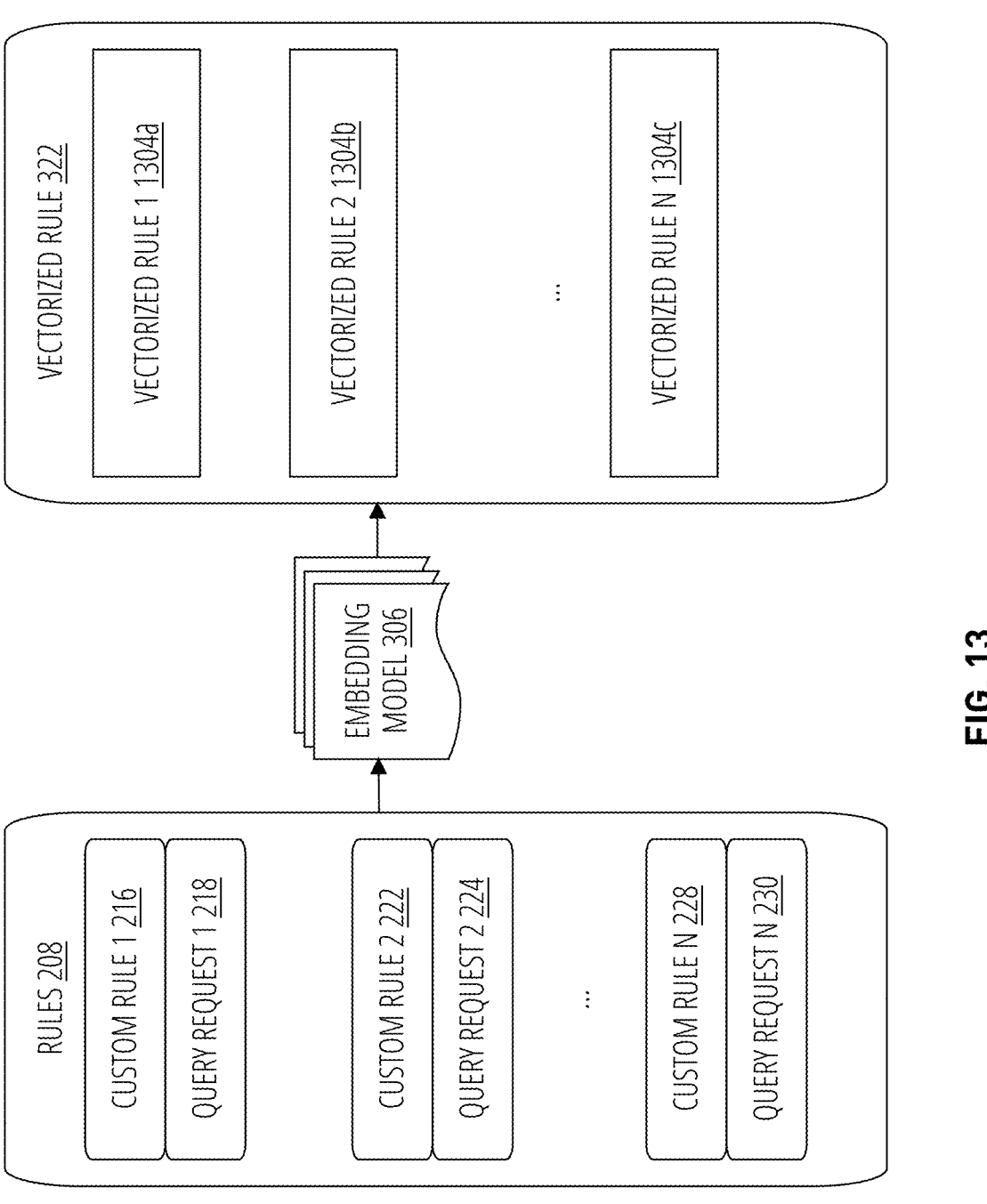
FIG. 13 illustrates an example of a rule processing operation performed by the document portion extraction engine, according to some embodiments of the current subject matter.

FIG. 13 illustrates an example of a rule processing operation performed by the document portion extraction engine 304, according to some embodiments of the current subject matter. Along with the document portions 250, the document portion extraction engine 304 may be configured to receive one or more rules 208, such as custom rules 210, that may be used for analysis of the electronic document 302 to determine whether the electronic document 302 complies with the custom rules 210. In some embodiments, the document review engine 142 may be configured to analyze the electronic document 302 using one custom rule 210 at a time. Alternatively, or in addition, the document review engine 142 may be configured to perform simultaneous analysis of the electronic document 302 using multiple custom rules 210. The analysis may be performed in real time and/or using a particular schedule.

The custom rules 210 may include a custom rule 1 216, a custom rule 2 222, and a custom rule N 228. The custom rule 1 216 may include a query request 1 218, the custom rule 2 222 may include a query request 2 224, and the custom rule N 228 may include a query request N 230. By way of example, as depicted in FIG. 2C, the GUI rule view 204 of GUI 202 illustrates 3 different custom rules 210 and the GUI document view 206 presents document portions 250 associated with the custom rules 210. A first custom rule 1 216 has a rule name 248 of "Counterparty" and it has a query request 1 218 that states "What companies are the counterparties to this agreement?". A second custom rule 2 222 has a rule name 248 of "Products/Services" and it has a query request 2 224 that states "What are the products and/or services offered by this agreement?". A third custom rule N

228 has a rule name 248 of "Custom Logo Rights" and it has a query request N 230 that states "Does Company B have logo rights to logos owned by Company A?". Embodiments are not limited to these examples.

Similar to the vectorization of the document portions document portion 250, the document portion extraction engine 304 may be configured to vectorize the custom rules 210. For instance, the document portion extraction engine 304 may use one or more embedding model 306 to vectorize the custom rules 210, so that one or more vectorized rule 322 may be generated and subsequently, compared to the vectorized portions 320. The vectorized rule 322 may include, for example, a vectorized rule 1 1304a that may correspond to the custom rule 1 216, a vectorized rule 2 1304b that may correspond to the custom rule 2 222, and vectorized rule N 1304c that may correspond to custom rule N 228, and so forth.

Figure 14:
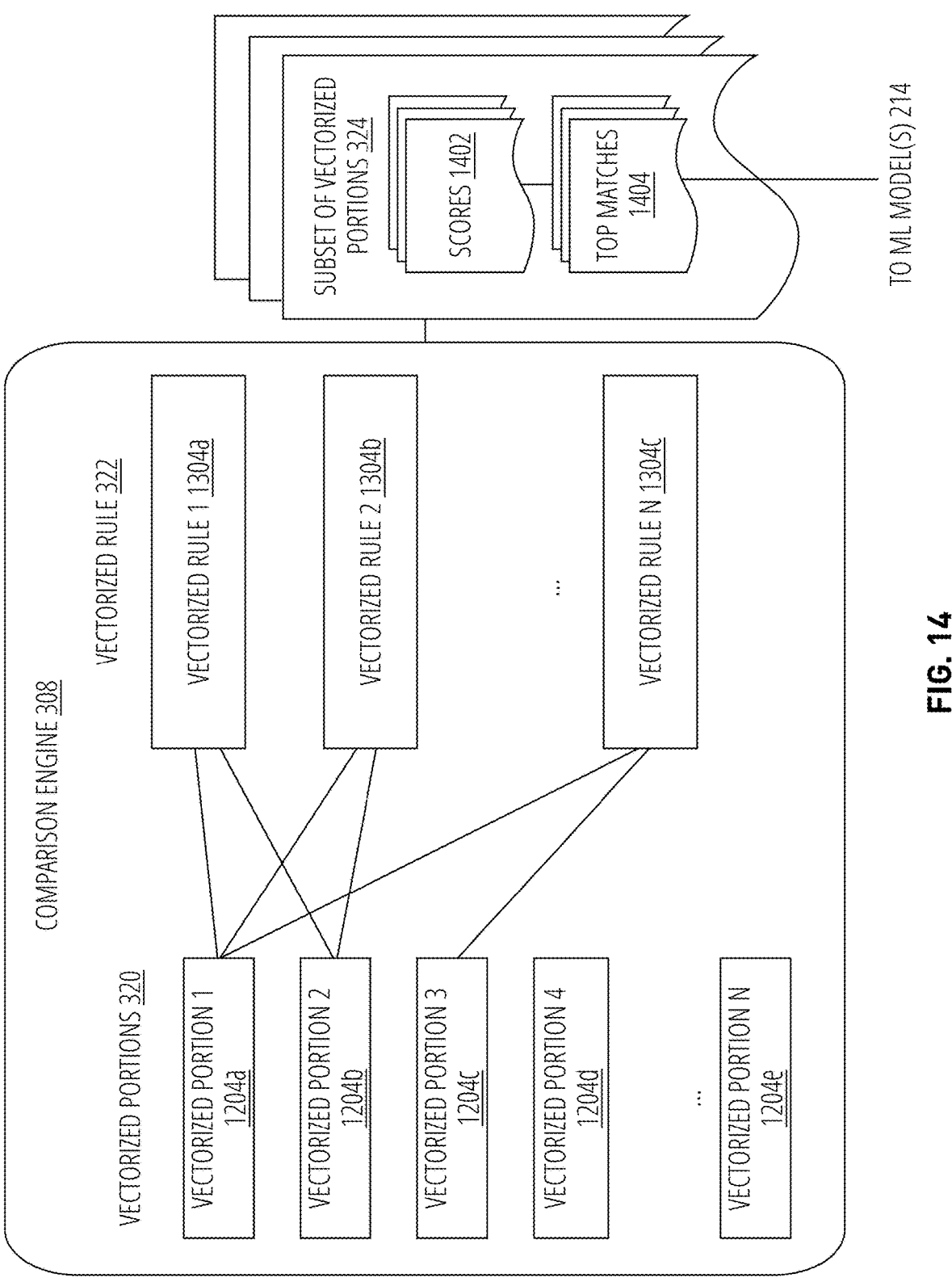
FIG. 14 illustrates an example operation of the comparison engine, according to some embodiments of the current subject matter.

FIG. 14 illustrates an example operation of the comparison engine 308, according to some embodiments of the current subject matter. The comparison engine 308 may be configured to compare the vectorized portions 320 and the vectorized rule 322 that have been generated using embedding model 306. Comparison between vectorized portions 320 and vectorized rule 322 may be performed using cosine similarity and/or any other type of similarity detection algorithms.

In some embodiments, a single vectorized portion 320 may be compared to a single vectorized rule 322. Alternatively, or in addition, multiple vectorized portions 320 may be compared to a single vectorized rule 322, and/or a single vectorized portion 320 may be compared to multiple vectorized rule 322, and/or multiple vectorized portions 320 may be compared to multiple vectorized rule 322.

As shown in FIG. 14, vectorized portion 1 1204a may be compared to vectorized rule 1 1304a, vectorized rule 2 1304b, and vectorized rule N 1304c. However, vectorized portion 2 1204b may be compared only to vectorized rule 1 1304a and vectorized rule 2 1304b. Likewise, vectorized portion 3 1204c may only be compared to vectorized rule N 1304c. Comparison may be determined based on specific content of the rules and/or the portions. For instance, a vectorized rule 1 1304a that may be a vectorized version of custom rule 1 216 that states "What companies are counterparties to this agreement?" may be compared to vectorized portion 1 1204a that may be a vectorized version of a document portion that states "This Master Services Agreement (this "Agreement") is effective as of Apr. 1, 2024 ("Effective Date") and entered into between Company A (d/b/a Company B), a Delaware corporation ("Customer"), and Company C ("Company")" and/or to vectorized portion 2 1204b that may be a vectorized version of a document portion that states "This Agreement governs Customer's use and purchase of the Cloud Offerings and Professional Services (together, "Services") provided by Company to Customer.". However, it might not be compared to vectorized portion 3 1204c that may be a vectorized version of a document portion that states "this agreement is renewable annually." The latter's may be compared to vectorized rule N 1304c. As can be understood, any other ways of comparing vectorized rule 322 and vectorized portions 320 are possible.

The comparison between vectorized portions 320 and vectorized rule 322 may result in one or more subset of vectorized portions 324 that may be provided to the ML models 314 for the purposes of determining the top vector portion 328. In some embodiments, the subset of vectorized portions 324 may, optionally, be scored and/or ranked, e.g., each matching vectorized portion in the subset of vectorized portions 324 may be assigned one or more scores 1402, e.g., from 1 to 100, where 1 represents the lowest score corresponding to lowest similarity between the rules and the portions, and 100 represents the highest score corresponding to highest similarity between the rules and the portions. The similarity may include semantic similarity and/or any other type of similarity. Any desired methodology may be used to score each match.

Using the scores, each match may be ranked and/or arranged in a list of one or more top matches 1404, where the match between the vectorized portions 320 and the vectorized rule 322 with the highest score may be arranged at the top of the list, and the match with the lowest score may be arranged at the bottom of the list. The list may be truncated using one or more scoring thresholds, e.g., any matches scoring less than 75 may be discarded from the list. The truncated list of the top matches 1404 may be provided to the ML models 314 for further processing, as discussed herein.

Figure 15:
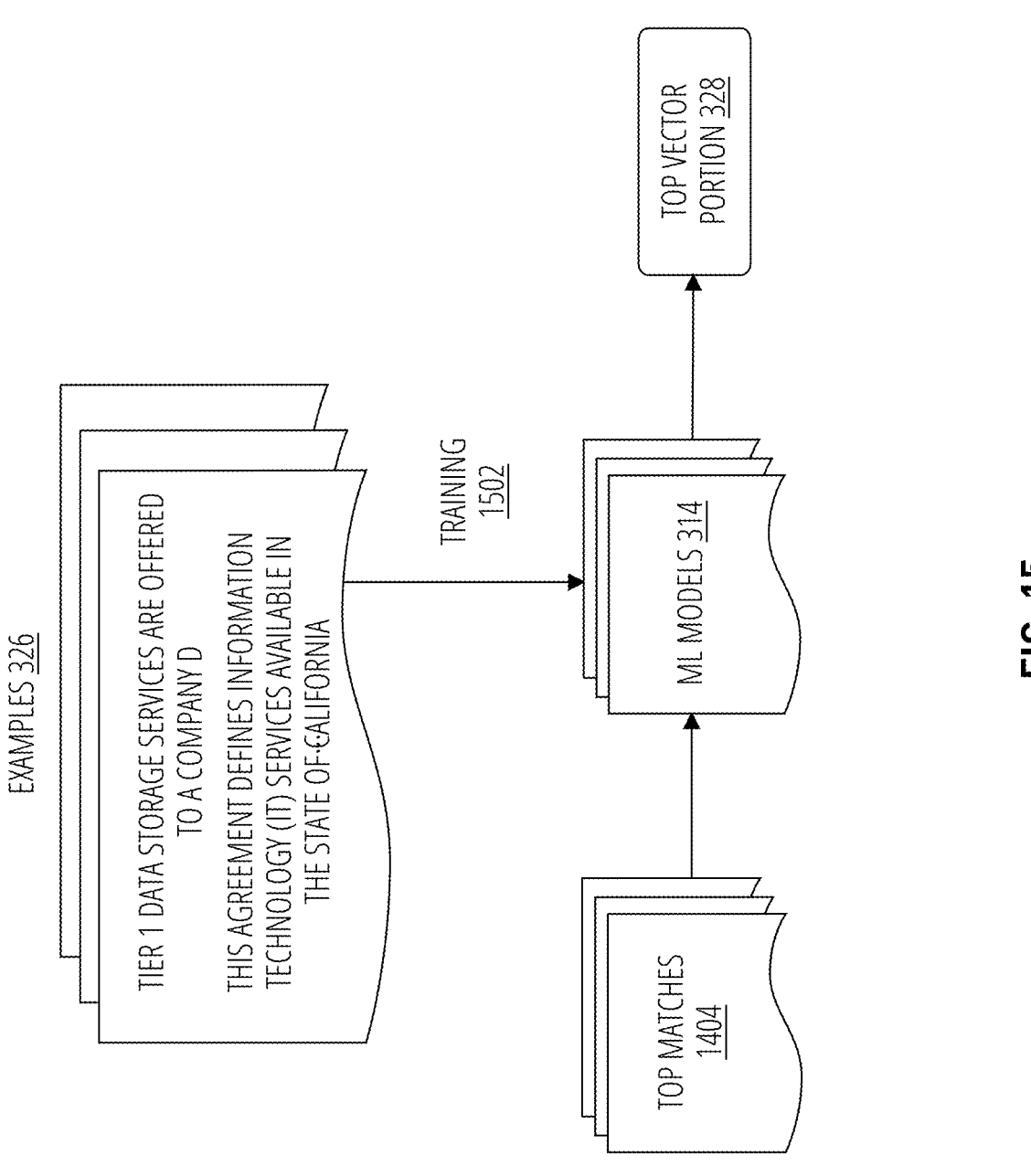
FIG. 15 illustrates an example operation related to training and/or fine tuning of one or more ML model(s) using one or more example(s), according to some embodiments of the current subject matter.

FIG. 15 illustrates an example operation related to training and/or fine tuning of one or more ML models 314 using one or more examples 326, according to some embodiments of the current subject matter. The document review engine 142 may be configured to provide one or more such examples 326 to the ML models 314 to ensure that it is able to analyze the subset of vectorized portions 324 that it receives from the comparison engine 308 and identify one or more top vector portion 328 from those matches.

As previously described, for the purposes of identifying a top match, the ML models 314 may be trained and/or fine-tuned using one or more examples 326 that may correspond to a particular text portion (e.g., a clause defining products and/or services). The document review engine 142 may identify, select, retrieve, and/or generate one or more such examples 326. The examples 326 may be existing, standard, and/or previously used text portions, e.g., clauses, sentences, paragraphs, etc. in electronic documents. Such examples may be stored in and retrieved from data storage location 340, and/or dynamically generated. Upon retrieval, the examples 326 may be provided to one or more of the ML models 314. The ML models 314 may be a generative AI model, a large language model, any other type of machine learning model, and/or any combination of models. The generative AI model may be part of the document review engine 142 and/or be one or more third party models (e.g., GPT, ChatGPT, Bard, DALL-E, Midjourney, DeepMind, etc.). Any number of examples may be provided to the ML models 314 for training/fine-tuning. In the MSA agreement example, the examples 326 may include "Tier 1 data storage services are offered to a Company D", "This agreement defines information technology (IT) services available in the State of California", etc.

As part of the training 1502, for example, the document review engine 142 may be configured to provide examples 326 that states "Tier 1 data storage services are offered to a Company D", "This agreement defines information technology (IT) services available in the State of California", etc. The examples 326 may be provided to the ML models 314 to fine tune it for identification of a particular portion in the electronic document 302 (e.g., portions related to the services defined in a MSA agreement) and/or for identification of different portions (e.g., portions related to the length of services in the MSA agreement, portions related to service pricing terms of the MSA agreement, etc.). The ML models 314 may be trained, re-trained, refresh trained, etc. using different examples 326 and/or updates to such examples, and/or any other data. For example, user's feedback may be used for updating the examples 326 and, hence, fine-tuning the ML models 314.

The training 1502 of the ML models 314 may be performed prior to, during and/or after one or more operations performed by the document review engine 142. For example, the training 1502 may be performed by the document review engine 142 prior to requesting the ML models 314 to identify the top vector portion 328 from the subset of vectorized portions 324. Alternatively, or in addition, the training 1502 may be performed by the engine 142 subsequent to identifying top vector portion 328 but before identifying detected portion 330. The training 1502 may be performed using different examples 326, updates to examples 326, and/or any other information/data, etc.

Once the ML models 314 has been trained, the top matches 1404 that have been generated by the comparison engine 308 may be provided to the ML models 314 and the ML models 314 may be asked to identify top vector portion 328. The ML models 314 may also be provided with one or more rule(s) 318 (and/or vectorized rule 322), the document 302, and/or any other information. Using the provided information and instructions, the trained ML models 314 may output the top vector portion 328.

Figure 16:
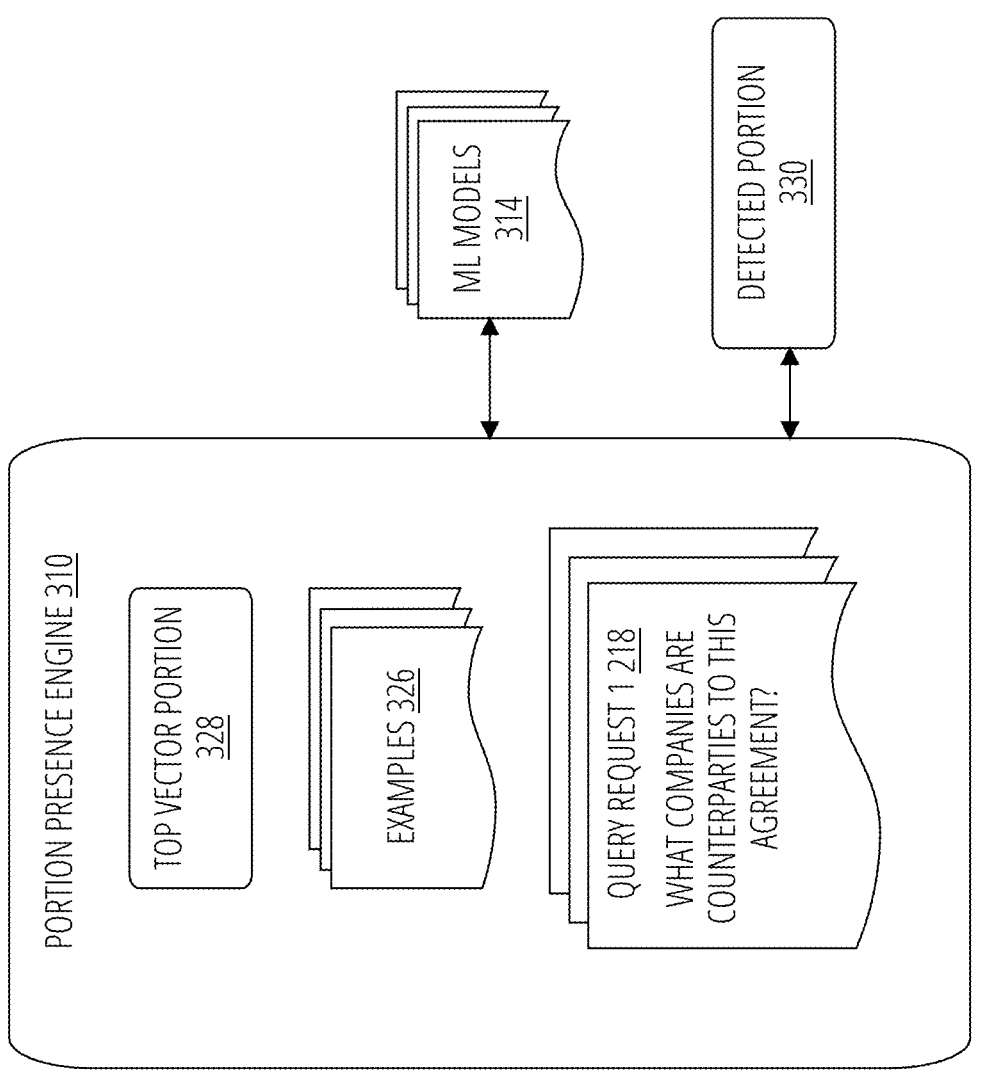
FIG. 16 illustrates an example operation of the portion presence engine, according to some embodiments of the current subject matter.

FIG. 16 illustrates an example operation of the portion presence engine 310, according to some embodiments of the current subject matter. The portion presence engine 310 may be configured to request the ML models 314 to determine whether the top vector portion 328 contains a document segment 238 with information responsive to a query request 212 and suitable for generation of a query response 214 in response to the query request 212.

The portion presence engine 310 may be configured to receive the top vector portion 328 that has been identified by the ML models 314 as being most relevant to a custom rule 210. As discussed herein, the top vector portion 328 might not be the highest ranked portion and may be selected by the ML models 314 as being most relevant based on a variety of factors, e.g., similarity with the custom rule 210, type of the electronic document 302, and/or any other factors. The portion presence engine 310 may be configured to provide the top vector portion 328 and examples 326 to the ML models 314 along with the query request 212 from the vectorized rule 322. The query request 1 218 may, for example, prompt the ML models 314 with the following question "What companies are counterparties to this agreement?" As can be understood, the portion presence engine 310 may alter or tailor a query request 212 to the ML models 314 based on the content of the electronic document 302, the top vector portion 328, and/or any other data. For example, the portion presence engine 310 may use query expansion techniques to expand the query request 212 with alternate words and/or phrases to assist in comparison operations.

In some embodiments, the portion presence engine 310 may, optionally, be configured to further fine tune the ML models 314 (which may be the same and/or different from the ML models 314 that may have been used to identify top vector portion 328). The fine tuning may be performed using one or more examples 326, which may be the same and/or different from the examples 326 that were used to fine tune the ML models 314 prior to identification of the top vector portion 328. The fine tuning may be similar to the training 1502, shown in FIG. 15. For example, the engine 310 may provide examples 326 that state "A company is defined as a limited liability company incorporated in the state of Delaware", "Company A agrees to provide services B to Company C", etc. The examples 326 may be more specific to the particular top vector portion 328 so that identification of presence of such portion in the document 302 by the ML models 314 may be more precise. The ML models 314 may be trained, re-trained, refresh trained, etc. using different examples 326 and/or updates to such examples, and/or any other data. For example, user's feedback may be used for updating the examples 326 and, hence, fine-tuning the ML models 314.

Once the ML models 314 has been fine tune, the engine 310 may be configured to provide the top vector portion 328 and instructions 1602 to the ML models 314. The document 302 and/or the rule(s) 318 may also be provided to the ML models 314. The ML models 314 may analyze the top vector portion 328, the query request 212, the electronic document 302, and/or the rules 208 to determine whether the top vector portion 328 does include a document segment 238 with information responsive to the query request 212, and output it as detected portion 330. For example, the portion presence engine 310 may output the detected portion 330 stating that "This Master Services Agreement (this "Agreement") is effective as of Apr. 1, 2024 ("Effective Date") and entered into between Company A (d/b/a Company B), a Delaware corporation ("Customer"), and Company C ("Company")". The detected portion 330 may then be provided to review engine 312 for further processing, as shown in FIG. 17.

Figure 17:
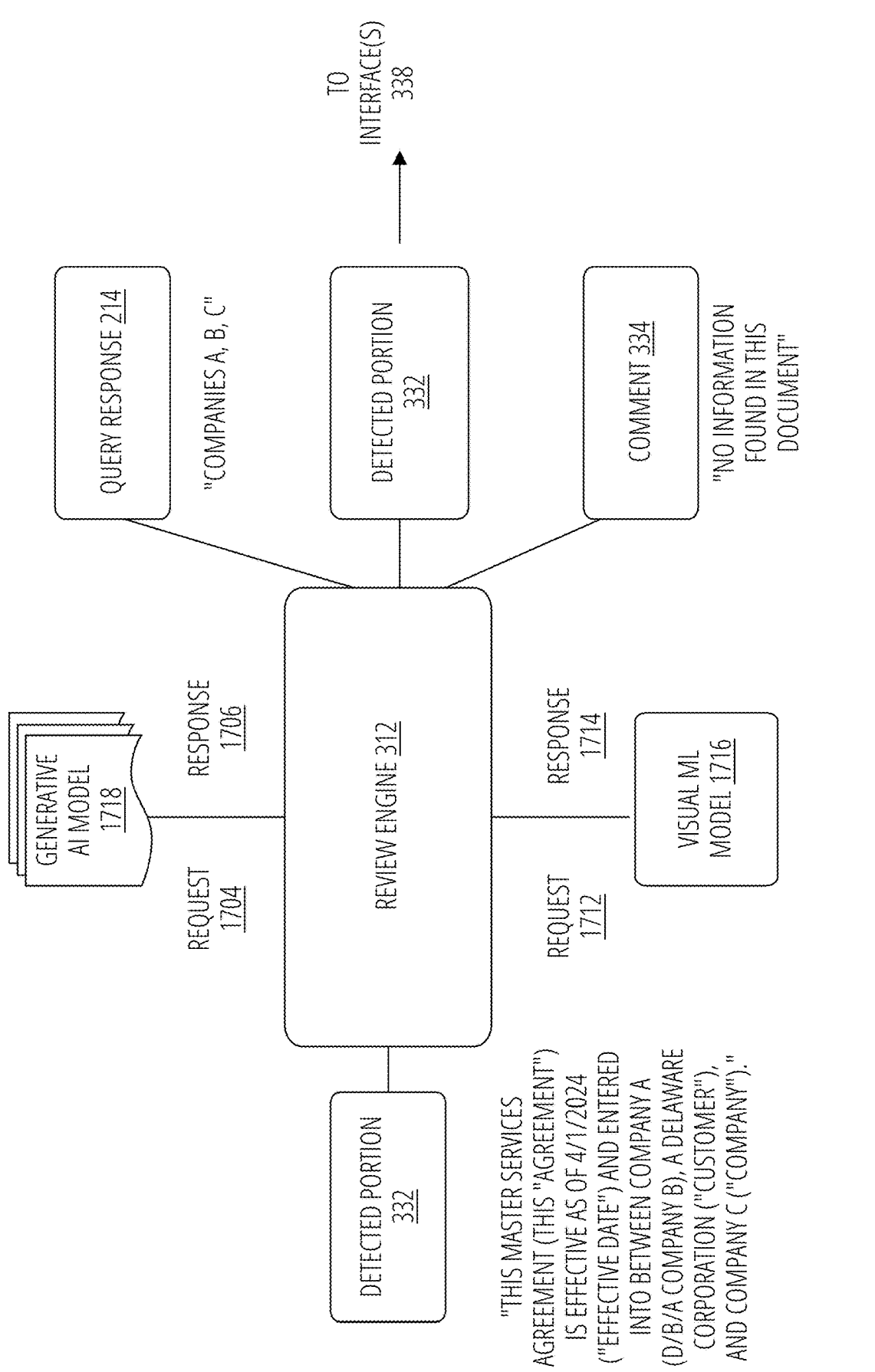
FIG. 17 illustrates an example operation of the review engine, according to some embodiments of the current subject matter.

FIG. 17 illustrates an example operation of the review engine 312, according to some embodiments of the current subject matter. The review engine 312 may be configured to review the detected portion 330 to generate a query response 214 to a query request 212, or a comment 334 in response to the query request 212.

As shown in FIG. 17, using the MSA agreement example above, the detected portion 332 may be a document segment 238 that states "This Master Services Agreement (this "Agreement") is effective as of Apr. 1, 2024 ("Effective Date") and entered into between Company A (d/b/a Company B), a Delaware corporation ("Customer"), and Company C ("Company")", which means that the document segment 238 of the top vector portion 328 includes language in its contents relevant to the query request 1 218. The review engine 312 may then receive the detected portion 332 and it generates a query response 214 that summarizes the information in the detected portion 332. For example, the review engine 312 may generate a query response 1 220 that states "Companies A, B, and C". To accomplish this, the review engine 312 may use one of the ML models 314 to generate the query request 1 218. For example, the review engine 312 may generate and send a request 1704 with the detected portion 332, the vectorized rule 322, the query request 212, and one or more NLP instructions to an ML model from the ML models 314, such as a generative AI model 1718. The generative AI model 1718 may generate a response 1706 comprising a query response 214 and/or a comment 334. If no information is found, the comment 334 may state "No information found in this document."

In some embodiments, the review engine 312 may initiate a review and verification process to verify that an electronic document 302 does not contain any information response to a query request 212. If the response 1706 from the generative AI model 1718 indicates that there is no information relevant to a query request 212, the review engine 312 may initiate a second level review process to verify the absence of any relevant information. The review engine 312 may send a request 1712 to a visual ML model 1716 of the ML models 314 with an image of the electronic document 302 and the vectorized rule 322 with the query request 212 and instructions to search for images within the electronic document 302 containing textual information relevant to the vectorized rule 322 and responsive to the query request 212. The visual ML model 1716 performs a visual search and comparison of image document portions (e.g., a table) to the vectorized rule 322, and it uses OCR to convert information embedded in the image document portion to textual information. The review engine 312 then sends a request 1704 to the generative AI model 1718 with the textual information with instructions to generate the query response 214 and/or the comment 334.

The review engine 312 then sends the detected portion 332, the query response 214, and/or the comment 334 to the interface(s) 338, such as GUI 202, for presentation to the clients 132 and/or clients 134.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

FIG. 18 illustrates an embodiment of a logic flow 1800. The logic flow 1800 may be representative of some or all of the operations executed by one or more embodiments described herein. For example, the logic flow 1800 may include some or all of the operations performed by devices or entities within the system 300 of the system 100, such as a server device 102 and/or client devices 112 or client devices 116. More particularly, the logic flow 1800 illustrates an example where the server device 102 performs a set of training and/or inferencing operations of a ML model from the ML models 314, such as a generative AI model and/or visual ML model, to support one or more network services provided by the system 300 and/or the system 100. For example, the logic flow 1800 may be performed by the processing circuitry 104 executing computer instructions for the document review engine 142 of system 300.

As depicted in FIG. 18, at block 1802, the logic flow 1800 includes receiving, from a graphical user interface (GUI), a custom rule includes a query request for information in an electronic document stored in a data repository. At block 1804, the logic flow 1800 includes generating, using a processor, a vectorized rule from the custom rule, selecting, using the processor, a subset of vectorized portions from a set of vectorized portions of the electronic document stored in a vector database corresponding to the vectorized rule. At block 1806, the logic flow 1800 includes sending, using the processor, the vectorized rule and the subset of vectorized portions to a machine learning (ML) model. At block 1808, the logic flow 1800 includes receiving, using the processor, one or more vectorized portions from the subset of vectorized portions identified by the ML model. At block 1810, the logic flow 1800 includes generating, using the processor, a query response to the query request based on the one or more vectorized portions, the query response includes a summary of information contained within the one or more vectorized portions in a natural language or a comment on the information contained within the one or more vectorized portions.

By way of example, a user defines a custom rule 210 using a GUI 202. The document review engine 142 receives, from the GUI 202, the custom rule 210. The custom rule 210 includes a query request 212 for information in an electronic document 302 stored in a data repository, such as a data store 124. The document portion extraction engine 304 extracts document portion 250 from the electronic document 302 using an ML model, such as a conditional random field (CRF) model, for example. The document review engine 142 selects a custom rule 210 from a set of rules 208, the custom rule 210 comprising a query request 212. The document portions 250 and the custom rule 210 are input to an embedding model 306, which generates a vectorized rule 322 from the custom rule 210. The embedding model 306 also receives the document portions 250, and it generates a set of vectorized portions 320 from the document portions 250. This process may occur, for example, before the custom rule 210 is defined and received by the GUI 202. A comparison engine 308 receives as input the vectorized portions 320 and the vectorized rule 322, compares a vectorized portion with the vectorized rule 322, and generates a similarity score for the pair. The comparison engine 308 selects a subset of vectorized portions 324 from the set of vectorized portions 320 of the electronic document 302 stored in a vector database corresponding to the vectorized rule 322. The comparison engine 308 sends the vectorized rule 322 and the subset of vectorized portions 324 to a first ML model of the ML models 314. The first ML model may comprise a generative AI model. The first ML model may compare, identify, and select one or more of vectorized portions from the subset of vectorized portions 324 to form a subset of vectorized portions 344 that are relevant to the query request 212 of the vectorized rule 322. The subset of vectorized portions 344 comprises fewer vectorized portions then the subset of vectorized portions 324, and represent a set of more relevant vectorized portions relative to the subset of subset of vectorized portions 324. The portion presence engine 310 receives the subset of vectorized portions 344. The portion presence engine 310 either sends the subset of vectorized portions 344 to the first ML model to further reduce a number of vectorized portions in the subset of vectorized portions 344 to a single vectorized portion, or the subset of vectorized portions 344 already contains a single vectorized portion, in which case it validates as a top vector portion 328 of the vectorized portions 320 with information most relevant to the query request 212 of the vectorized rule 322. The portion presence engine 310 then extracts a document segment 238 from the single vectorized portion with the information most relevant to the query request 212 as a detected portion 330. The review engine 312 reviews and analyzes the detected portion 330, and it generates either a query response 214 or a comment 334 based on the detected portion 330. For example, the review engine 312 generates a query response 214 to the query request 212 based on the vectorized portion. The query response 214 includes a summary of information contained within the vectorized portion in a natural language. Additionally, or alternatively, the review engine 312 generates a comment 334 on the information contained within the vectorized portion. It is noted that any of the above operations may be performed by, or with assistance from, one or more of the ML models 314.

In one embodiment, for example, the document review engine 142 may present the query request 212, the query response 214 to the query request 212, and/or the comment 334 on the GUI rule view 204 of the GUI 202. The document review engine 142 may also present one or more of the document portions 250 supporting the query response 214 and/or the comment 334 on the GUI document view 206 of the GUI 202.

In one embodiment, for example, the comparison engine 308 may generate a similarity score for a candidate matching pair that includes a vectorized portion from the set of vectorized portions 320 and the vectorized rule 322. The comparison engine 308 may rank the candidate matching pairs based on the similarity scores to form a set of ranked candidate matching pairs. The comparison engine 308 may select the subset of vectorized portions 324 from the set of ranked candidate matching pairs. A similar process may be performed by the first ML model to generate the subset of vectorized portions 344 from the subset of vectorized portions 324 in an iterative process until a top vector portion 328 is found.

In one embodiment, for example, portion presence engine 310 may receive a second subset of vectorized portions 344 from the subset of vectorized portions 324 identified by the first ML model. The portion presence engine 310 may send the vectorized rule 322 and the second subset of vectorized portions 344 to the first ML model. This process repeats until the portion presence engine 310 receives a single vectorized portion from the second subset of vectorized portions 344 identified by the first ML model as the top vector portion 328. The portion presence engine 310 identifies a document segment 238 contained within the top vector portion 328 as a detected portion 330. The review engine 312 generates the query response 214 to the query request 212 based on the detected portion 330 of the top vector portion 328. The query response 214 includes a summary of information contained within the single vectorized portion in a natural language or a comment 334 on the information contained within the single vectorized portion.

In one embodiment, for example, the review engine 312 generates the comment 334 based on the vectorized portion. The comment 334 indicates a presence or absence of the information requested by the query request 212 of the custom rule 210. The document review engine 142 causes presentation of the comment 334 in the GUI 202.

In one embodiment, for example, the first ML model comprises an artificial neural network (ANN), a generative artificial intelligence (AI) model, a large language model (LLM), a transformer model, or any combination thereof.

FIG. 19 illustrates an embodiment of a logic flow 1900. The logic flow 1900 may be representative of some or all of the operations executed by one or more embodiments described herein. For example, the logic flow 1900 may include some or all of the operations performed by devices or entities within the system 300 of the system 100, such as a server device 102 and/or client devices 112 or client devices 116. More particularly, the logic flow 1900 illustrates an example where the server device 102 performs a set of training and/or inferencing operations of a ML model from the ML models 314, such as a generative AI model and/or visual ML model, to support one or more network services provided by the system 300 and/or the system 100. For example, the logic flow 1800 may be performed by the processing circuitry 104 executing computer instructions for the document review engine 142 of system 300.

As depicted in FIG. 19, at block 1902, the logic flow 1900 includes determining, using the processor, that the information contained within the one or more vectorized portions is not associated with the vectorized rule by the ML model. At block 1904, the logic flow 1900 includes sending, using the processor, the vectorized rule and an image of the electronic document to a visual ML model. At block 1906, the logic flow 1900 includes receiving, using the processor, textual information from an image document portion of the image of the electronic document corresponding to the vectorized rule from the visual ML model. At block 1908, the logic flow 1900 includes generating, using the processor, a query response comprising a summary of the textual information from the image document portion. At block 1910, the logic flow 1900 includes generating a graphical user interface displaying the query response and at least one portion of the electronic document.

By way of example, the review engine 312 determines that the information contained within the vectorized portion is not associated with the vectorized rule 322 by the ML model. In this case, the review engine 312 sends the vectorized rule 322 with the query request 212 and an image of the electronic document 140 to a visual ML model of the ML models 314. The visual ML model performs a visual search for image document portions containing information relevant to the query request 212 of the vectorized rule 322. If found, the visual ML model extracts textual information, and sends it to the review engine 312. The review engine 312 receives the textual information from the image document portion of the image of the electronic document 302 corresponding to the query request 212 of the vectorized rule 322 from the visual ML model. The review engine 312 generates a query response 214 that includes a summary of the textual information from the image document portion. The document review engine 142 generates a GUI 202 for displaying the query response 214 and at least one portion of the electronic document 302 supporting the query response 214.

FIG. 20 illustrates an embodiment of a logic flow 2000. The logic flow 2000 may be representative of some or all of the operations executed by one or more embodiments described herein. For example, the logic flow 2000 may include some or all of the operations performed by devices or entities within the system 300 of the system 100, such as a server device 102 and/or client devices 112 or client devices 116. More particularly, the logic flow 2000 illustrates an example where the server device 102 performs a set of training and/or inferencing operations of a ML model from the ML models 314, such as a generative AI model and/or visual ML model, to support one or more network services provided by the system 300 and/or the system 100. For example, the logic flow 2000 may be performed by the processing circuitry 104 executing computer instructions for the document review engine 142 of system 300.

As depicted in FIG. 20, at block 2002, the logic flow 2000 includes determining, using the processor, that the information contained within the one or more vectorized portions is not associated with the vectorized rule by the ML model. At block 2004, the logic flow 2000 includes sending, using the processor, the vectorized rule and an image of the electronic document to a visual ML model. At block 2006, the logic flow 2000 includes receiving, using the processor, an indicator that the image of the electronic document does not contain any image document portions with textual information that corresponds to the vectorized rule from the visual ML model. At block 2008, the logic flow 2000 includes generating, using the processor, the query response comprising a comment indicating that the electronic document does not contain any information corresponding to the vectorized rule. At block 2010, the logic flow 2000 includes generating, using the processor, a graphical user interface displaying the comment and at least one portion of the electronic document.

By way of example, the review engine 312 determines that the information contained within the vectorized portion is not associated with the vectorized rule 322 by the first ML model. The review engine 312 sends the vectorized rule 322 with the query request 212 and an image of the electronic document to a visual ML model of the ML models 314. The visual ML model performs a visual search for image document portions containing information relevant to the query request 212 of the vectorized rule 322. If not found, the visual ML model generates an indicator that indicates no image document portions contain information relevant to the query request 212 of the vectorized rule 322. The review engine 312 receives the indicator that the image of the electronic document 302 does not contain any image document portions with textual information that corresponds to the vectorized rule 322 from the visual ML model, and it generates a comment 334 indicating that the electronic document 302 does not contain any information corresponding to the vectorized rule 322. The document review engine 142 the logic flow 2000 generates a GUI 202 for displaying the comment 334 and/or at least one portion of the electronic document 302 supporting the comment 334.

Figure 21:
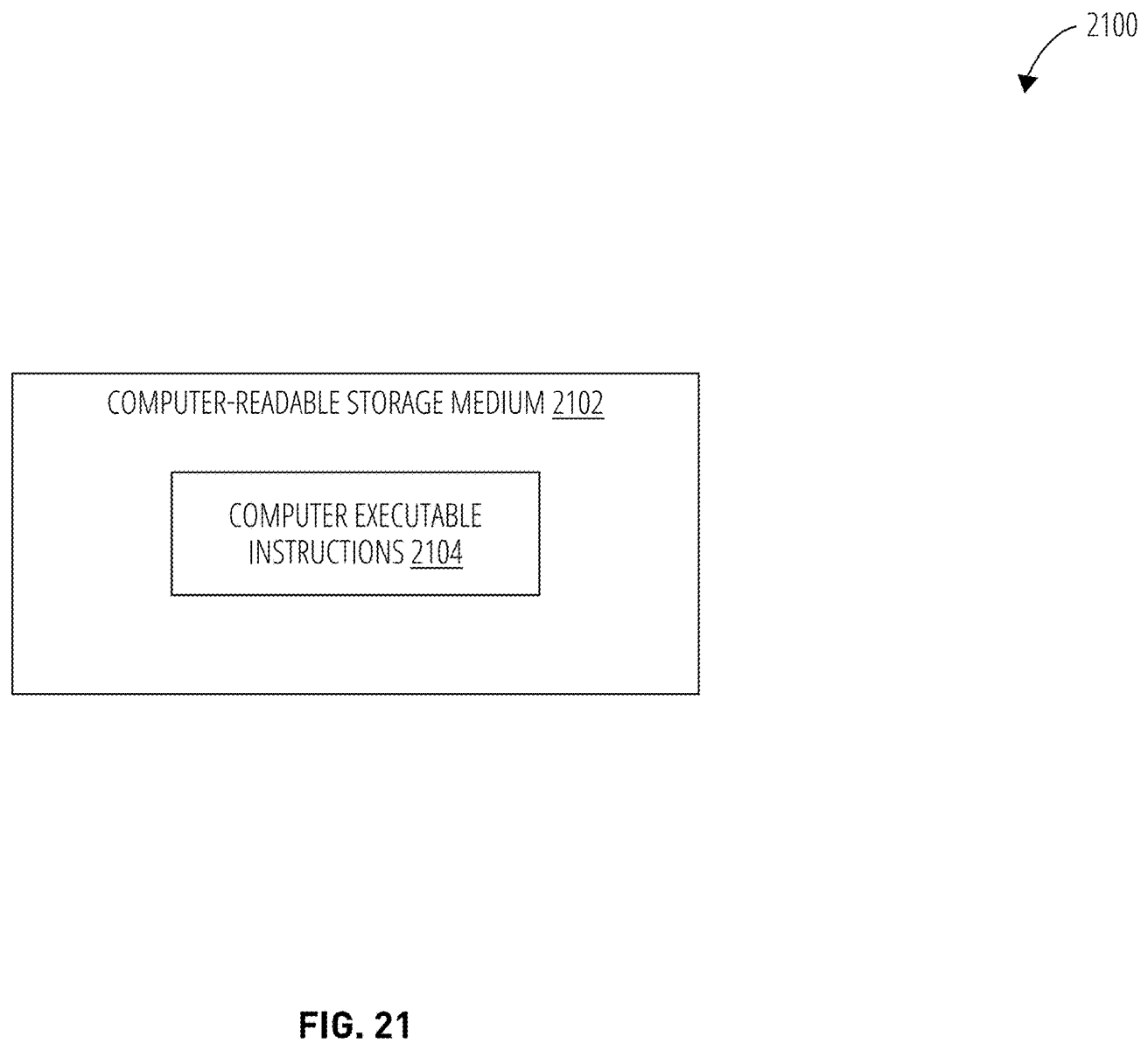

FIG. 21 illustrates an apparatus 2100. Apparatus 2100 may comprise any non-transitory computer-readable storage medium 2102 or machine-readable storage medium, such as an optical, magnetic or semiconductor storage medium. In various embodiments, apparatus 2100 may comprise an article of manufacture or a product. In some embodiments, the computer-readable storage medium 2102 may store computer executable instructions with which circuitry can execute. For example, computer executable instructions 2104 can include instructions to implement operations described with respect to any logic flows described herein. Examples of computer-readable storage medium 2102 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 2104 may include any suitable type of code, such as source code, compiled code, interpreted code, executable code, static code, dynamic code, object-oriented code, visual code, and the like.

FIG. 22 illustrates an embodiment of a computing architecture 2200. Computing architecture 2200 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 2200 may have a single processor with one core or more than one processor. Note that the term "processor" refers to a processor with a single core or a processor package with multiple processor cores. In at least one embodiment, the computing architecture 2200 is representative of the components of the system 100. More generally, the computing architecture 2200 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 2200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 22, computing architecture 2200 comprises a system-on-chip (SoC) 2202 for mounting platform components. System-on-chip (SoC) 2202 is a point-to-point (P2P) interconnect platform that includes a first processor 2204 and a second processor 2206 coupled via a point-to-point interconnect 2270 such as an Ultra Path Interconnect (UPI). In other embodiments, the computing architecture 2200 may be of another bus architecture, such as a multi-drop bus. Furthermore, each of processor 2204 and processor 2206 may be processor packages with multiple processor cores including core(s) 2208 and core(s) 2210, respectively. While the computing architecture 2200 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform may refers to a motherboard with certain components mounted such as the processor 2204 and chipset 2232. Some platforms may include additional components and some platforms may only include sockets to mount the processors and/or the chipset. Furthermore, some platforms may not have sockets (e.g. SoC, or the like). Although depicted as a SoC 2202, one or more of the components of the SoC 2202 may also be included in a single die package, a multi-chip module (MCM), a multi-die package, a chiplet, a bridge, and/or an interposer. Therefore, embodiments are not limited to a SoC.

The processor 2204 and processor 2206 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 2204 and/or processor 2206. Additionally, the processor 2204 need not be identical to processor 2206.

Processor 2204 includes an integrated memory controller (IMC) 2220 and point-to-point (P2P) interface 2224 and P2P interface 2228. Similarly, the processor 2206 includes an IMC 2222 as well as P2P interface 2226 and P2P interface 2230. IMC 2220 and IMC 2222 couple the processor 2204 and processor 2206, respectively, to respective memories (e.g., memory 2216 and memory 2218). Memory 2216 and memory 2218 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 2216 and the memory 2218 locally attach to the respective processors (i.e., processor 2204 and processor 2206). In other embodiments, the main memory may couple with the processors via a bus and shared memory hub. Processor 2204 includes registers 2212 and processor 2206 includes registers 2214.

Computing architecture 2200 includes chipset 2232 coupled to processor 2204 and processor 2206. Furthermore, chipset 2232 can be coupled to storage device 2250, for example, via an interface (I/F) 2238. The I/F 2238 may be, for example, a Peripheral Component Interconnect-enhanced (PCIe) interface, a Compute Express Link® (CXL) interface, or a Universal Chiplet Interconnect Express (UCIe) interface. Storage device 2250 can store instructions executable by circuitry of computing architecture 2200 (e.g., processor 2204, processor 2206, GPU 2248, accelerator 2254, vision processing unit 2256, or the like). For example, storage device 2250 can store instructions for server device 102, client devices 112, client devices 116, or the like.

Processor 2204 couples to the chipset 2232 via P2P interface 2228 and P2P 2234 while processor 2206 couples to the chipset 2232 via P2P interface 2230 and P2P 2236. Direct media interface (DMI) 2276 and DMI 2278 may couple the P2P interface 2228 and the P2P 2234 and the P2P interface 2230 and P2P 2236, respectively. DMI 2276 and DMI 2278 may be a high-speed interconnect that facilitates, e.g., eight Giga Transfers per second (GT/s) such as DMI 3.0. In other embodiments, the processor 2204 and processor 2206 may interconnect via a bus.

The chipset 2232 may comprise a controller hub such as a platform controller hub (PCH). The chipset 2232 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 2232 may comprise more than one controller hub such as a chipset with a memory controller hub, a graphics controller hub, and an input/output (I/O) controller hub.

In the depicted example, chipset 2232 couples with a trusted platform module (TPM) 2244 and UEFI, BIOS, FLASH circuitry 2246 via I/F 2242. The TPM 2244 is a dedicated microcontroller designed to secure hardware by integrating cryptographic keys into devices. The UEFI, BIOS, FLASH circuitry 2246 may provide pre-boot code. The I/F 2242 may also be coupled to a network interface circuit (NIC) 2280 for connections off-chip.

Furthermore, chipset 2232 includes the I/F 2238 to couple chipset 2232 with a high-performance graphics engine, such as, graphics processing circuitry or a graphics processing unit (GPU) 2248. In other embodiments, the computing architecture 2200 may include a flexible display interface (FDI) (not shown) between the processor 2204 and/or the processor 2206 and the chipset 2232. The FDI interconnects a graphics processor core in one or more of processor 2204 and/or processor 2206 with the chipset 2232.

The computing architecture 2200 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network can be used to connect computers to each other, to the Internet, and to wired networks (which use IEEE 802.3-related media and functions).

Additionally, accelerator 2254 and/or vision processing unit 2256 can be coupled to chipset 2232 via I/F 2238. The accelerator 2254 is representative of any type of accelerator device (e.g., a data streaming accelerator, cryptographic accelerator, cryptographic co-processor, an offload engine, etc.). One example of an accelerator 2254 is the Intel® Data Streaming Accelerator (DSA). The accelerator 2254 may be a device including circuitry to accelerate copy operations, data encryption, hash value computation, data comparison operations (including comparison of data in memory 2216 and/or memory 2218), and/or data compression. For example, the accelerator 2254 may be a USB device, PCI device, PCIe device, CXL device, UCIe device, and/or an SPI device. The accelerator 2254 can also include circuitry arranged to execute machine learning (ML) related operations (e.g., training, inference, etc.) for ML models. Generally, the accelerator 2254 may be specially designed to perform computationally intensive operations, such as hash value computations, comparison operations, cryptographic operations, and/or compression operations, in a manner that is more efficient than when performed by the processor 2204 or processor 2206. Because the load of the computing architecture 2200 may include hash value computations, comparison operations, cryptographic operations, and/or compression operations, the accelerator 2254 can greatly increase performance of the computing architecture 2200 for these operations.

The accelerator 2254 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator 2254. For example, the accelerator 2254 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 2254 via a non-posted write (e.g., a deferred memory write (DMWr)). One example of an instruction that atomically submits a work descriptor to the shared work queue of the accelerator 2254 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 2254. The dedicated work queue may accept job submissions via commands such as the movdir64b instruction.

Various I/O devices 2260 and display 2252 couple to the bus 2272, along with a bus bridge 2258 which couples the bus 2272 to a second bus 2274 and an I/F 2240 that connects the bus 2272 with the chipset 2232. In one embodiment, the second bus 2274 may be a low pin count (LPC) bus. Various devices may couple to the second bus 2274 including, for example, a keyboard 2262, a mouse 2264 and communication devices 2266.

Furthermore, an audio I/O 2268 may couple to second bus 2274. Many of the I/O devices 2260 and communication devices 2266 may reside on the system-on-chip (SoC) 2202 while the keyboard 2262 and the mouse 2264 may be add-on peripherals. In other embodiments, some or all the I/O devices 2260 and communication devices 2266 are add-on peripherals and do not reside on the system-on-chip (SoC) 2202.

FIG. 23 illustrates a block diagram of an exemplary communications architecture 2300 suitable for implementing various embodiments as previously described. The communications architecture 2300 includes various common communications elements, such as a transmitter, receiver, transceiver, radio, network interface, baseband processor, antenna, amplifiers, filters, power supplies, and so forth. The embodiments, however, are not limited to implementation by the communications architecture 2300.

As shown in FIG. 23, the communications architecture 2300 includes one or more clients 2302 and servers 2304. The clients 2302 may implement a client version of the server device 102, for example. The servers 2304 may implement a server version of the server device 102, for example. The clients 2302 and the servers 2304 are operatively connected to one or more respective client data stores 2308 and server data stores 2310 that can be employed to store information local to the respective clients 2302 and servers 2304, such as cookies and/or associated contextual information.

The clients 2302 and the servers 2304 may communicate information between each other using a communication framework 2306. The communications communication framework 2306 may implement any well-known communications techniques and protocols. The communications communication framework 2306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

(117) The communication framework 2306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2302 and the servers 2304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-20 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A computer-implemented method, comprising:
receiving, from a graphical user interface (GUI), a custom rule comprising a query request for information in an electronic document stored in a data repository;
generating, using a processor, a vectorized rule from the custom rule;
selecting, using the processor, a subset of vectorized portions from a set of vectorized portions of the electronic document stored in a vector database corresponding to the vectorized rule;
sending, using the processor, the vectorized rule and the subset of vectorized portions to a machine learning (ML) model, wherein the machine learning model includes at least one of: an artificial neural network (ANN), a generative artificial intelligence (AI) model, a large language model (LLM), a transformer model, or any combination thereof; and
receiving, using the processor, a query response to the query request from the ML model, the query response comprising a summary of textual information contained within one or more vectorized portions from the subset of vectorized portions, or the query response comprising a comment on the textual information contained within the one or more vectorized portions from the subset of vectorized portions, and providing the query response to the GUI for display.

2. The method of claim 1, comprising:
determining, using the processor, that the information contained within the one or more vectorized portions is not associated with the vectorized rule by the ML model;
sending, using the processor, the vectorized rule and an image of the electronic document to a visual ML model; and
receiving, using the processor, a query response to the query request from the visual ML model, the query response comprising a summary of textual information from an image document portion of the image of the electronic document corresponding to the vectorized rule.

3. The method of claim 1, comprising:
determining, using the processor, that the information contained within the one or more vectorized portions is not associated with the vectorized rule by the ML model;
sending, using the processor, the vectorized rule and an image of the electronic document to a visual ML model;
receiving, using the processor, an indicator that the image of the electronic document does not contain any image document portions with textual information that corresponds to the vectorized rule from the visual ML model; and
generating, using the processor, a query response to the query request, the query response comprising a comment indicating that the electronic document does not contain any information corresponding to the vectorized rule.

4. The method of claim 1, comprising presenting, using the processor, a name for the custom rule, the query request from the custom rule, and the query response to the query request on the GUI.

5. The method of claim 1, comprising:
generating, using the processor, a similarity score for a candidate matching pair comprising a vectorized portion from the set of vectorized portions and the vectorized rule;
ranking, using the processor, the candidate matching pairs based on the similarity scores to form a set of ranked candidate matching pairs; and
selecting, using the processor, the subset of vectorized portions from the set of ranked candidate matching pairs.

6. The method of claim 1, comprising:
receiving, using the processor, a second subset of vectorized portions from the subset of vectorized portions identified by the ML model;
sending, using the processor, the vectorized rule and the second subset of vectorized portions to the ML model; and
receiving, using the processor, the query response to the query request from the ML model, the query response comprising a summary of information contained within a single vectorized portion from the second subset of vectorized portions identified by the ML model, or the query response comprising a comment on the information contained within the single vectorized portion.

7. The method of claim 1, further comprising:
generating, using the processor, the comment based on at least one vectorized portion, the comment indicating a presence or absence of the information requested by the query request of the custom rule; and
presenting, using the processor, a name of the custom rule, the query request of the custom rule, and the comment to the query request in the GUI.

8. A computing apparatus, comprising:
at least one processor; and
a memory storing instructions that, when executed by the at least one processor, causes the at least one processor to:
receive a custom rule comprising a query request for information in an electronic document stored in a data repository from a graphical user interface (GUI);
generate a vectorized rule from the custom rule;

select a subset of vectorized portions from a set of vectorized portions of the electronic document stored in a vector database corresponding to the vectorized rule;

send the vectorized rule and the subset of vectorized portions to a machine learning (ML) model, wherein the machine learning model includes at least one of: an artificial neural network (ANN), a generative artificial intelligence (AI) model, a large language model (LLM), a transformer model, or any combination thereof; and receive a query response to the query request from the ML model, the query response comprising a summary of textual information contained within one or more vectorized portions from the subset of vectorized portions, or the query response comprising a comment on the textual information contained within the one or more vectorized portions from the subset of vectorized portions, and provide the query response to the GUI for display.

9. The computing apparatus of claim 8, comprising instructions that when executed by the at least one processor, cause the at least one processor to:

determine that the information contained within the one or more vectorized portions is not associated with the vectorized rule by the ML model;

send the vectorized rule and an image of the electronic document to a visual ML model; and receive a query response to the query request from the visual ML model, the query response comprising a summary of textual information from an image document portion of the image of the electronic document corresponding to the vectorized rule.

10. The computing apparatus of claim 8, comprising instructions that when executed by the at least one processor, cause the at least one processor to:

determine that the information contained within the one or more vectorized portions is not associated with the vectorized rule by the ML model;

send the vectorized rule and an image of the electronic document to a visual ML model;

receive an indicator that the image of the electronic document does not contain any image document portions with textual information that corresponds to the vectorized rule from the visual ML model; and generate the query response comprising a comment indicating that the electronic document does not contain any information corresponding to the vectorized rule.

11. The computing apparatus of claim 8, comprising instructions that when executed by the at least one processor, cause the at least one processor to present a name for the custom rule, the query request for the custom rule, and the query response to the query request on the GUI.

12. The computing apparatus of claim 8, comprising instructions that when executed by the at least one processor, cause the at least one processor to:

generate a similarity score for a candidate matching pair comprising a vectorized portion from the set of vectorized portions and the vectorized rule;

rank the candidate matching pairs based on the similarity scores to form a set of ranked candidate matching pairs; and select the subset of vectorized portions from the set of ranked candidate matching pairs.

13. The computing apparatus of claim 8, comprising instructions that when executed by the at least one processor, cause the at least one processor to:

receive a second subset of vectorized portions from the subset of vectorized portions identified by the ML model;

send the vectorized rule and the second subset of vectorized portions to the ML model; and receive the query response to the query request from the ML model, the query response comprising a summary of information contained within a single vectorized portion from the second subset of vectorized portions identified by the ML model, or the query response comprising a comment on the information contained within the single vectorized portion.

14. The computing apparatus of claim 8, comprising instructions that when executed by the at least one processor, cause the at least one processor to:

generate the comment based on at least one vectorized portion, the comment indicating a presence or absence of the information requested by the query request of the custom rule; and present a name for the custom rule, the query request of the custom rule, and the comment in the GUI.

15. A non-transitory computer-readable storage medium, the computer-readable storage medium including instructions that when executed by at least one processor, cause the at least one processor to:

receive, from a graphical user interface (GUI), a custom rule comprising a query request for information in an electronic document stored in a data repository;

generate a vectorized rule from the custom rule;

select a subset of vectorized portions from a set of vectorized portions of the electronic document stored in a vector database corresponding to the vectorized rule;

send the vectorized rule and the subset of vectorized portions to a machine learning (ML) model, wherein the machine learning model includes at least one of: an artificial neural network (ANN), a generative artificial intelligence (AI) model, a large language model (LLM), a transformer model, or any combination thereof; and receive a query response to the query request from the ML model, the query response comprising a summary of textual information contained within one or more vectorized portions from the subset of vectorized portions, or the query response comprising a comment on the textual information contained within the one or more vectorized portions from the subset of vectorized portions, and provide the query response to the GUI for display.

16. The computer-readable storage medium of claim 15, comprising instructions that when executed by the at least one processor, cause the at least one processor to:

determine that the information contained within the one or more vectorized portions is not associated with the vectorized rule by the ML model;

send the vectorized rule and an image of the electronic document to a visual ML model; and receive a query response to the query request from the visual ML model, the query response comprising a summary of textual information from an image document portion of the image of the electronic document corresponding to the vectorized rule.

17. The computer-readable storage medium of claim 15, comprising instructions that when executed by the at least one processor, cause the at least one processor to:

determine that the information contained within the one or more vectorized portions is not associated with the vectorized rule by the ML model;

send the vectorized rule and an image of the electronic document to a visual ML model;

receive an indicator that the image of the electronic document does not contain any image document portions with textual information that corresponds to the vectorized rule from the visual ML model; and generate the query response comprising a comment indicating that the electronic document does not contain any information corresponding to the vectorized rule.

18. The computer-readable storage medium of claim 15, comprising instructions that when executed by the at least one processor, cause the at least one processor to:

generate a similarity score for a candidate matching pair comprising a vectorized portion from the set of vectorized portions and the vectorized rule;

rank the candidate matching pairs based on the similarity scores to form a set of ranked candidate matching pairs; and select the subset of vectorized portions from the set of ranked candidate matching pairs.

19. The computer-readable storage medium of claim 15, comprising instructions that when executed by the at least one processor, cause the at least one processor to:

receive a second subset of vectorized portions from the subset of vectorized portions identified by the ML model;

send the vectorized rule and the second subset of vectorized portions to the ML model; and receive the query response to the query request from the ML model, the query response comprising a summary of information contained within a single vectorized portion from the second subset of vectorized portions identified by the ML model, or the query response comprising a comment on the information contained within the single vectorized portion.

\* \* \* \* \*